(12) United States Patent
Katayama et al.

(10) Patent No.: US 7,637,813 B2
(45) Date of Patent: Dec. 29, 2009

(54) VIDEO GAME DEVICE AND VIDEO GAME PROGRAM

(75) Inventors: Motomi Katayama, Kai (JP); Teruyuki Gunji, Kai (JP); Kouji Mori, Kai (JP); Masaaki Fukunaga, Kai (JP)

(73) Assignees: Nintendo Co., Ltd., Kyoto (JP); HAL Laboratory Inc., Tokyo (JP)

( * ) Notice: Subject to any disclaimer, the term of this patent is extended or adjusted under 35 U.S.C. 154(b) by 628 days.

(21) Appl. No.: 11/216,088

(22) Filed: Sep. 1, 2005

(65) Prior Publication Data

US 2006/0094502 A1   May 4, 2006

(30) Foreign Application Priority Data

Nov. 2, 2004   (JP)   ............................... 2004-319893
Mar. 22, 2005   (JP)   ............................... 2005-082535

(51) Int. Cl.
 *A63F 13/00* (2006.01)
(52) U.S. Cl. .............................. 463/31; 463/30; 463/37
(58) Field of Classification Search ...................... 463/1, 463/31–34
See application file for complete search history.

(56) References Cited

U.S. PATENT DOCUMENTS

| | | | |
|---|---|---|---|
| 5,863,248 A * | 1/1999 | Mine et al. ...................... | 463/4 |
| 6,217,449 B1 | 4/2001 | Kaku | |
| 6,234,901 B1 * | 5/2001 | Nagoshi et al. ............... | 463/33 |
| 6,398,647 B1 * | 6/2002 | Hirai et al. ..................... | 463/31 |
| 2002/0036618 A1 * | 3/2002 | Wakai et al. ................. | 345/157 |
| 2002/0090993 A1 * | 7/2002 | Koshiro et al. ................ | 463/30 |
| 2002/0105503 A1 * | 8/2002 | Oueslati et al. ............. | 345/173 |
| 2003/0076302 A1 * | 4/2003 | Langstraat ................... | 345/161 |
| 2003/0195039 A1 | 10/2003 | Orr et al. | |
| 2004/0224775 A1 * | 11/2004 | Wood et al. .................... | 463/43 |

FOREIGN PATENT DOCUMENTS

JP   6-285259   10/1994

OTHER PUBLICATIONS

IGN: "Yoshi's Touch & Go", Internet Video, May 26, 2004, http://media.ds.ign.com/media/682/682834/vids_6.html, 3 pages from Internet and disk containing video.
Gomez, "Game Programming Gems 3:2.7 Coping with Friction in Dynamic Simulations", Charles River Media, 2002.
"Weekly Famitsu", vol. 19, No. 46, Enterbrain Inc., accepted by the reference library of Japanese Patent Office on Oct. 29, 2004, p. 34, with a partial translation.

\* cited by examiner

*Primary Examiner*—John M Hotaling
*Assistant Examiner*—Eric M Thomas
(74) *Attorney, Agent, or Firm*—Nixon & Vanderhye P.C.

(57) ABSTRACT

A moving character and a background image are displayed on a display screen with a touch panel thereon. When the player operates the touch panel to draw a line in an intended path extending between a start point and an end point along which the player wishes to guide the moving character, an operation trace image having the shape of the line drawn is displayed on the display screen. Then, the moving character moves along or in parallel to the operation trace image. The operation trace image is gradually erased after a predetermined amount of time elapses. Thus, it is possible to provide a video game device and a video game program in which the player can influence the moving path or the moving direction of the player (moving) character based on the shape and/or the direction of the line drawn by the player.

50 Claims, 30 Drawing Sheets

| TRACE NUMBER | SEGMENT NUMBER | START POINT POSITION | END POINT POSITION | TANGENT VECTOR | NORMAL VECTOR |
|---|---|---|---|---|---|
| 1 | 1 | P1 | P2 | VECTOR t1 | VECTOR n1 |
| 1 | 2 | P2 | P3 | VECTOR t2 | VECTOR n2 |
| 1 | 3 | P3 | P4 | VECTOR t3 | VECTOR n3 |
| 1 | 4 | P4 | P5 | VECTOR t4 | VECTOR n4 |
| ... | ... | ... | ... | ... | ... |
| 1 | 14 | P14 | P15 | VECTOR t14 | VECTOR n14 |
| 1 | 15 | P15 | P16 | VECTOR t15 | VECTOR n15 |
| 2 | 1 | P21 | P22 | VECTOR t21 | VECTOR n21 |
| 2 | 2 | P22 | P23 | VECTOR t22 | VECTOR n22 |
| 2 | 3 | P23 | P24 | VECTOR t23 | VECTOR n23 |
| ... | ... | ... | ... | ... | ... |
| 2 | 7 | P27 | P28 | VECTOR t27 | VECTOR n27 |
| 2 | 8 | P28 | P29 | VECTOR t28 | VECTOR n28 |

| TRACE NUMBER | SEGMENT NUMBER | START POINT POSITION | END POINT POSITION |
|---|---|---|---|
| 1 | 1 | P1 | P2 |
| 1 | 2 | P2 | P3 |
| 1 | 3 | P3 | P4 |
| 1 | 4 | P4 | P5 |

| TRACE NUMBER | SEGMENT NUMBER | START POINT POSITION | END POINT POSITION |
|---|---|---|---|
| 1 | 1 | Pa | P2 |
| 1 | 2 | P2 | P3 |
| 1 | 3 | P3 | P4 |
| 1 | 4 | P4 | P5 |

| TRACE NUMBER | SEGMENT NUMBER | START POINT POSITION | END POINT POSITION |
|---|---|---|---|
| 1 | 1 | Pb | P2 |
| 1 | 2 | P2 | P3 |
| 1 | 3 | P3 | P4 |
| 1 | 4 | P4 | P5 |

| TRACE NUMBER | SEGMENT NUMBER | START POINT POSITION | END POINT POSITION |
|---|---|---|---|
| | | | |
| 1 | 2 | Pc | P3 |
| 1 | 3 | P3 | P4 |
| 1 | 4 | P4 | P5 |

TIME

| ANGLE θ OF VERTICAL VECTOR | THRESHOLD VALUE α (α1 > α2 > α3) |
|---|---|
| 0° → | α2 |
| 90° ↓ | α1 |
| 180° ← | α2 |
| 270° ↑ | α3 |

FIG. 38

| INNER PRODUCT | CONTACT DIRECTION PARAMETER | INSIDE TURN/ OUTSIDE TURN |
|---|---|---|
| POSITIVE | POSITIVE | INSIDE TURN |
| POSITIVE | NEGATIVE | OUTSIDE TURN |
| NEGATIVE | POSITIVE | OUTSIDE TURN |
| NEGATIVE | NEGATIVE | INSIDE TURN |

VIDEO GAME DEVICE AND VIDEO GAME PROGRAM

BACKGROUND

1. Field of the Technology

The technology presented herein relates to a video game device and a video game program, and more particularly to a video game device and a video game program of a novel action game in which the moving direction or the path of a player character is controlled by the player based on how an operation trace image (or a "rainbow line") is drawn by the player using position inputting means such as a pointing device or a touch panel, for example.

2. Description of the Background Art

In a typical conventional action game, the player controls a direction switch (a 4-way or 8-way direction switch so called a "cross-shaped switch") or an analog joystick to move a player character that can be controlled by the player (the moving character) along a path or paths drawn on the background image, aiming at eventually bringing the player character to a designated destination. Japanese Laid-Open Patent Publication No. 6-285259 (hereinafter referred to as "Patent Document 1") discloses a video game controller as shown in FIG. 8 of the publication for video games using a touch panel.

In a video game using a direction switch, the player needs to determine the direction in which the player character is to be moved while instantaneously acknowledging the surrounding circumstances (e.g., approaching enemy characters, areas into which the player character cannot be moved, etc.) and quickly control the direction switch accordingly. Such a conventional video game requires the player to have a significant amount of experience and skill, and there is quite a large difference between beginners and skilled players in how far in the game (in terms of the number of stages, for example) they can advance.

In the video game of Patent Document 1, the player touches on a character (a tank) to be moved, in response to which the range across which the character can be moved is displayed. The player then specifies the destination of the character to be moved, in response to which the character moves toward the specified destination. In the video game of Patent Document 1, what the player does is merely to specify a character to be moved and a destination thereof. Therefore, player's operations and the resulting changes in the displayed image are monotonous and not appealing, and the player can easily get bored of the game. With conventional video games, it is difficult for a player to intuitively control a character just by looking at the game screen without being familiar with the rule, and many of them impose complicated control operations and gameplay.

SUMMARY

Therefore, a primary feature of an example embodiment presented herein is to provide a novel video game device and a novel video game program being quite appealing and unconventional, in which the movement of a player character can be controlled by the player drawing a line on a screen, such that the player can intuitively control the player character without studying the rules beforehand.

Another feature of an example embodiment presented herein is to provide a video game device and a video game program of a video game that does not require difficult skills to play and that is therefore enjoyable even to beginners.

The example embodiment presented herein has the following feature. Note that reference numerals, figure numbers and supplementary explanations are shown in parentheses below for assisting the reader in finding corresponding components in the description of a preferred embodiment below to facilitate the understanding of the example embodiment. It is understood that these parenthetic expressions are in no way intended to restrict the scope of the example embodiment.

A first aspect of the example embodiment is directed to a video game device, including a display section (12), position inputting means (16), trace storage control means (31, S41, S46), movement control means (31, S75), determination means (31, S67), on-trace movement control means (31, S79, S80) and display control means (31, S23). The display section is a section for displaying a game image. The position inputting means is means for inputting a position on the game image. The trace storage control means is means for storing, in storage means, trace data (372) representing a series of input positions inputted by the position inputting means. The movement control means is means for storing, in storage means, position data of a moving character and updating the position data based on a predetermined rule. The determination means is means for determining whether or not the moving character has contacted a trace based on the trace data and the position data. The on-trace movement control means is means for updating the position data so that the moving character moves according to the trace based on the trace data when it is determined by the determination means that the moving character has contacted the trace. The display control means is means for displaying the moving character on the display section based on the position data.

According to a second aspect, the display control means displays the trace on the display section based on the trace data.

According to a third aspect, the movement control means updates the position data based on the predetermined rule if it is not determined by the determination means that the moving character has contacted the trace.

According to a fourth aspect, the on-trace movement control means updates the position data based on the trace data so that the moving character moves along the trace.

According to a fifth aspect, the on-trace movement control means updates the position data based on the trace data so that the moving character moves while being attracted to the trace.

In the first, third, fourth and fifth aspects, the on-trace movement control means may control the movement of the moving character so that the moving character attached to the trace moves along the trace, for example. For example, the moving character may move while being in contact with the trace, e.g., by rolling, walking or sliding on the trace, or a point in the moving character (e.g., the center thereof) may move on the trace. Where the moving character does not move along the trace, the moving direction of the moving character may be changed only at the instance the moving character contacts the trace.

Where the player character is moved along the trace, the moving character may or may not be moved in the direction in which the trace is drawn. For example, if the moving character is not moved in the direction in which the trace is drawn, the moving direction of the moving character after the contact with the trace may be determined based on a component of the moving direction at the time of contact that is in the tangential direction of the trace.

According to a sixth aspect, the on-trace movement control means updates the position data stored in storage means based on the trace data so that the moving character moves in a tangential direction of the trace.

According to a seventh aspect, the on-trace movement control means updates the position data based on the trace data so that the moving character is moved or accelerated in a direction from older input position to newer input position on the trace.

In the seventh aspect, while the on-trace movement control means updates the position data so that the player character is moved or accelerated in a direction from an older input position toward a newer input position along the trace, it is not necessary that the moving character starts from the older input position and moves toward the newer input position as long as the moving character moves in that direction.

Moreover, it is not always necessary that the moving character moves in the direction. Where the moving character is accelerated in the direction and if the moving direction of the moving character before the contact with the trace is opposite to the direction, the moving velocity is reduced.

According to an eighth aspect, the determination means determines, based on the trace data and the position data, whether or not the moving character has contacted a segment of the trace, for each segment between two input positions on the trace that are adjacent to each other in time.

According to a ninth aspect, the determination means makes a determination, for each segment starting from a segment one end point of which is at an oldest input position, whether or not the moving character has contacted the segment, and stops the determination process when it is determined that the moving character has contacted any segment.

According to a tenth aspect, the on-trace movement control means updates the position data so that the moving character is moved or accelerated along a segment that is determined by the determination means to have been contacted by the moving character, in a direction from one end of the segment at an older input position toward the other end thereof at a newer input position.

According to an eleventh aspect, when a position indicated by the position data satisfies a predetermined condition while continuously updating the position data so that the moving character is moved in a direction from one end of a segment at an older input position toward the other end thereof at a newer input position, the on-trace movement control means starts updating the position data so that the moving character is moved in a direction from the newer input position toward an even newer input position that is adjacent in time to the newer input position.

In the eleventh aspect, the predetermined condition may be whether the position indicated by the position data has reached one end of the segment at a newer input position, or whether the intersection between the segment and a line extending perpendicular to the segment from the position indicated by the position data has reached one end of the segment at a newer input position. Alternatively, the condition may be whether the position data is such that the moving character contacts the next segment.

According to a twelfth aspect, when it is determined that the moving character has contacted a new segment while continuously updating the position data so that the moving character is moved in a direction from one end of a previous segment at an older input position toward the other end thereof at a newer input position, the new segment being adjacent in time to the previous segment, the on-trace movement control means starts updating the position data so that the moving character is moved in a direction from one end of the new segment at an older input position toward the other end thereof at a newer input position.

According to a thirteenth aspect, when it is determined that the moving character is no longer in contact with a segment while continuously updating the position data so that the moving character is moved in a direction from one end of the segment at an older input position toward the other end thereof at a newer input position, the on-trace movement control means starts updating the position data so that the position indicated by the position data moves along an arc about one end of the segment at a newer input position until a straight line between the position indicated by the position data and the newer input position becomes perpendicular to a new segment that is adjacent in time with the segment, after which the on-trace movement control means starts updating the position data so that the moving character is moved in a direction from one end of the new segment at an older input position toward the other end thereof at a newer input position.

According to a fourteenth aspect, the video game device further includes on-trace movement termination determining means, wherein when it is determined by the determination means that the moving character is no longer in contact with a segment while the on-trace movement control means is continuously updating the position data so that the moving character is moved in a direction from one end of the segment at an older input position toward the other end thereof at a newer input position, the on-trace movement termination determining means determines whether or not there is any segment newer than the segment; and the on-trace movement control means updates the position data based on the trace data from when it is determined by the determination means that the moving character has contacted the trace until it is determined by the on-trace movement termination determining means that there is no newer segment.

According to a fifteenth aspect, the video game device further includes moving velocity data storage control means for storing, in storage means, moving velocity data of the moving character; the on-trace movement control means updates the position data based on the moving velocity data; the video game device further includes on-trace movement termination determining means for determining whether or not the update of the position data based on the trace data should be terminated based on a shape of the trace and the moving velocity data; and the on-trace movement control means updates the position data based on the trace data from when it is determined by the determination means that the moving character has contacted the trace until it is determined by the on-trace movement termination determining means that the update should be terminated.

In the fifteenth aspect, the on-trace movement termination determining means may determine that the on-trace movement should be terminated when the rate of change in the direction of the trace is high and the moving velocity is also high.

According to a sixteenth aspect, the video game device further includes moving velocity data storage control means for storing, in storage means, moving velocity data of the moving character; the on-trace movement control means updates the position data based on the moving velocity data; the video game device further includes on-trace movement termination determining means for determining whether or not the update of the position data based on the trace data should be terminated based on the moving velocity data, when it is determined that the predetermined condition is satisfied and if the position indicated by the position data and the even newer input position adjacent in time to the newer input position are on different sides of the segment; and the on-trace movement control means updates the position data based on the trace data from when it is determined by the determination means that the moving character has contacted the trace until it is determined by the on-trace movement termination determining means that the update should be terminated.

According to a seventeenth aspect, the video game device further includes: first data storing means for storing first data; first data updating means for updating the first data so that the first data comes closer to a threshold value, when it is determined that the predetermined condition is satisfied and if the position indicated by the position data and the even newer input position adjacent in time to the newer input position are on different sides of the segment; and on-trace movement termination determining means for determining whether or not the first data has reached the threshold value, wherein the on-trace movement control means updates the position data based on the trace data from when it is determined by the determination means that the moving character has contacted the trace until it is determined by the on-trace movement termination determining means that the first data has reached the threshold value.

In the seventeenth aspect, the first data updating means may update the first data so as to bring the first data closer to zero, and the on-trace movement termination determining means may determine whether or not the first data has become equal to zero (or zero or less). Alternatively, the first data updating means may update the first data so as to increase the first data, and the on-trace movement termination determining means may determine whether or not the first data has become equal to a predetermined value that is greater than zero (or greater than or equal to the predetermined value).

According to an eighteenth aspect, the first data updating means updates the first data so as to bring the first data away from the threshold value if the position indicated by the position data and the even newer input position adjacent in time to the newer input position are on the same side of the segment.

According to a nineteenth aspect, the video game device further includes moving velocity data storage control means for storing, in storage means, moving velocity data of the moving character, wherein: the on-trace movement control means updates the position data based on the moving velocity data; and the first data updating means determines an amount of update based on the moving velocity data.

According to a twentieth aspect, the video game device further includes sinking control means for adjusting a distance between the position indicated by the position data and an intersection between the trace and a line being perpendicular to the trace and extending from the position to be a predetermined distance when it is determined by the determination means that the moving character has contacted the trace.

According to a twenty-first aspect, the sinking control means updates the position data so that the distance gradually approaches the predetermine distance.

According to a twenty-second aspect, the trace storage control means stores a group of trace data in storage means based on a series of positions inputted from when the position inputting means first detects an input of a position until the position inputting means no longer detects an input of a position.

According to a twenty-third aspect, if an angle between a first, older segment and a second, newer segment along a trace that are adjacent in time to each other is less than or equal to a threshold value, each segment extending between two input positions along the trace that are adjacent in time to each other, the trace storage control means stores the trace data of a first portion of the trace and the trace data of a second portion of the trace as different groups of trace data, wherein the first portion of the trace includes the first segment and any other preceding segments and the second portion of the trace includes the second segment and any other subsequent segments.

According to a twenty-fourth aspect, the trace storage control means stores a group of trace data in storage means based on a series of positions inputted from when the position inputting means first detects an input of a position until the position inputting means no longer detects an input of a position; the determination means determines which group of trace data represents a trace that has been contacted by the moving character based on each group of trace data and the position data; and when it is determined by the determination means that the moving character has contacted a trace represented by a group of trace data, the position data stored in storage means is updated so that the moving character is moved based on the group of trace data.

According to a twenty-fifth aspect, the video game device the video game device further includes trace data erasing means, wherein when the position inputting means detects an input of a new series of positions while a group of trace data is already stored in storage means, the trace data erasing means erases the existing group of trace data from the storage means or invalidates the existing group of trace data.

According to a twenty-sixth aspect, the video game device further includes moving velocity data storage control means for storing, in storage means, moving velocity data of the moving character, wherein: the movement control means updates the position data based on the moving velocity data; and the on-trace movement control means updates the position data so that the moving character moves according to the trace based on the trace data when it is determined by the determination means that the moving character has contacted the trace and only if the moving velocity data at the time of contact represents a value smaller than a threshold value.

According to a twenty-seventh aspect, the video game device further includes moving velocity data storage control means for storing, in storage means, moving velocity data of the moving character, wherein: the movement control means updates the position data based on the moving velocity data; and the on-trace movement control means updates the position data so that the moving character moves according to the trace based on the trace data when it is determined by the determination means that the moving character has contacted the trace and only if a magnitude of a component of the moving velocity data at the time of the contact that is perpendicular to the trace is smaller than a threshold value.

According to a twenty-eighth aspect, the threshold value is determined according to an angle of the trace.

According to a twenty-ninth aspect, the video game device further includes moving velocity data storage control means for storing, in storage means, moving velocity data of the moving character, wherein: the movement control means updates the position data based on the moving velocity data; and the on-trace movement control means updates the moving velocity data so that a moving direction of the moving character is reversed by the trace when it is determined by the determination means that the moving character has contacted the trace and if the moving velocity data represents a value greater than or equal to a threshold value.

According to a thirtieth aspect, the determination means determines, based on the trace data and the position data, whether or not the moving character has contacted the input position and whether or not, with respect to a straight line extending from the input position and being perpendicular to the segment one end of which is at the input position, the position indicated by the position data and the other end of the segment are on different sides of the straight line; and when it is determined that the position indicated by the position data and the other end of the segment are on different sides of the straight line, the position data is updated so that the position indicated by the position data moves along an arc about the input position until a straight line extending between the position indicated by the position data and the input position becomes perpendicular to the segment, after which the position data is updated so that the moving character is moved in a direction from one end of the segment at an older input position toward the other end thereof at a newer input position.

According to a thirty-first aspect, the video game device further includes moving velocity data storage control means for storing, in storage means, moving velocity data of the moving character, wherein: the movement control means updates the position data based on the moving velocity data; and when the determination means determines, based on the trace data and the position data, that the moving character has contacted the input position and determines that, with respect to a straight line extending from the input position and being perpendicular to the segment one end of which is at the input position, the position indicated by the position data and the other end of the segment are on different sides of the straight line, the position data is updated so that the moving character is moved in a direction from one end of the segment at an older input position toward the other end thereof at a newer input position only if a magnitude of a component of a moving velocity represented by the moving velocity data at the time of the determination that is perpendicular to the segment is smaller than a threshold value.

According to a thirty-second aspect, the video game device further includes moving velocity data storage control means for storing, in storage means, moving velocity data of the moving character, wherein: the movement control means updates the position data based on the moving velocity data; and even when the determination means determines, based on the trace data and the position data, that the moving character has contacted the input position and determines that, with respect to a straight line extending from the input position and being perpendicular to the segment one end of which is at the input position, the position indicated by the position data and the other end of the segment are on different sides of the straight line, the moving velocity data is updated so that a moving direction of the moving character is reversed by the input position if a magnitude of a component of a moving velocity represented by the moving velocity data at the time of the determination that is perpendicular to the segment is greater than or equal to a threshold value.

According to a thirty-third aspect, the video game device further includes moving velocity data storage control means for storing, in storage means, moving velocity data of the moving character, wherein: the movement control means updates the position data based on the moving velocity data; and when the determination means determines, based on the trace data and the position data, that the moving character has contacted the input position and determines that, with respect to a straight line extending from the input position and being perpendicular to the segment one end of which is at the input position, the position indicated by the position data and the other end of the segment are on different sides of the straight line, the position data is updated so that the moving character is moved in a direction from one end of the segment at an older input position toward the other end thereof at a newer input position only if a magnitude of a component of a moving velocity represented by the moving velocity data at the time of the determination that is in a direction extending between the position indicated by the position data and the input position is smaller than a threshold value.

According to a thirty-fourth aspect, the video game device further includes moving velocity data storage control means for storing, in storage means, moving velocity data of the moving character, wherein: the movement control means updates the position data based on the moving velocity data; and even when the determination means determines, based on the trace data and the position data, that the moving character has contacted the input position and determines that, with respect to a straight line extending from the input position and being perpendicular to the segment one end of which is at the input position, the position indicated by the position data and the other end of the segment are on different sides of the straight line, the moving velocity data is updated so that a moving direction of the moving character is reversed by the input position if a magnitude of a component of a moving velocity represented by the moving velocity data at the time of the determination that is in a direction extending between the position indicated by the position data and the input position is greater than or equal to a threshold value.

According to a thirty-fifth aspect, the video game device further includes trace data erasing means for automatically erasing or invalidating the input positions of the trace data stored in the storage means successively starting from an oldest input position.

In the thirty-fifth aspect, the trace data erasing means may automatically erase or invalidate the input positions of trace data successively starting from an oldest input position by a predetermined amount for a predetermined amount of time.

According to a thirty-sixth aspect, the video game device further includes time determination means for determining whether or not a predetermined amount of time has elapsed from a start or an end of a detection of position inputs by the position inputting means, wherein the trace data erasing means erases or invalidates the trace data stored in the trace data storing means when it is determined by the time determination means that the predetermined amount of time has elapsed.

According to a thirty-seventh aspect, the video game device further includes second data updating means for storing second data in storage means and for updating the second data so as to bring the second data closer to a threshold value when the trace data is stored in storage means by the trace storage control means, wherein if the second data has reached the threshold value, the trace storage control means no longer stores the trace data in storage means even if a new position is inputted by the position inputting means.

According to a thirty-eighth aspect, the trace amount data updating means automatically updates the second data so as to bring the second data away from the threshold value while there is no input from the position inputting means.

According to a thirty-ninth aspect, the video game device further includes trace length detection means for detecting a length of a trace based on the trace data stored in storage means by the trace storage control means, wherein the trace amount data updating means updates the second data by an amount according to the length of the trace detected by the trace length detection means.

According to a fortieth aspect, in the first aspect, the display control means displays information representing a value of the second data.

According to a forty-first aspect, the video game device further includes character detection means for determining whether or not the moving character is present at a first position inputted by the position inputting means, wherein the trace storage control means stores the trace data in storage means based on the input position only if it is determined by the character detection means that no moving character is present at the input position.

According to a forty-second aspect, a predetermined action is executed by the moving character when it is determined by the character detection means that the moving character is present at the input position.

According to a forty-third aspect, the video game device further includes moving velocity data storage control means for storing, in storage means, moving velocity data of the moving character; the movement control means updates the position data based on the moving velocity data; and the video game device further includes moving velocity determination means, wherein when it is determined by the determination means that the moving character has contacted the trace, the moving velocity determination means determines a new moving velocity of the moving character to be a magnitude of a component of a velocity represented by the moving velocity data immediately before the contact that is parallel to a tangential direction of the trace.

According to a forty-fourth aspect, the video game device further includes moving velocity data storage control means for storing, in storage means, moving velocity data of the moving character, wherein: the on-trace movement control means updates the position data based on the moving velocity data; the on-trace movement control means includes acceleration determination means for determining a magnitude of acceleration used for updating the moving velocity data based on a magnitude of a moving velocity represented by the current moving velocity data; the acceleration determination means includes target velocity setting means for setting a target velocity value, maximum velocity setting means for setting a maximum velocity value, and setting means for setting a positive first value and a negative second value; the acceleration determination means determines the magnitude of acceleration to be zero when the magnitude of the moving velocity represented by the current moving velocity data is equal to the target velocity value, determines the magnitude of acceleration to be the first value when the magnitude of the moving velocity represented by the current moving velocity data is equal to zero, determines the magnitude of acceleration to be the second value when the magnitude of the moving velocity represented by the current moving velocity data is equal to the maximum velocity value, determines the magnitude of acceleration by interpolation with the first value and zero when the magnitude of the moving velocity represented by the current moving velocity data is in a range from zero to the target velocity value, and determines the magnitude of acceleration by interpolation with zero and the second value when the magnitude of the moving velocity represented by the current moving velocity data is in a range between the target velocity value and the maximum velocity value; and the on-trace movement control means determines an acceleration vector based on the magnitude of acceleration determined by the acceleration determination means and a tangential direction of the trace.

According to a forty-fifth aspect, the position inputting means is a touch panel provided on a screen of the display section.

A forty-sixth aspect of the example embodiment is directed to a storage medium storing a video game program for instructing a computer (31), which is connected to a display section (12) for displaying a game image and position inputting means (16) for inputting a position on the game image and storage means (37), to function as trace storage control means, movement control means, determination means, on-trace movement control means and display control means.

The trace storage control means is means for storing, in storage means, trace data representing a series of input positions inputted by the position inputting means. The movement control means is means for storing, in storage means, position data of a moving character and updating the position data based on a predetermined rule. The determination means is means for determining whether or not the moving character has contacted a trace based on the trace data and the position data. The on-trace movement control means is means for updating the position data so that the moving character moves according to the trace based on the trace data when it is determined by the determination means that the moving character has contacted the trace. The display control means is means for displaying the moving character on the display section based on the position data.

A forty-seventh aspect of the example embodiment is directed to a video game device (10), including a display section (the lower LCD 12 in a preferred embodiment of the present invention), image data storing means (the image data storage area 210 of the ROM 21), program storing means (the program storage area 215 of the ROM 21), position inputting means (a touch panel 16, a mouse, or the like), operation status detection means (the flow chart of FIG. 10), temporary storage means (the W-RAM 37), writing means (steps 41, 46, 48, 49 of FIG. 10), operation trace image data producing means (step 66 of FIG. 11, the CPU core 31) and display control means (FIG. 11).

A forty-eighth aspect of the example embodiment is directed to a video game device, including a display section (the LCD 12), a touch panel (16), image data storing means, program storing means, operation status detection means, temporary storage means, writing means, operation trace image data producing means and display control means.

A forty-ninth aspect of the example embodiment is directed to a storage medium storing a video game program for use in an image processing device, wherein the image processing device includes a display section associated therewith for displaying a game image, position inputting means, image data storing means for storing moving character image data for displaying a moving character of the video game and background image data for displaying a background image, program storing means for storing the video game program for controlling how the moving character image and the background image are displayed, a computer, and temporary storage means for temporarily storing data for a game process to be performed by the computer, the video game program instructing the computer to perform an operation status detection step, a writing step, an operation trace image data producing step, a first display control step, a second display control step, and a third display control step.

A fiftieth aspect of the example embodiment is directed to a storage medium storing a video game program for use in an image processing device, wherein the image processing device includes a display section associated therewith for displaying a game image, a touch panel provided on a display screen of the display section, image data storing means for storing moving character image data for displaying a moving character of the video game and background image data for displaying a background image, program storing means for storing the video game program for displaying the moving character image and the background image, a computer, and temporary storage means for temporarily storing data for a game process to be performed by the computer, the video game program instructing the computer to perform an operation status detection step, a writing step, an operation trace image data producing step, a first display control step, a second display control step, and a third display control step.

A fifty-first aspect of the example embodiment is directed to a video game device, including display means (12), position inputting means (16), a memory (37), storage control means (31, S41, S46), invalidation means (31), game process means (31), and display control means (31). The display means is means for displaying a game image. The position inputting means is means for inputting a position on a screen of the display means. The memory is for temporarily storing data. The storage control means is means for successively storing position data representing the position inputted through the position inputting means as valid position data in the memory during a period from a start of a position inputting operation through the position inputting means until an end thereof. The invalidation means is means for successively invalidating position data among a group of valid position data stored in the memory for which a predetermined amount of time has elapsed since the position data is stored in the memory. The game process means is means for performing a game process using the group of valid position data stored in the memory. The display control means is means for displaying the game image reflecting a result of the game process by the game process means on the display means.

In the fifty-first aspect, "invalidating position data" means erasing the position data from the memory or resetting the flag indicating whether the position data is valid. Accordingly, the term "valid position data" may mean position data stored in the memory (those that have not been erased from the memory) or may alternatively mean those for which the validity flag is set among all the position data stored in the memory.

A fifty-second aspect of the example embodiment is directed to a storage medium storing a video game program for instructing a computer (31), which is connected to display means (12) for displaying a game image, position inputting means (16) for inputting a position on a screen of the display means and a memory (37) for temporarily storing data, to function as storage control means, invalidation means, game process means and display control means. The storage control means is means for successively storing position data representing the position inputted through the position inputting means as valid position data in the memory during a period from a start of a position inputting operation through the position inputting means until an end thereof. The invalidation means is means for successively invalidating position data among a group of valid position data stored in the memory for which a predetermined amount of time has elapsed since the position data is stored in the memory. The game process means is means for performing a game process using the group of valid position data stored in the memory. The display control means is means for displaying the game image reflecting a result of the game process by the game process means on the display means.

According to a fifty-third aspect, the video game program instructs the computer to function also as determination means for determining whether or not an operation trace formed by valid position data stored in the memory satisfies a predetermined condition; and the game process means is means for performing a different game process according to a result of the determination by the determination means.

In the fifty-third aspect, the "predetermined condition" may be, for example, whether the operation trace has a predetermined shape (e.g., a circle) or whether a portion of the operation trace extends across a predetermined region on the screen.

According to a fifty-fourth aspect, the video game program instructs the computer to function also as trace image producing means for producing an image of an operation trace formed by valid position data stored in the memory; and the display control means displays, on the display means, the game image including the image of the operation trace produced by the trace image producing means.

The example embodiment presented herein as set forth above provides a novel video game device and a novel video game program being quite appealing and unconventional, in which the movement of a player character can be controlled by the player drawing a line on a screen, such that the player can intuitively control the player character without studying the rules beforehand.

The video game of the example embodiment presented herein does not require difficult skills to play and is therefore enjoyable even to beginners.

These and other features, aspects and advantages of the example embodiment presented herein will become more apparent from the following detailed description when taken in conjunction with the accompanying drawings.

BRIEF DESCRIPTION OF THE DRAWINGS

FIG. 38 shows how to determine whether a player character is turning along the inside or outside of a corner;

DESCRIPTION OF THE PREFERRED EMBODIMENTS

Figure 1:
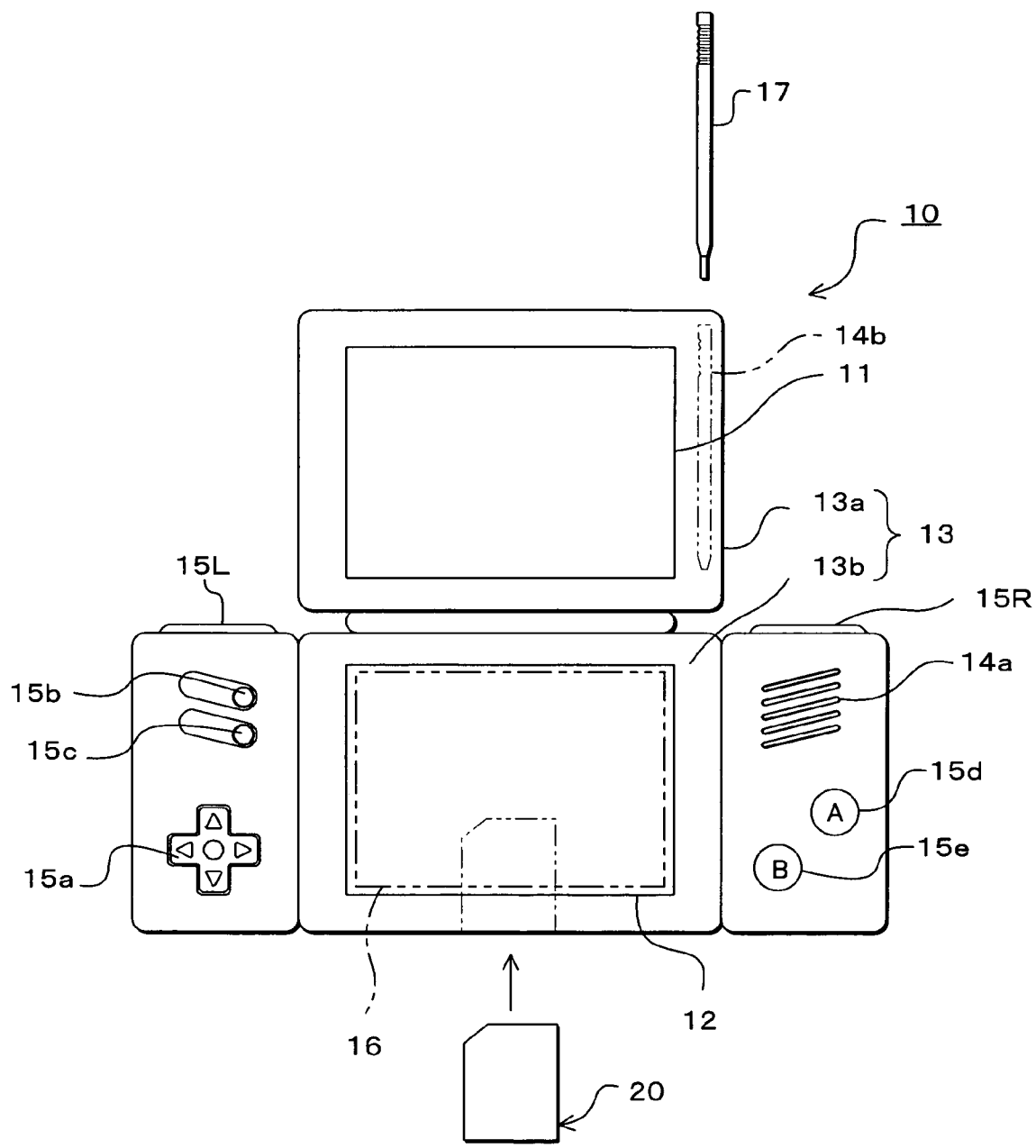
FIG. 1 generally shows a portable video game machine being an example of the video game device of an example embodiment.

FIG. 1 generally shows a portable video game machine being an example an example embodiment. Referring to FIG. 1, a portable video game device 10 of this embodiment includes two liquid crystal display devices (hereinafter referred to as "LCDs") 11 and 12 accommodated in a housing 13 so that the LCDs 11 and 12 are in a predetermined arrangement with respect to each other. Specifically, where the first LCD 11 and the second LCD 12 are arranged one above the other, the housing 13 includes an upper housing 13a and a lower housing 13b, and the upper housing 13a is pivotally supported at a portion or portions along the upper side of the lower housing 13b so that the housing 13 as a whole is foldable. The upper housing 13a has a planar shape of a size slightly larger than that of the first LCD 11, and has an opening on the primary surface thereof so that the display surface of the LCD 11 is exposed therethrough. The lower housing 13b has a planar shape that is wider than that of the upper housing 13a, and has an opening generally in the middle in the horizontal direction through which the display surface of the LCD 12 is exposed. The lower housing 13b has sound slits 14a formed therein either on the left or right of the LCD 12, and various switches of a control switch section 15 are provided thereon on both sides of the LCD 12.

The control switch section 15 includes a direction switch 15a, a start switch 15b and a select switch 15c, which are provided on the primary surface of the lower housing 13b on the left of the LCD 12, and action switches 15d and 15e, which are provided on the primary surface of the lower housing 13b on the right of the LCD 12. The direction switch 15a is used, for example, for moving a cursor that can be controlled by the player. The action switches 15d and 15e are used for purposes other than the direction-instructing operation, e.g., to specify an action to be executed by the player character (or "moving character"). As necessary, additional action switches may be provided, and/or side switches 15L and 15R may be optionally provided on the upper shoulder portions of the lower housing 13b.

The touch panel 16 is preferably attached on the upper surface of the LCD 12. The touch panel 16 may be any of various types of touch-sensitive panels, including a resistive film touch panel, an optical (infrared) touch panel and a capacitance-coupling touch panel. When the upper surface of the touch panel 16 is pressed with a stylus 17 or when the stylus 17 is moved or slid thereon, the touch panel 16 detects the position of the stylus 17 and outputs data representing the coordinates of the detected position (hereinafter referred to as the "position data"). Fingertip of the player can be used instead of the stylus 17. The player uses the touch panel 16 to directly specify a controlled object in a game field (or a display region) displayed on the LCD 12, or to specify the position and shape of an operation trace image (referred to as a "rainbow line" in the video game of the present embodiment) for guiding the player character along an intended path. The touch panel 16 may also be used for selecting/operating icons displayed on the LCD 12, or for other position-specifying operations.

As described above, the portable video game device 10 has the LCDs 11 and 12, providing two liquid crystal display screens, and the touch panel 16 provided on one of the LCDs (e.g., on the LCD 12 being the lower screen). Thus, the portable video game device 10 provides two screens (the LCDs 11 and 12) and two sets of controls (15 and 16). The touch panel 16 may be used for receiving, from the player, types of inputs that are different from those of the control switch section 15, or may receive similar types of inputs to those of the control switch section 15.

The upper housing 13a may optionally have a stylus hole 14b formed therein near the side surface of upper housing 13a. The stylus hole 14b is a hole for accommodating the stylus 17, which is used for specifying positions on the touch panel 16, and is shaped according to the outer shape of the stylus 17. A card slot (not shown) is formed in the lower housing 13b along the periphery thereof for receiving a video game card (or a video game cartridge) 20 including a memory (e.g., a ROM) storing a video game program therein. The card slot includes therein a connector (not shown) to provide an electrical connection with the memory card 20. The lower housing 13b (or the upper housing 13a) includes therein an electronic circuit board 30 (shown in FIG. 3 and will be described later) with various electronic parts such as a CPU mounted thereon. The storage medium for storing a video game program is not limited to a non-volatile semiconductor memory such as a ROM or a flash memory, but may alternatively be an optical disk storage medium such as a CD-ROM or a DVD.

Figure 2:
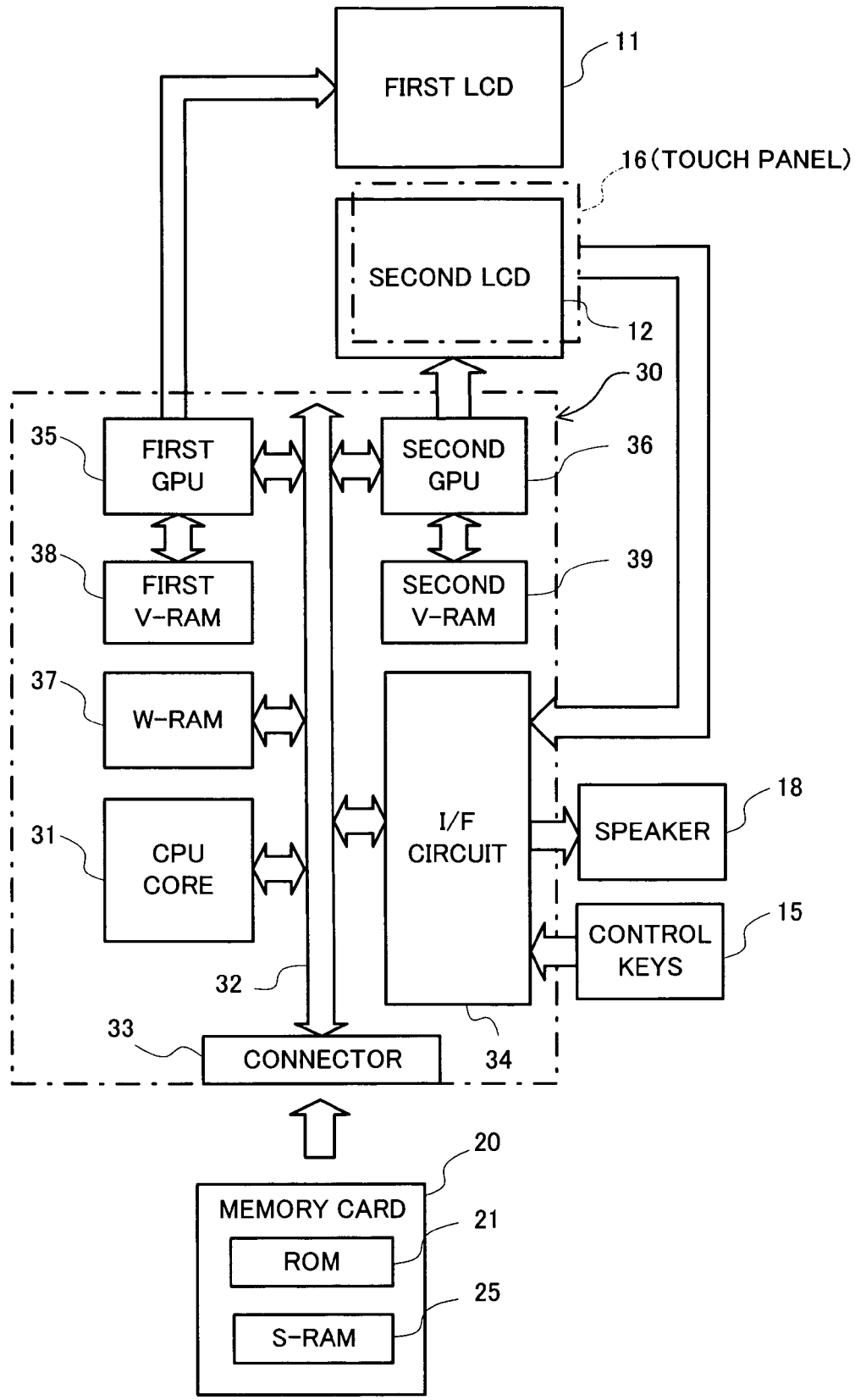
FIG. 2 is a block diagram showing a portable video game device according to an embodiment.

FIG. 2 is a block diagram showing a portable video game machine according to an embodiment. Referring to FIG. 2, a CPU core 31 is mounted on the electronic circuit board 30 accommodated in the housing 13. The CPU core 31 is connected to a connector 33, an input/output interface (I/F) circuit 34, a first graphics processing unit (a first GPU) 35, a second graphics processing unit (a second GPU) 36 and a working RAM (hereinafter referred to as a "W-RAM") 37, via a bus 32. The connector 33 can receive the memory card 20. The memory card 20 includes therein a ROM 21 and an S-RAM 25. When the memory card 20 is removed from the portable video game device 10, the power supply to the S-RAM 25 is stopped, but backup power is then supplied to the S-RAM 25 from a button battery (not shown) in order to prevent the loss of stored data. The CPU core 31 controls the read operation from the ROM 21, and controls the read/write operation from/to the S-RAM 25. The I/F circuit 34 is connected to the control switch section 15, the touch panel 16 and a speaker 18. The speaker 18 is placed behind the sound slits 14*a*. A first video RAM (hereinafter referred to as a "V-RAM") 38 is connected to the first GPU 35, and a second V-RAM 39 is connected to the second GPU 36.

Figure 3:
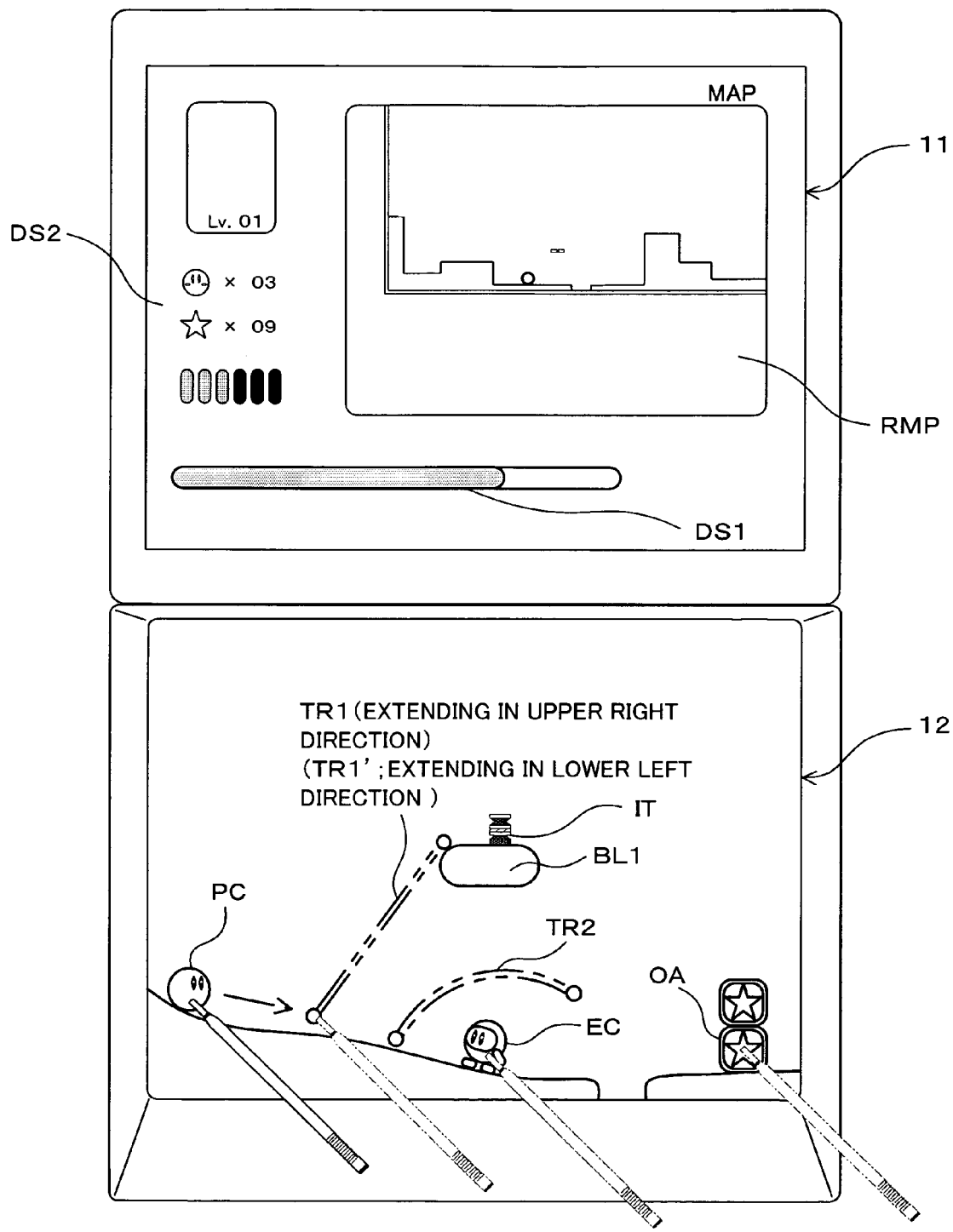
FIG. 3 shows exemplary images displayed on an upper screen (an LCD 11) and a lower screen (an LCD 12) of a video game device or a video game program according to an embodiment.

FIG. 3 shows exemplary images displayed on the upper screen (the LCD 11) and the lower screen (the LCD 12) according to an embodiment of the present invention. In the video game of the present embodiment, the lower LCD 12 is used as the main screen and the upper LCD 11 is used as the sub-screen. The lower LCD 12 (main screen) is where the character controlled by the player ("controlled character") is displayed, and is a screen that is primarily used or watched by the player during the gameplay. In contrast, the upper LCD 11 (sub-screen) displays images that are not directly influenced by the player's operation, and is where reference information is provided, which may be useful to the player during the gameplay, which primarily relies on the lower screen.

Specifically, the lower LCD 12 displays a controlled character, which is the player character that can be controlled by the player to move in a specified direction or to execute a specified action. As necessary, the controlled character may include an enemy character whose moving direction cannot be controlled by the player but whose movement can temporarily be halted, and/or an obstacle such as a block that blocks the movement of the player character. In such a case, how the player character and the enemy character/obstacle are controlled in response to player's operations is programmed so that the moving direction or the action (function) thereof can be controlled as intended by the player.

For example, the moving direction of a player character PC can be controlled by the player based on the shape and direction of an operation trace (which can be called a "rainbow line" or a "rainbow belt conveyer" in the present embodiment) TR drawn by the player, and the action thereof can be specified by the player directly touching on the player character PC. For example, the moving direction of the player character PC can be changed by an operation trace based on the shape thereof when the player tries to avoid an attack from an enemy character EC that is nearing in the moving direction of the player character PC, or when the player tries to guide the player character PC onto a block BL1 floating in the air in order to collect an item IT on the block BL1. For example, the player can move the stylus 17 on the touch panel 16 to draw an operation trace TR1 extending in the upper right direction starting from a position ahead of the player character PC and ending at a position near the block BL1. While the player is drawing the operation trace TR1, the operation trace TR1 is displayed on the screen starting from the start point to the current position at which the stylus 17 is being currently on the touch panel 16. Upon lifting the stylus 17 off the touch panel 16 (this will be referred to herein as "touch-off"), the position of the last contact point on the touch panel 16 is used as the position of the end point. As the player character PC comes close to the start point of the operation trace TR1, the player character PC will be attracted to the operation trace TR1 (as if an attractive force were acting on player character PC onto the operation trace TR1). This will be referred to herein as the "attracted state". In the attracted state, the player character PC is accelerated until it reaches a predetermined speed while moving along (parallel to) the operation trace TR1. The player character PC is brought out of the attracted state near the end point of the operation trace TR1, thus successfully getting on the block BL1. In the present embodiment, an attractive force is acted on the player character PC onto the operation trace TR1 in order to realize a game image in which the player character PC moves smoothly along the operation trace TR1 without coming off the operation trace TR1 even if the operation trace TR1 is a steep slope or an arc. Instead of making the player character PC be attracted to the operation trace TR1, a strong gravity may be acted on the player character PC toward the operation trace TR1 near the start point of the operation trace TR1. The term "attractive force" as used herein refers to a force that is present when the player character PC is in contact with an operation trace, whereas the term "gravity" as used herein refers to a force that is present even when the player character PC is not in contact with the operation trace. The gravity can be represented by, for example, a vector whose magnitude is in inverse proportion to the square of the distance between the position of the player character PC and the start point of the operation trace. By combining the obtained vector with the movement vector to be described later, it is possible to realize a game image as if the player character PC were attracted toward the start point of the operation trace.

In order to avoid an attack from the enemy character EC, the player can draw an arc-shaped or mountain-shaped operation trace TR2 starting from a point in front of the enemy character EC, whereby the player character PC can move on the operation trace TR2 without encountering (or hitting) the enemy character EC. The moving direction of the player character PC can be changed by the player based on the shape and direction of an operation trace. For example, when the player can move the stylus 17 on the touch panel 16 to draw an operation trace TR1' extending in the lower left direction starting from the end point of the operation trace TR1 and ending at the start point of the operation trace TR1. Then, as the player character PC comes close to the end point position (the lower left end) of the operation trace TR1', the player character PC is attracted to the operation trace TR1' and starts moving along (parallel to) the operation trace TR1'. However, since the player character PC is moving against the direction of the operation trace TR1', a decelerating force (i.e., an accelerating force in the direction opposite to the moving direction) acts on the player character PC. Therefore, as the player character PC starts climbing on the operation trace TR1', the player character PC is decelerated, and the player character PC will eventually start sliding down the operation trace TR1' and moving in the reverse direction. A gravity may be used instead of an attractive force also in such a case. A change can be made to the movement/action of the player character PC in other ways. For example, for a predetermined amount of time after the player touches directly on the player character PC with the stylus 17, the player character PC may be accelerated, spun, or made invulnerable to attacks from the enemy character EC.

The player may have some control of characters other than the player character PC. For example, when the player touches directly on the enemy character EC with the stylus 17, the enemy character EC may be halted temporarily so that the player character PC can pass through the place without being attacked by the enemy character EC. Where there is an obstacle (obstacle block) OA along the way keeping the player character PC from passing through, the player can destroy the obstacle OA so that the player character PC can pass through by touching directly on the obstacle OA with the stylus 17.

As described above, while the player uses the direction switch 15*a* and the action switches 15*d* and 15*e* in conventional video games for giving various instructions (rather indirectly), the player of the video game of the present embodiment can use the stylus 17 or the player's fingertip to draw the operation traces TR1 and TR2 directly on the touch panel 16 or to directly touch on a displayed object to which the player wishes to make an action (e.g., to accelerate the player character PC, temporarily halt the enemy character EC, or destroy the obstacle OA). Therefore, the video game of the present embodiment gives the player a more direct and more intuitive control of the game. This reduces the burden on the player to carefully read a manual booklet and study various control switch operations and familiarize himself/herself with the various control switch operations before the player can enjoy the game. Therefore, even a beginner can easily familiarize himself/herself with the gameplay and be able to enjoy the game.

The upper, sub-screen (the LCD 11) may include a small-scale map RMP, a display section DS1, a display section DS2, etc. The display section DS1 may show the remaining length of trace (i.e., how much more the player can draw an operation trace) or the remaining length of trace expressed in terms of an amount of ink (or a remaining amount of ink). The display section DS2 may show the map (or "stage") number, the collected items, the score, etc. The small-scale map RMP shows an entire stage or map that is currently being played (or a portion, e.g., ½, of the map if the map is very large) on a smaller scale in order to indicate wherein the map the player character PC currently is. The display section DS1 is provided for defining a limit on the length of an operation trace TR that can be drawn on the touch panel 16 in a single trace-drawing operation (or the total length of operation traces TR that can be present simultaneously). Otherwise, the player is allowed to draw as much an operation trace as the player wishes, which may make the game too easy.

Figure 4:
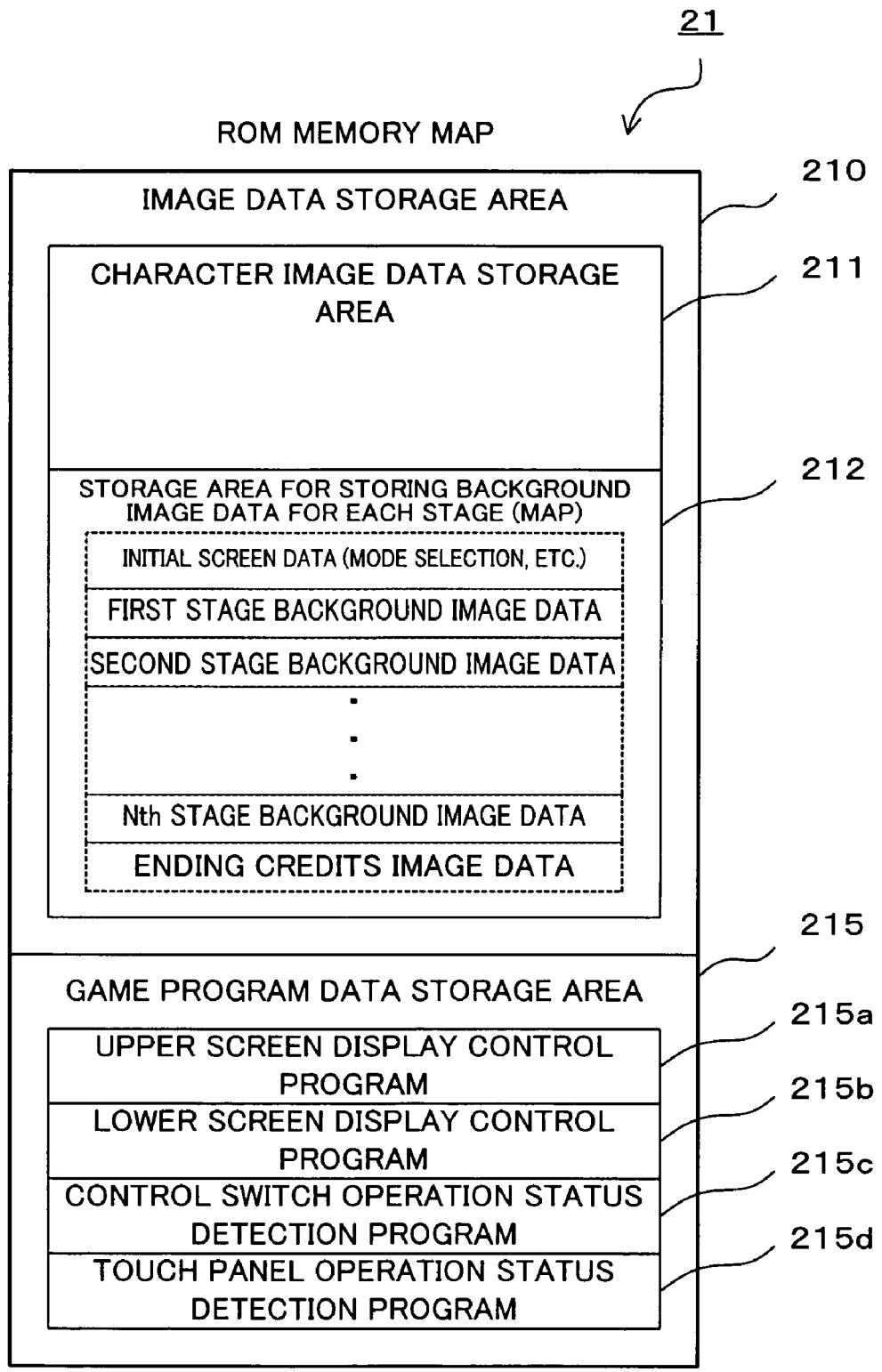
FIG. 4 is a memory map showing storage areas of a ROM 21.

FIG. 4 is a memory map showing data stored in the ROM 21. Referring to FIG. 4, the ROM 21 is generally divided into a storage area 210 and a storage area 215. The storage area 210 stores image data, and includes storage areas 211 and 212. The storage area 211 stores character image data ("character image data storage area"). Character images include those of moving characters such as the player character and the enemy characters, and those of other characters such as item characters. The player character is a moving character that can be controlled by the player, and is referred to also as the "player object" or the "moving character". The storage area 212 stores image data of the initial screen, the background of each stage (or "map"), the end credits, etc. The background may be an image of hills and fields, a cave, buildings, a dungeon, etc., through which the player character can move.

In the present embodiment, objects important to the gameplay (e.g., the background, moving characters such as the player character, the enemy character and the teammate character that can be directly or indirectly controlled by the player, and blocks that can be destroyed by the player) are displayed on the lower LCD 12, while images and information that assist the gameplay, such as the small-scale map, the score and the amount of ink, are displayed on the upper LCD 11. However, part of the auxiliary images and information may alternatively be displayed on the upper LCD 11.

The storage area 215 stores video game program data, and includes storage areas 215*a* to 215*d*. The storage area 215*a* stores a display control program for the upper screen. The storage area 215*b* stores a display control program for the lower screen. The storage area 215*c* stores a control switch operation status detection program. For example, the control switch operation status detection program is a program that detects, at short intervals, the direction input from the direction switch 15*a* and the amount of time over which the direction switch 15*a* is pressed for that direction (i.e., the amount of movement), and detects which one of the action switches 15*d* and 15*e* is being pressed. The storage area 215*d* stores a touch panel operation status detection program. At short intervals (e.g., for every frame period), the touch panel operation status detection program detects a position on the touch panel being pressed and temporarily stores the position data. At longer intervals (e.g., for every tens to hundreds of frame periods), the touch panel operation status detection program detects a change in the position data. For example, if the detected position data remains the same (or substantially the same) over time, it is determined that the touch panel is being pressed at a fixed position. If the detected position data gradually and continuously changes, it is determined that an operation trace is being drawn on the touch panel. The position and shape of the operation trace can be determined based on the amount of change in the X coordinate and that in the Y coordinate. The amount of movement (the amount or distance of scroll) may be determined based on a vector quantity obtained by combining together the amount of change in the X coordinate and that in the Y coordinate. Note that the processes of the programs stored in the storage areas 215*a* to 215*d* will later be described in detail with reference to FIG. 8 to FIG. 12.

Referring again to FIG. 2, based on a program stored in the ROM 21, the CPU core 31 reads out the initial screen data of a stage (or "map"), e.g., the initial (or start) screen image data for one stage number shown in the memory map of the ROM 21 of FIG. 4 (which may be image data only for the lower screen, or for both the lower screen and the upper screen), and transfers the data to the W-RAM 37. Moreover, the CPU core 31 transfers a program for producing/controlling an image on the upper screen from the ROM 21 to the GPU 35, and transfers a program for producing/controlling an image on the lower screen from the ROM 21 to the GPU 36. In response to this, the GPU 35 reads data from the W-RAM 37, produces data of an upper screen image, and writes the data of the upper screen image to be displayed on the LCD 11 to the V-RAM 38. Then, with predetermined timing, the GPU 35 reads the data from the V-RAM 38 and displays the upper screen image on the LCD 11. In parallel to this, the GPU 36 reads data from the W-RAM 37, produces data of a lower screen image, and writes the data of the lower screen image to be displayed on the LCD 12 to the V-RAM 39. Then, with predetermined timing, the GPU 36 reads the data from the V-RAM 39 and displays the lower screen image on the LCD 12.

Figure 5:
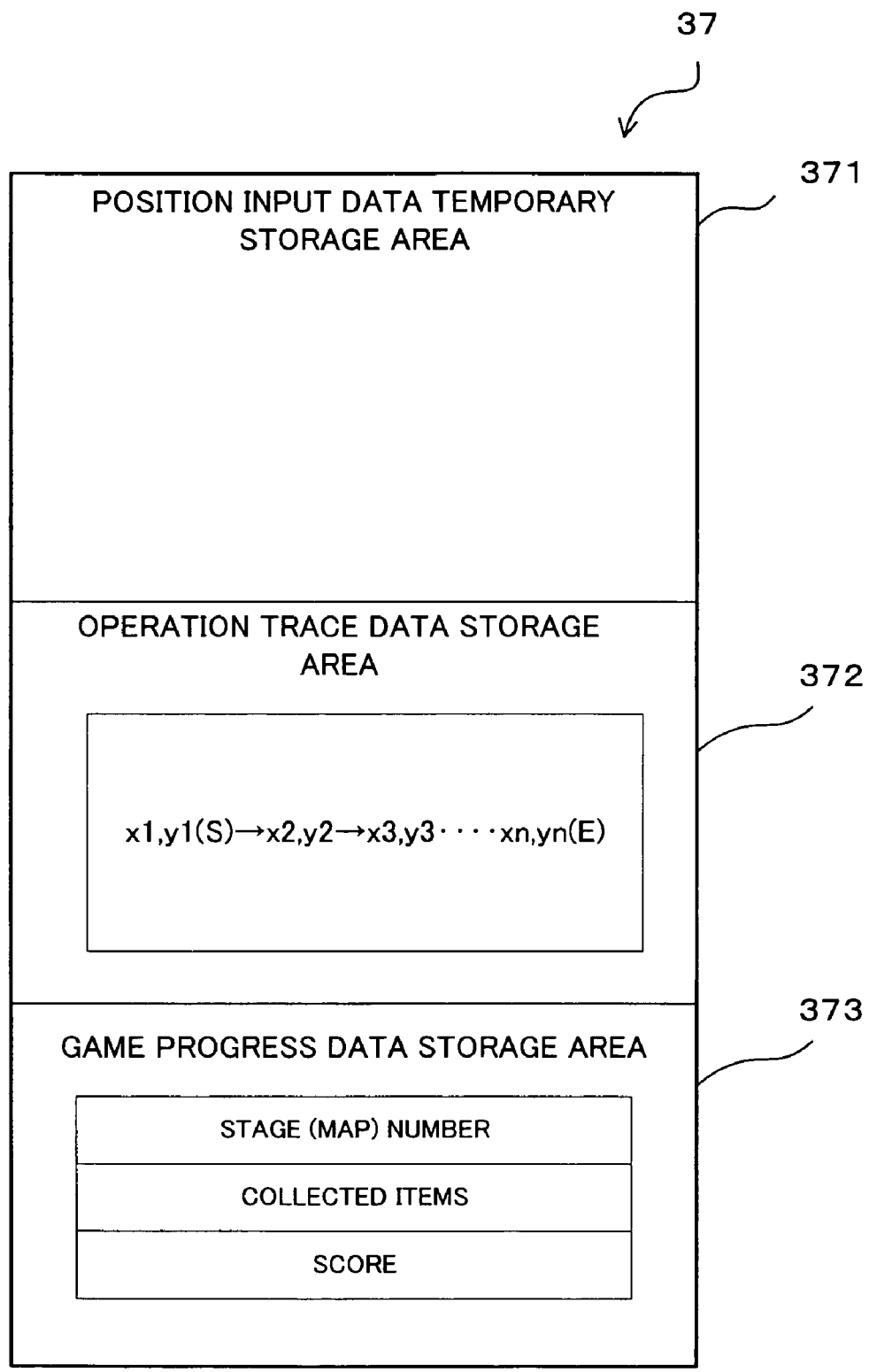
FIG. 5 is a memory map showing storage areas of a working RAM 37.

FIG. 5 shows storage areas of the working RAM 37. The working RAM 37 includes storage areas 371 to 373. The storage area 371 temporarily stores the position data obtained from the touch panel 16 for every unit amount of time, and is controlled by a first-in first-out method. Where the position data is obtained from a player's single stroke of the stylus 17 on the touch panel 16, the storage area 372 stores a series of positions (the coordinates of each position) from touch-on until touch-off. As a result, the storage area 372 stores data of an operation trace, representing the shape of the operation trace. The storage area 373 is an area for storing data relating to the progress of the game, and stores backup data such as the numbers of the stages (maps) that have been completed, the collected items and the score, and also has other data temporarily stored therein (e.g., the position data of the player character PC, the moving velocity data (moving velocity vector data including the moving velocity data in the X direction and the moving velocity data in the Y-direction), the attractive force data, the ink amount data, data of the normal line to the operation trace TR, the scroll speed or the scroll offset value of the background, etc.).

Figure 6A:
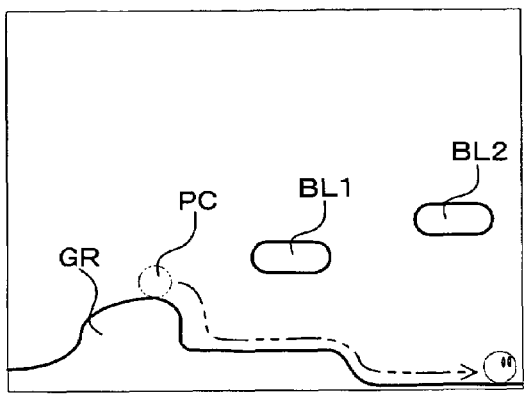
FIG. 6A to FIG. 6E show how the game screen (lower screen) changes according to an embodiment.
Figure 6D:
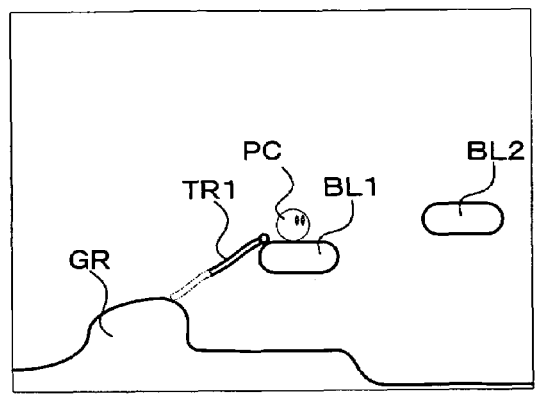
Figure 6B:
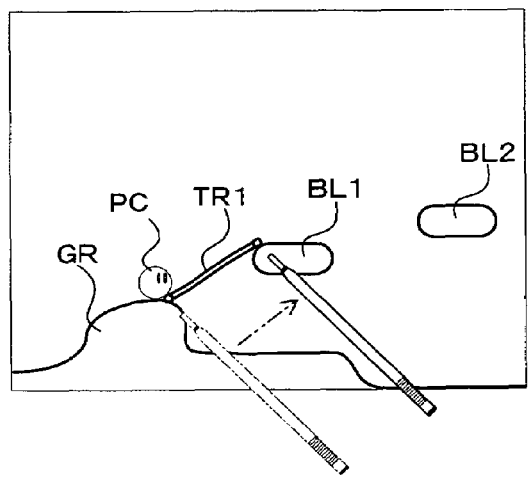
Figure 6E:
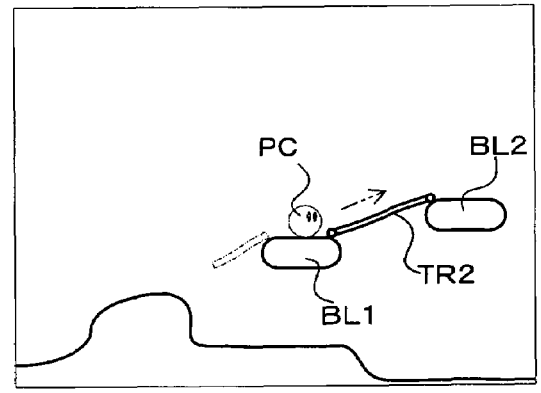
Figure 6C:
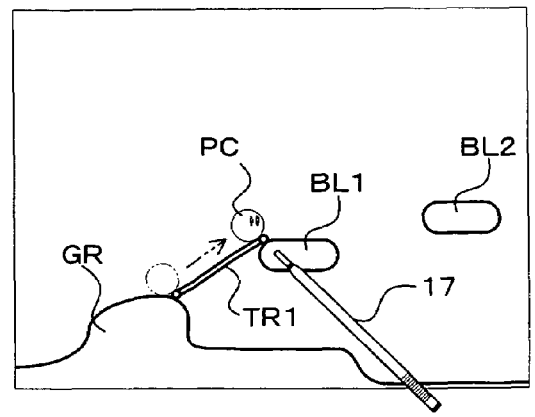

FIG. 6A to FIG. 6E show how the game screen changes according to an embodiment. While the player makes no operation, the player character PC moves by an inertial force or in a self-propelled manner along the terrain (or the ground) GR in the background image, as shown in FIG. 6A. When the player wishes to make the player character PC climb onto the floating block (or island) BL1 from the bump on the ground, the player draws a straight (or arc-shaped) operation trace TR1 extending from a point on the ground GR in front of the player character PC to the block BL1, as shown in FIG. 6B. As the player character PC comes into contact with (or comes close to) the start point of the operation trace TR1, the player character PC is attracted to the operation trace TR1 and moves along the operation trace TR1, as shown in FIG. 6C. The player character PC moves up along the operation trace TR1 irrespective of the inclination angle of the operation trace TR1, and is brought out of the attracted state at the end position of the operation trace TR1, thus getting on the block BL1. Then, the operation trace TR1 starts being gradually erased from the start point toward the end point, as shown in FIG. 6D, after the passage of a predetermined amount of time from when the player ends drawing the operation trace TR1 (or from when the player starts drawing the operation trace TR1). If the player wishes to move the player character PC onto the next block BL2, the player can draw the operation trace TR2 extending from the block BL1 to the block BL2, as shown in FIG. 6E. Then, the player character PC moves on the operation trace TR2 from the block BL1 to the block BL2. The first operation trace TR1 may be completely erased before the next operation trace TR2 is displayed so that a plurality of operation traces TR1 and TR2 are not displayed at the same time, or the operation trace TR1 may start being gradually erased from the start point toward the end point when the start point of the operation trace TR2 is rendered on the screen. Alternatively, operation trace information of an operation trace may include lifetime information representing the lifetime of each segment (or each of the starting end and the terminal end thereof). The lifetime is a predetermined amount of time (e.g., one second) measured from when the segment is stored in the W-RAM 37. Then, information of a segment (or each of the starting end and the terminal end thereof) can be erased from the W-RAM 37 upon termination of the lifetime of the segment.

Figure 7A:
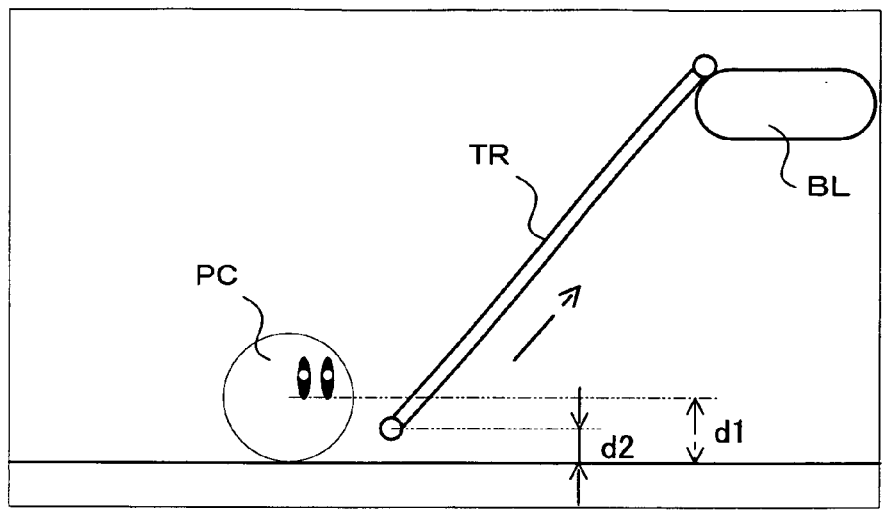
FIG. 7A to FIG. 7C each show the relationship between the player character and an operation trace as the display on the game screen changes.
Figure 7B:
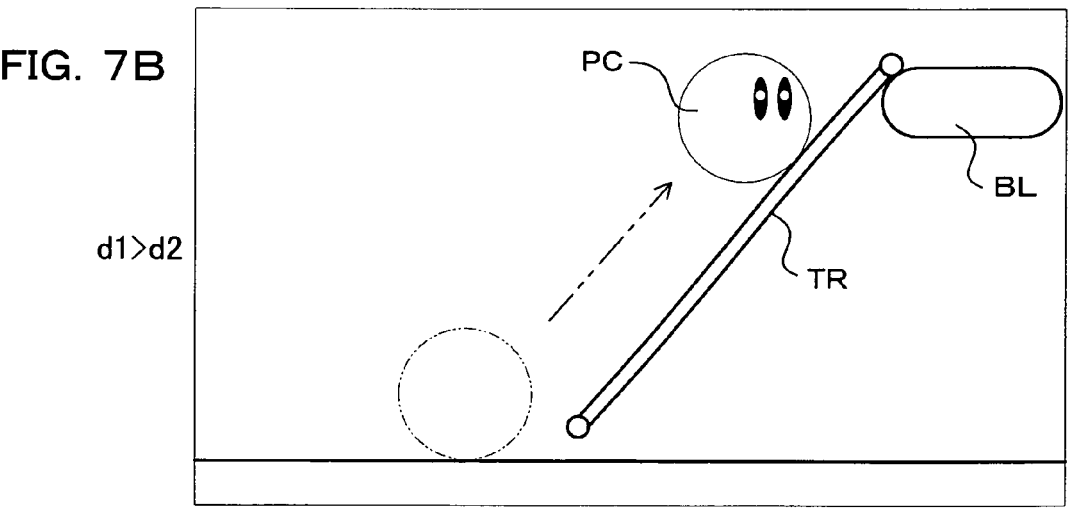
Figure 7C:
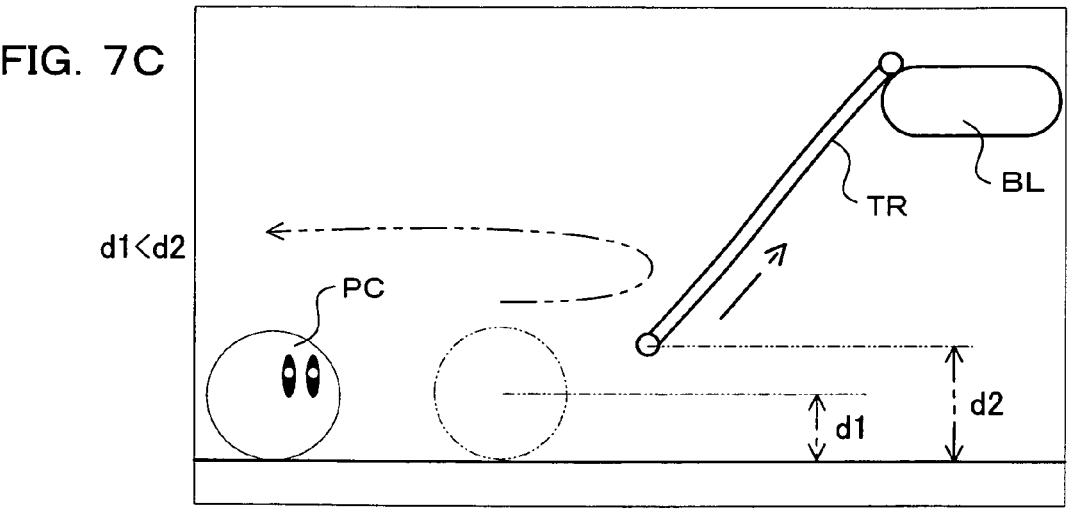

FIG. 7A to FIG. 7C each show the relationship between the player character and an operation trace as the display on the game screen changes. Depending on the relationship between the height of the player character PC and the position of the start point of the operation trace TR, it may look awkward to see the player character PC get onto the operation trace TR. Therefore, the player character PC may collide with the operation trace TR and change its moving direction in some cases, instead of moving (or climbing) on the operation trace TR while being attracted to the operation trace TR. The determination can be made as follows. For example, it may be determined that the player character PC can get onto and move (climb) on the operation trace TR as shown in FIG. 7B if $d1 > d2$ or $d1 = d2$, where $d1$ is the vertical distance between the ground and the center of the player character PC, and $d2$ is the vertical distance between the ground and the start point of the operation trace TR (see FIG. 7A). If $d1 < d2$, in which case the player character PC getting onto the operation trace TR may look awkward, it may be determined that the player character PC collides with the operation trace TR and reverses its moving direction as shown in FIG. 7C. Instead of the vertical distance between the ground and the center of the player character PC, $d1$ may alternatively be the vertical distance (or an approximate value thereof) between the ground and the periphery of the player character PC, or a nearby value obtained by adding an offset thereto.

For an operation trace having the same shape as that of the operation trace TR shown in FIG. 7A but with the start point and the end point switched around, i.e., an operation trace similar to the operation trace TR but extending in the lower left direction, it may be determined that the operation trace has been drawn by the player as an instruction to reverse the moving direction of the player character PC from rightward to leftward even if $d1 > d2$ or $d1 = d2$ (i.e., not $d1 < d2$). In such a case, the moving direction of the player character PC is reversed as is when $d1 < d2$ upon detecting that the operation trace TR is extending in the lower left direction. More preferably, the player character PC starts climbing the operation trace TR of the reverse direction but is then gradually decelerated and eventually starts moving in the reverse direction.

If the moving direction and the moving velocity of the player character PC are varied in view of the relationship between the player character PC and the operation trace TR as described above, the movement of the player character PC can be made natural to the player's eyes without awkwardness.

Figure 8:
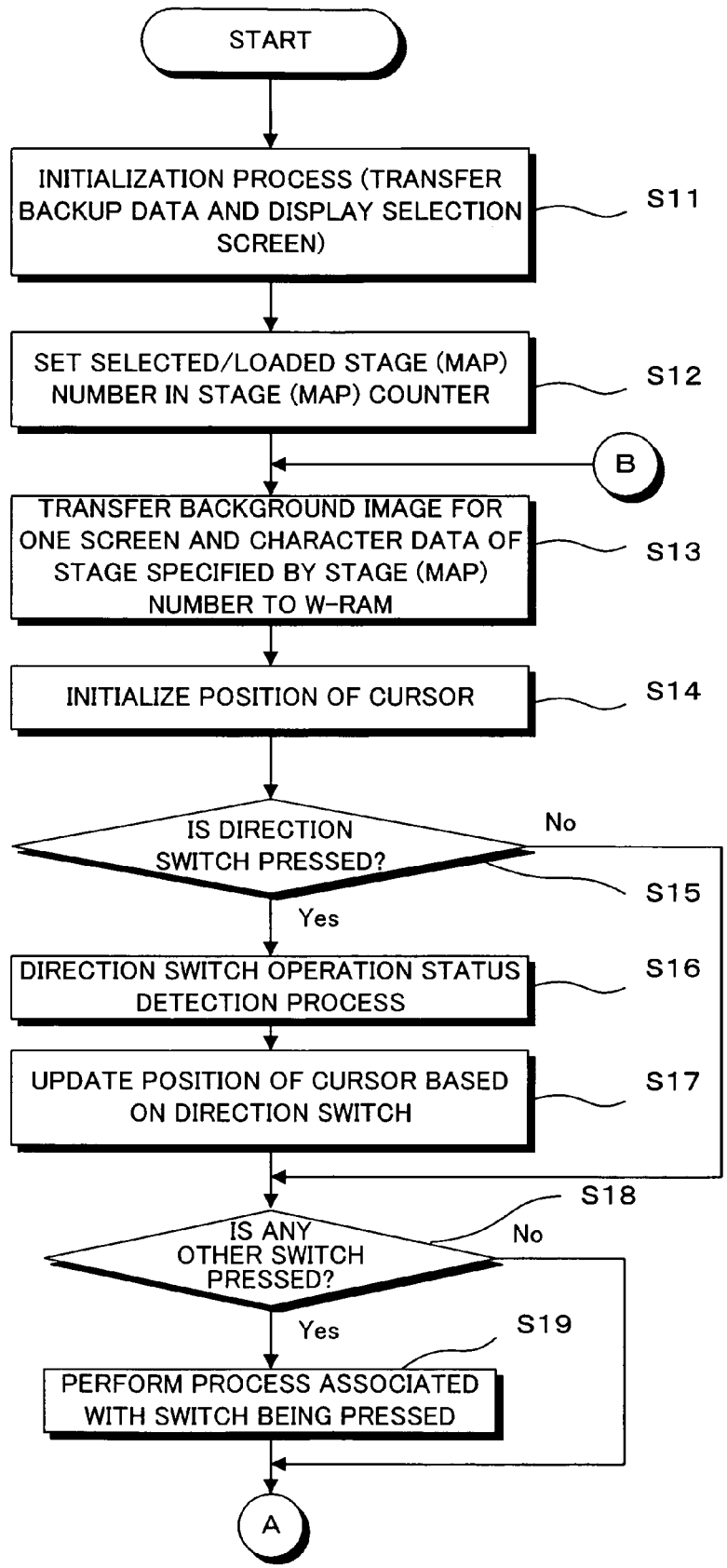
FIG. 8 shows the first half of a flow chart of a main routine of a game process according to an embodiment.
Figure 9:
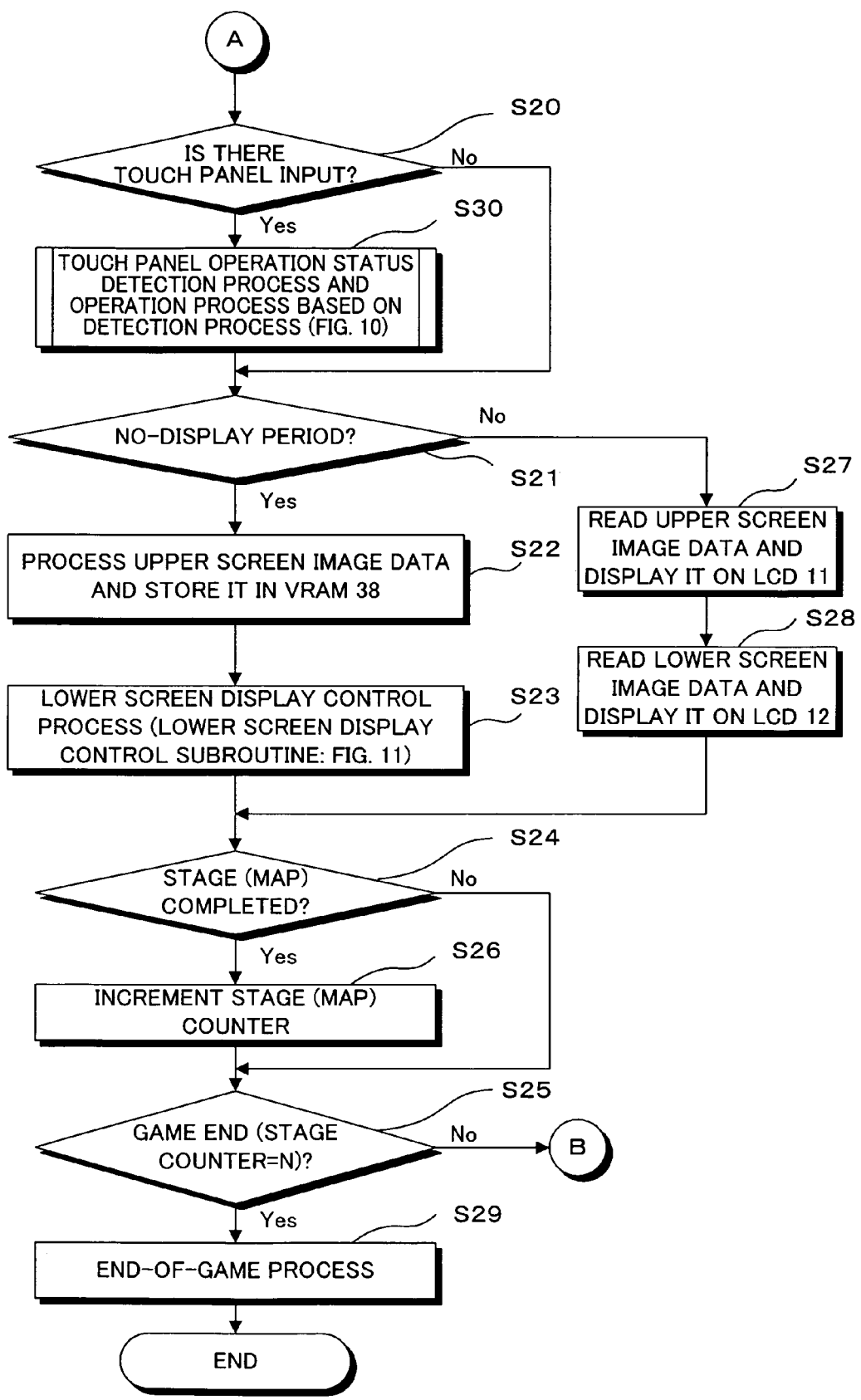
FIG. 9 shows the second half of the flow chart of the main routine of the game process according to an embodiment.
Figure 10:
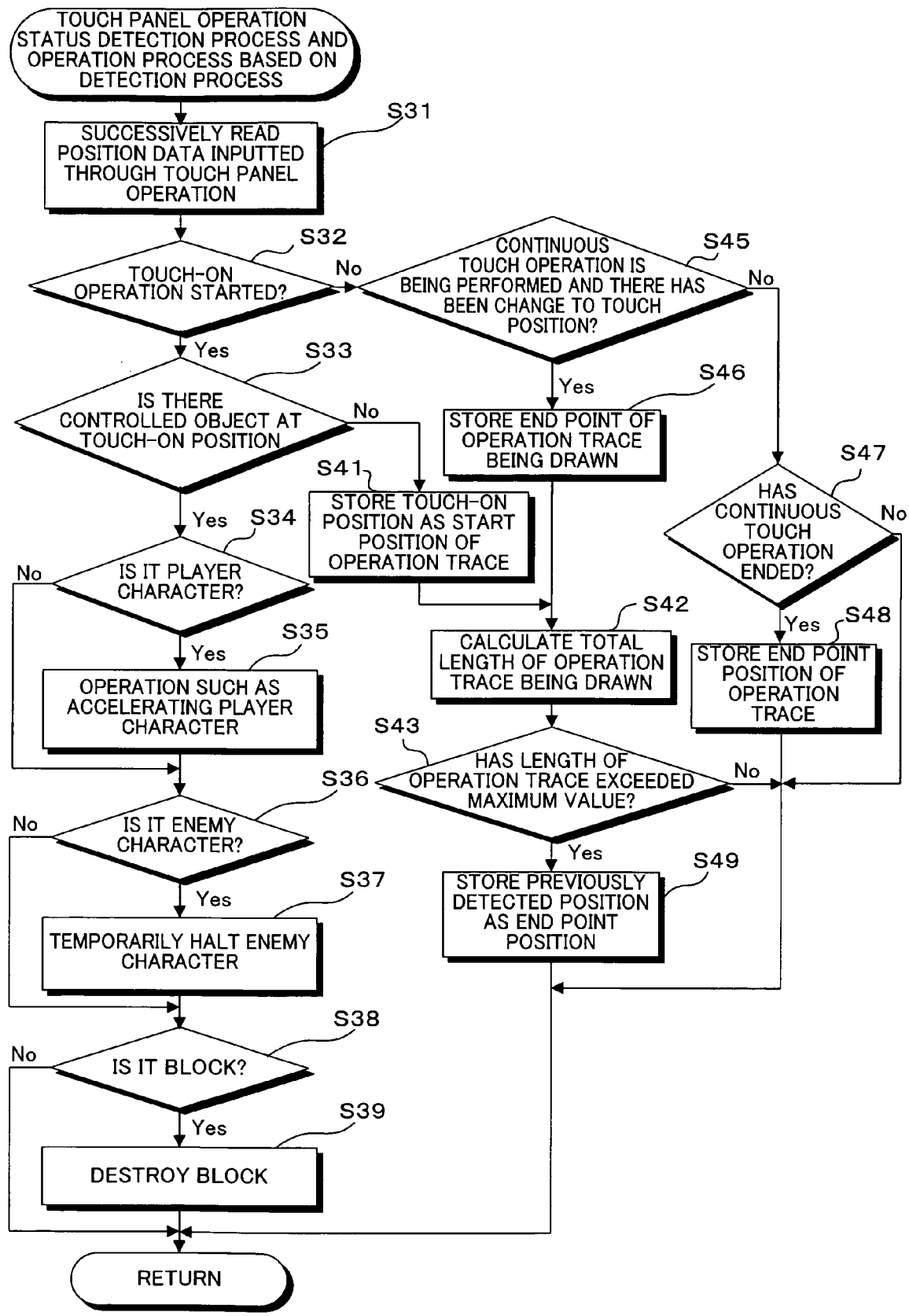
FIG. 10 is a flow chart showing a touch panel operation status detection process and an image processing operation based on the touch panel operation status detection process.
Figure 11:
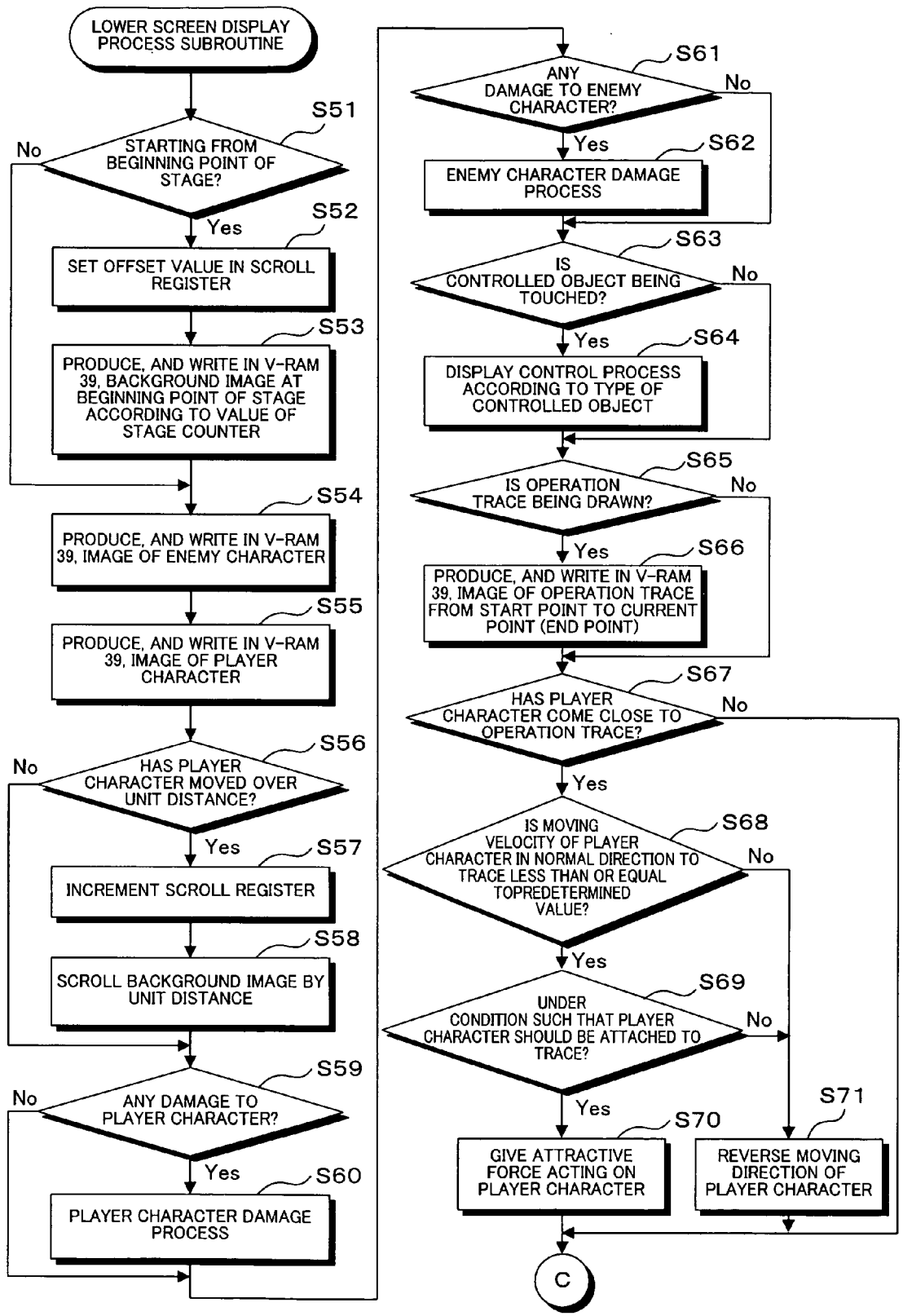
FIG. 11 is the first half of a flow chart of a subroutine of a lower screen display control process.
Figure 12:
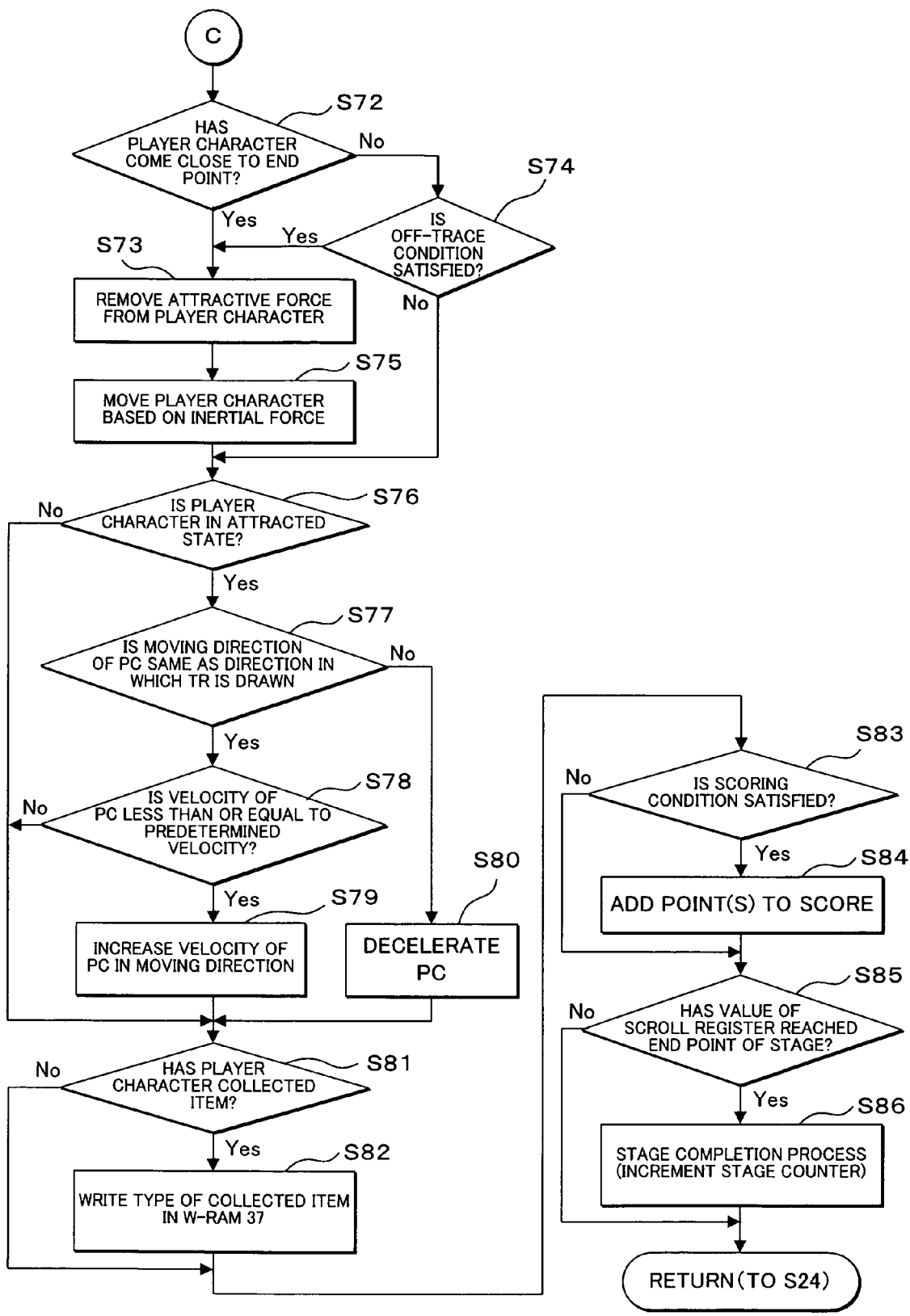
FIG. 12 is the second half of the flow chart of the subroutine of the lower screen display control process.

FIG. 8 to FIG. 12 are flow charts showing an operation of the video game (video game software) of the present embodiment. Specifically, FIG. 8 and FIG. 9 show the main routine, FIG. 10 shows the touch panel operation status detection process in detail, and FIG. 11 and FIG. 12 show the lower screen display control operation (the subroutine of the lower screen display control program) in detail. Referring to FIG. 1 to FIG. 12, the game images of FIG. 3, FIG. 6A to FIG. 6E and FIG. 7A to FIG. 7C will now be described.

When the power switch (not shown) is turned on, the CPU core 31 starts the following process based on the programs stored in the storage area 215 of the ROM 21. First, in step 11 (referred to as "S11" in the figures), an initialization process is performed. For example, the initialization process may include initializing (clearing) the W-RAM 37 and the V-RAMs 38 and 39 and then reading the backup data (data representing the previous progress in the game, e.g., the numbers of stages that have been completed so far and the score at the end of the previous gameplay) stored in the S-RAM 25 and writing the backup data to the game progress data storage area 373 of the W-RAM 37. Moreover, an initial prompting screen is displayed to prompt the user to determine whether to start from the first stage (stage number 1) or to start from the last stage of the previous gameplay. The prompting screen may also give the player an opportunity of selecting a desired difficulty level, for example. In step 12, the selected stage (or "map") number (the stage or map number "1" if the player is playing the game for the first time) is set in a stage (or "map") counter or a register (being an area of the W-RAM 37 although not shown in the figures). The preparation for the gameplay is performed as described above.

Then, in step 13, the background image data and the character data of a stage specified by the stage number set in the stage counter are read from the ROM 21 and written to the storage areas 371 and 373 of the W-RAM 37. In step 14, the position data of the cursor is initialized. Note however that this process is for cases where a pointing device such as a mouse, instead of the touch panel 16, is used to control the character and/or draw the operation trace TR, and it is omitted where the position input operation is performed solely with the touch panel 16.

In step 15, it is determined whether or not the direction switch 15a is being pressed, and the process proceeds to step 16 if the direction switch 15a is being pressed, and to step 18 otherwise. In step 16, the status of the direction switch 15a is detected. For example, the keycode of one of "up", "down", "left" and "right" of the direction switch 15a being pressed by the player is read and temporarily stored in an internal register (not shown). In step 17, the current position of the cursor is changed based on the operation of the direction switch 15a. In step 18, it is determined whether or not any of the other switches, i.e., the control switches 15b to 15e, 15L and 15R, is being pressed. If any of the control switches 15b to 15e, 15L and 15R is being pressed, the process proceeds to step 19, where a process associated with the switch being pressed is performed, after which the process proceeds to step 20. If it is determined that none of the control switches 15b to 15e, 15L and 15R is being pressed, the process proceeds to step 20. As described above, if any of the direction switch 15a and the control switches 15b to 15e, 15L and 15R is pressed, the associated process is performed.

In step 20, it is determined that there is a position input on the touch panel 16. If there is a position input on the touch panel 16, the process proceeds to step 30, where the touch panel operation status is detected and an image processing subroutine based on the detection is performed. The operation will be described later with reference to FIG. 10.

Then, during the no-display period (vertical blanking interval) of the LCD 11 and the LCD 12, steps 21 to 23 are performed. In step 21, it is determined that if it is a no-display period of the LCD 11 and the LCD 12. If it is a no-display period, the process proceeds to step 22, where image data to be displayed on the upper screen is processed by the CPU core 31 and the GPU 35 together based on the upper screen image display control program. For example, when the upper screen image data (the image display program data and the character data) is read from the W-RAM 37 and given to the GPU 35, the GPU 35 produces bitmap image data for the entire upper screen. Then the V-RAM 38 is overwritten with the produced image data. Thus, image data (bitmap data) for the entire upper screen is temporarily stored in the V-RAM 38. In step 23, the lower screen image processing operation (display control process) is performed by the CPU core 31 and the GPU 36 together based on the lower screen image display control program. The lower screen display control process will later be described in detail with reference to the flow chart of the subroutine shown in FIG. 11.

In step 24, it is determined whether or not the stage completion condition is satisfied. If it is determined that the stage has not bee completed, the process proceeds to step 25, where it is determined whether or not the game has come to an end. The end-of-game condition is detected based on if the stage counter has reached the maximum stage number (N) or based on a game-over condition (e.g., whether the time limit for completing a stage has elapsed). If the stage completion condition is not satisfied as determined in step 24 and if the end-of-game condition is not satisfied as determined in step 25, the process returns to step 13. Then, steps 13 to 25 and steps 27 and 28 to be described later are repeated at regular intervals.

If it is determined in step 21 that it is not a no-display period of the LCD 11 and the LCD 12 (i.e., during a display period), the process proceeds to step 27. In step 27, the GPU 35 reads data from the V-RAM 38 at the display timing of the LCD 11, whereby the upper screen image data is successively read in a frame period in synchronism with a frame scan, thus displaying the upper screen image on the LCD 11. In parallel to this, in step 28, the GPU 36 reads data from the V-RAM 39 at the display timing of the LCD 12, whereby the lower screen image data is successively read in a frame period in synchronism with a frame scan, thus displaying the lower screen image on the LCD 12. As described above, the upper screen image is displayed on the LCD 11, and the lower screen image is displayed on the LCD 12.

Referring now to FIG. 10, the touch panel operation status detection and the image processing subroutine based on the detection will be described. In step 31, position data is read from the touch panel 16 and written at addresses of the storage area 371 by a first-in first-out method. Specifically, in this step, the position data representing the position of the stylus 17 being moved on the touch panel 16 is written in the storage area 371 at regular intervals (or for every unit amount of time). Even if the stylus 17 is held at the same position on the touch panel 16, the position data is written at regular intervals. In step 32, it is determined whether or not a touch-on operation has just started. If so, the process proceeds to step 33, where it is determined whether or not there is a controlled object, i.e., the player character PC, the enemy character EC or the obstacle OA, at the touch-on position. If so, the process proceeds to step 34, where it is determined whether or not the object being touched is the player character PC. If so, the process proceeds to a process of accelerating the player character PC or a process of making the player character PC invulnerable. The acceleration process may be a process in which the player character PC is spun or, if player character PC has legs, a process in which the legs of the player character PC are moved alternately at a high speed, in order to make it look like the player character PC is moving at a high speed. The process of making the player character PC invulnerable may be, for example, a process of setting the invulnerability flag, which indicates whether or not the player character PC is being invulnerable. The player character PC being invulnerable is not damaged even if the player character PC contacts an enemy character. In step 64 to be described later, the player character PC being invulnerable is shown to be surrounded by a barrier based on the invulnerability flag being set. Thereafter, or if it is determined in step 34 that the object being touched is not the player character PC, the process proceeds to step 36, where it is determined whether or not the object being touched is the enemy character EC. If so, the process proceeds to step 37, where a process of temporarily halting the enemy character EC is performed. Thereafter, or if it is determined in step 36 that the object being touched is not the enemy character EC, the process proceeds to step 38, where it is determined whether or not the object being touched is the obstacle block OA. If so, the process proceeds to step 39, where a process of destroying the obstacle block OA is performed. As described above, if there is a controlled object that can be controlled by the player at the touch-on position, how the controlled object is displayed is changed depending on the type of the controlled object. Then, the process returns to the main routine.

If it is determined in step 33 that there is no controlled object at the touch-on position, it is regarded as being a player's input of the start point position of an operation trace TR and the process proceeds to step 41. In step 41 (where it has been determined that the touch-on operation has just started and that there is no controlled object at the touch-on position), the touch-on position is stored in the storage area 372 as the start point position (P1=Ps=x1,y1) of the operation trace TR. In step 42, the total length of the operation trace TR being drawn is calculated. Immediately after the start point position is inputted, the length of the operation trace TR is zero. In step 43, it is determined whether or not the total length of the operation trace TR has exceeded the maximum length allowed for one stroke (or the maximum length possible for the remaining amount of ink displayed in the display section DS1). If not, the process returns to the main routine.

Then, the touch panel operation process subroutine is performed again. In step 32 described above, it is determined that it is not the beginning of a touch-on operation, and the process therefore proceeds to step 45. In step 45, it is determined whether or not a continuous touch operation is being performed and there has been a change to the touch position. If it is determined that there has been a change to the touch position during a continuous touch operation, the process proceeds to step 46, where the end point of the operation trace TR being drawn is written to and temporarily stored in the storage area 372. In step 42, the length of the operation trace TR being drawn is calculated. Specifically, the length calculated based on the change in coordinates (dx,dy) between the previous position (start point position) and the current position (P2=x2,y2) is added to the previously calculated length. In step 43, it is determined that the calculated length of the operation trace has not exceeded the maximum length, and the process therefore returns to the main routine. Then, each time there is a change to the touch position for drawing the operation trace TR, steps 31, 32, 45, 46, 42 and 43 are repeated. Thus, the position data (P3=x3,y3, P4=x4,y4, . . . , Pn−1=xn−1,yn−1) of detected points along the operation trace TR are successively stored in the storage area 372.

When the player lifts the stylus 17 off the touch panel 16 to end the touch operation, it is determined, in step 45 during the loop of steps 31, 32, 45, 46, 42 and 43, that a continuous touch operation is not being performed and that there is no change to the touch position, whereby the process proceeds to step 47. In step 47, it is determined that a continuous touch operation has ended. Then, in step 48, the endpoint position (Pn=Pe=xn,yn) of the operation trace TR is stored in the storage area 372. Thus, a series of positions (P1 to Pn) of the operation trace TR from the start point position (P1=Ps) to the end point position (Pn=Pe) are stored in the storage area 372.

If the total length of the operation trace TR exceeds the maximum length allowed for the remaining amount of ink, it is determined so in step 43, whereby the previously detected position is stored as the end point position (Pe) in step 49. As described above, the positions of the operation trace TR are successively stored according to the touch operation on the touch panel 16. Then, the shape of the operation trace TR stored in the storage area 373 will be a straight line or a curved line approximated by straight segments each connecting adjacent points stored in the memory.

Referring now to the lower screen display control subroutine of FIG. 11 and FIG. 12, the flow of the gameplay as shown in FIG. 3, FIG. 6A to FIG. 6E and FIG. 7A to FIG. 7C will be described in detail. In step 51, it is determined whether or not the game is starting from the beginning point of a stage (or "map"). If so, the process proceeds to step 52, where an offset value is set in the scroll register (not shown), which is zero at the start of a stage. In step 53, the background image at the beginning point of a stage is produced according to the value of the stage counter. Specifically, the background image of one stage has a size in the scroll direction that is multiple times larger than that of an image displayed on the LCD 12 at once. The large background image data for one stage is stored in the W-RAM 37 as image data of different characters forming the background ("panels") and display position data that represents the pattern in which the panels are arranged. The CPU core 31 converts the image data into bitmap data based on the panels of different characters and the display position data to produce image data (bitmap data) of the background image for one screen, and writes the produced image data at an address in the V-RAM 39 corresponding to the display position. Thereafter, or if it is determined in step 51 that the game is not starting from the beginning point of a stage, image data of an enemy character for that stage indicated by the stage counter is produced and written as bitmap data at an address in the V-RAM 39 corresponding to the display position. In step 55, image data of the player character PC is produced and written as bitmap data at an address in the V-RAM 39 corresponding to the display position based on the position data. For some dot positions of the background image, the background image data is overwritten with the bitmap data of the enemy character EC. For some dot positions of the background image or the enemy character EC, the bitmap data of the background image or the enemy character EC is overwritten with the bitmap data of the player character PC. Thus, a background image BG, the enemy character EC and the player character PC to be displayed on one screen are written in the V-RAM 39. When reading image data of the lower screen in step 28, one screen of image data is selectively read out based on the value of the scroll register.

In step 56, it is determined whether or not the player character PC has moved over a unit distance, which is determined such that the background is scrolled when the player character PC moves over the distance. If it is determined that the player character PC has moved over the unit distance, the process proceeds to step 57, where the unit distance (e.g., one dot) is added to the scroll register, and to step 58, where a scroll process is performed (i.e., the background is moved or shifted in the scroll direction by the unit distance). Thereafter, or if it is determined in step 56 that the player character PC has not moved over the unit distance, the process proceeds to step 59, where it is determined whether or not there is any damage to the player character PC. If there is a damage to the player character PC, the process proceeds to step 60, where a player character damage process is performed (e.g., an impact on the player character PC is graphically expressed). Thereafter, or if it is determined in step 59 that there is no damage to the player character PC, the process proceeds to step 61, where it is determined whether or not there is any damage to the enemy character EC. If there is a damage to the enemy character EC, the process proceeds to step 62, where an enemy character damage process is performed (e.g., an impact on the enemy character EC is graphically expressed). As described above, the background scrolling process and the player character (enemy character) damage process are performed.

In step 63, it is determined whether or not a controlled object that can be controlled by the player (the player character PC, the enemy character EC or the obstacle block OA) is being touched with the stylus 17 on the touch panel 16. If so, the process proceeds to step 64, where a display process is performed, reflecting the results of step 35, 37 or 39. Steps 35, 37, 39 and 64 realize effects as follows. For example, if the player character PC is touched, the player character PC is spun so that it looks like the player character PC is moving at a high speed or a graphical effect is added to the player character PC to indicate the invulnerability of the player character PC. If the enemy character EC is touched, the enemy character EC is temporarily halted, for example. If the obstacle block OA is touched, the obstacle block OA is destroyed. Thus, a different display effect can be provided depending on the type of the character being touched.

Thereafter, or if it is determined in step 63 that no controlled object is being touched, the process proceeds to step 65, where an operation trace TR is being drawn. The determination is based on whether or not a touch-on operation is ongoing, i.e., whether or not an input position is stored in step 41 or 46 of FIG. 10. If it is determined that an operation trace TR is being drawn, the process proceeds to step 66, where an image of the operation trace TR is produced and the produced image data (bitmap data) is written in the V-RAM 39. The shape of the operation trace TR is a straight line or a curved line approximated by straight segments each connecting adjacent ones of a series of points starting from the start point position to the current point position (which is the end point position Pe if the stylus 17 has been lifted off the touch panel 16). For example, the operation trace TR is drawn with seven colors of a rainbow so that it looks like the player character PC is moving along a rainbow hanging in the air. Thereafter, or if it is determined in step 65 that an operation trace TR is not being drawn, the process proceeds to step 67.

In step 67, it is determined whether or not the player character PC has come close to any point along the operation trace TR (including the start point position Ps). If so, the process proceeds to step 68, where it is determined whether or not the moving velocity of the player character PC in the normal direction of the operation trace TR (i.e., the collision velocity) is less than or equal to a predetermined velocity. If so, the process proceeds to step 69, where it is determined whether or not a condition such that the player character PC should be attracted to the operation trace TR is being satisfied as described above with reference to FIG. 7A to FIG. 7C. If so, the process proceeds to step 70, where an attractive force is acted on the player character PC so that the player character PC will move along the operation trace TR while being attracted thereto. Since the player character PC moves along the operation trace TR while being attracted thereto, the player character PC apparently moves on and in parallel to the operation trace TR.

If the determination result is "No" either in step 68 or in step 69, it means that the player character PC cannot move along the operation trace TR, in which case the process proceeds to step 71, where the moving direction of the player character PC is reversed. This is done by reversing the moving velocity vector component of the player character PC in the normal direction of the operation trace TR.

Thereafter, or if it is determined in step 67 that the player character PC has not come close the operation trace TR, the process proceeds to step 72. In step 72, it is determined whether or not the player character PC has come close to the end point position Pe of the operation trace TR. If so, the process proceeds to step 73, where the attractive force is removed from the player character PC. Otherwise, the process proceeds to step 74, where it is determined whether or not a condition such that the player character PC should come off the operation trace TR is being satisfied. The condition is considered being satisfied when the moving velocity vector component of the player character PC away from the operation trace TR in the normal direction of the operation trace TR occurring when the operation trace TR is arc-shaped or has a corner (i.e., an accelerating force away from the operation trace TR resulting from a centrifugal force or an inertial force) has exceeded the attractive force. Then, the process proceeds to step 73, where the attractive force is removed. Then, in step 75, the player character PC is moved by the inertial force based on the moving velocity of the player character PC and the shape of the terminal end of the operation trace TR. For example, with a higher moving velocity, the player character PC will jump farther away off the end point of the operation trace TR due to the inertial force. With a lower moving velocity, hence a smaller inertial force, the player character PC will rather fall down off the end point of the operation trace TR in a parabolic track. If the operation trace TR has a sharp upward bend (e.g., an inverted V-shaped bent or a similarly curved bent), the player character PC will climb up the operation trace TR to jump off the bend and will then start falling down. In contrast, if the operation trace TR has a gentle parabolic shape protruding upward, the player character PC will climb up the operation trace TR and then slide down along the operation trace TR.

In step 76, it is determined whether or not the player character PC is in the attracted state. If so, the process proceeds to step 77, where it is determined whether or not the moving direction of the player character PC is the same as the direction in which the operation trace TR is drawn. If so the process proceeds to step 78, and to step 80 if the directions are opposite to each other. In step 78, it is determined whether or not the velocity of the player character PC is less than or equal to a predetermined velocity. If so, the process proceeds to step 79, where the velocity of the player character PC is increased in the moving direction. If it is determined in step 77 that the directions are opposite to each other, the process proceeds to step 80, where the velocity of the player character PC is decreased. Note that decreasing the velocity of the player character PC includes decreasing it to zero immediately.

In step 81, it is determined whether or not the player character PC has collected an item IT. If so, the process proceeds to step 82, where the type of the collected item IT is written in the storage area 373 of the W-RAM 37. In step 83, it is determined whether or not a condition such that a scoring condition is being satisfied. If so, the process proceeds to step 84, where a point or a number of points are added to the current score. In step 85, it is determined whether or not the value of the scroll register has reached a value that represents the end point of the stage. If not, the process returns to the main routine (step 24). The lower screen display control subroutine as described above is repeated at regular intervals to reflect the player's inputs on the touch panel 16 to the display. The image processed as described above is displayed on the lower LCD 12 in step 28.

If it is determined in step 85 that the value of the scroll register has reached a value that represents the end point of the stage, the process proceeds to step 86, where a stage completion process is performed. For example, the stage completion process may include incrementing the stage counter by one to move on to the next stage, storing backup data representing the gameplay upon the stage completion, and resetting the scroll register to an initial value. Thereafter, the process returns to the main routine to perform the game process for the next stage.

In the upper screen display process in step 22, the CPU core 31 reduces the entire map of the stage, a portion of which is being displayed on the lower LCD 12, to obtain bitmap data of the small-scale map of the entire stage, and writes the obtained bitmap data in the V-RAM 38, so as to realize a display as shown in FIG. 3. Moreover, the CPU core 31 obtains the remaining amount of ink in inverse proportion to the length of the operation trace TR drawn by the player to produce image data for a bar chart representation of the remaining amount of ink, and writes the produced image data to the V-RAM 38 (the amount of ink may alternatively be reduced by an amount in proportion to the length of the operation trace TR). The CPU core 31 also produces image data representing the collected items and the current score, and writes the produced image data to the V-RAM 38. The upper screen image data written to the V-RAM 38 are then read by the GPU 35 in step 27, and the produced images are displayed on the LCD 11 as shown in FIG. 3. The remaining amount of ink is displayed in the display section DS1 in order to indicate to the player the remaining length of the operation trace TR that can be drawn expressed in terms of the remaining amount of ink. The remaining length of the operation trace TR may alternatively be displayed in other ways. Alternatively, the total length of an operation trace or operation traces drawn on the screen may be displayed. Alternatively, there may be no such limit on the length of the operation trace TR.

If it is determined in step 25 that an end-of-game condition is being satisfied, the process proceeds to step 29, where the end-of-game process is performed. For example, in the end-of-game process, the gameplay data stored in the W-RAM 37 (e.g., various backup data including the stage number of the last stage completed and the score) is read out by the CPU core 31 and written to the S-RAM 25 of the memory card 20. Thus, a series of game process operations ends.

Figure 13A:
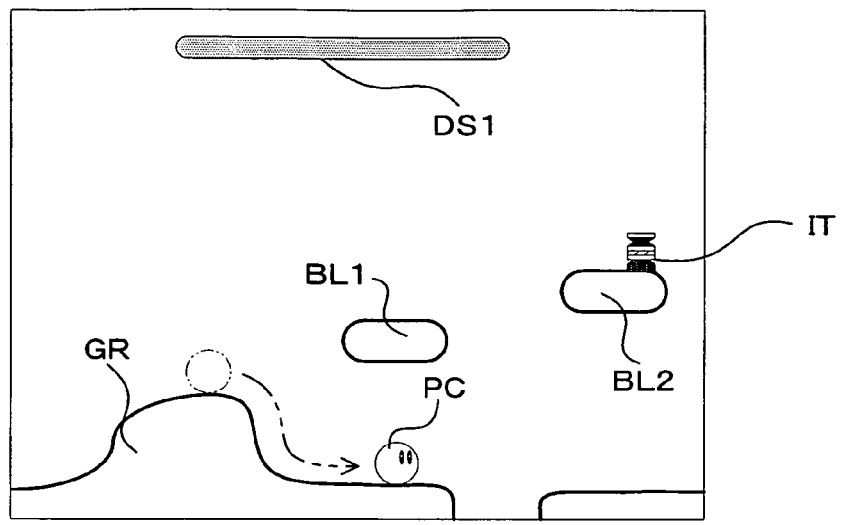
FIG. 13A to FIG. 13C show another example of how the display on the game screen changes according to the game process.
Figure 13B:
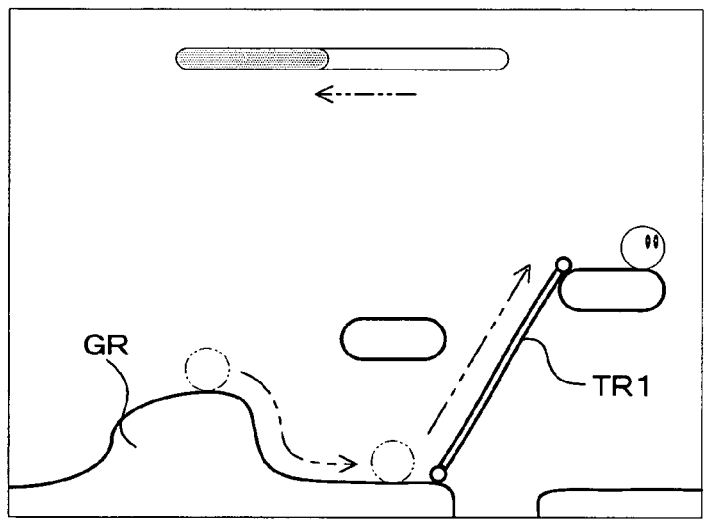
Figure 13C:
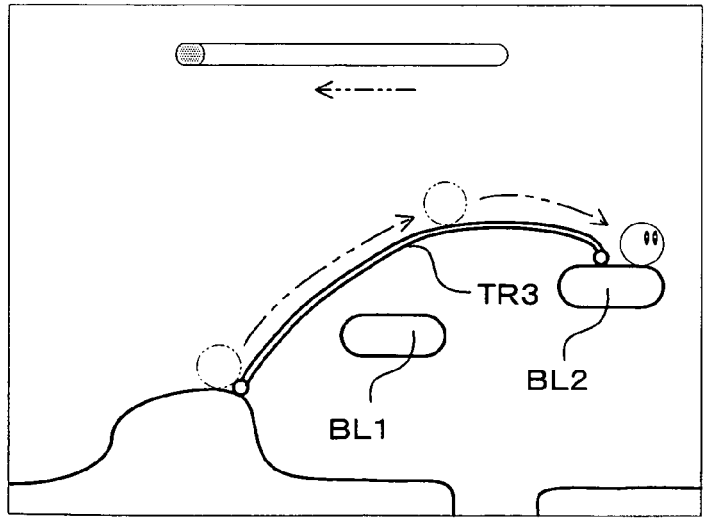

FIG. 13A to FIG. 13C show another example of what is displayed on the lower screen. While the remaining amount of ink is displayed on the upper screen in the examples of FIG. 3, FIG. 6A to FIG. 6E and FIG. 7A to FIG. 7C, it may alternatively be displayed on the lower screen. Referring to FIG. 13A, an item IT that increases the remaining number of lives of the player character PC may be placed on the block BL2, and the player can draw the operation trace TR to control the player character PC to collect the item IT. FIG. 13B shows a case where the player guides the player character PC onto the block BL2, thereby avoiding a pitfall. FIG. 13C shows a case where the player attempts to draw a long, arch-shaped (rainbow-shaped or mountain-shaped) operation trace TR3 extending from a small hill (where the player character PC is) over the block BL1 to the block BL2, thereby exhausting the ink. While operation traces can be used to control the moving direction of the player character PC as described above, operation traces can also be used for avoiding an attack from the enemy character EC by blocking the movement of the enemy character EC with the operation traces. It is understood that many variations may be devised as to how the player draws an operation trace TR and how it affects the displayed image and that any of such variations may be selected according to the situation in the gameplay.

While a dual-screen system including the upper screen and the lower screen has been described above, the present invention is also applicable to a single-screen system, in which case the game image of the above embodiment for the lower screen can be displayed on the single display screen. While the video game device or video game program of the present invention has been described above with respect to a portable LCD video game machine with a touch panel, the present invention is not limited thereto, but may be used as video game software for a home-console video game machine, an arcade video game machine, a personal computer or a portable telephone. In such a case, position inputting means or a pointing device such as a mouse or a trackball may be used instead of the touch panel.

Preferred examples of processes described above will be described in detail.

(Operation Trace Display Process)

Figures 14, 15:
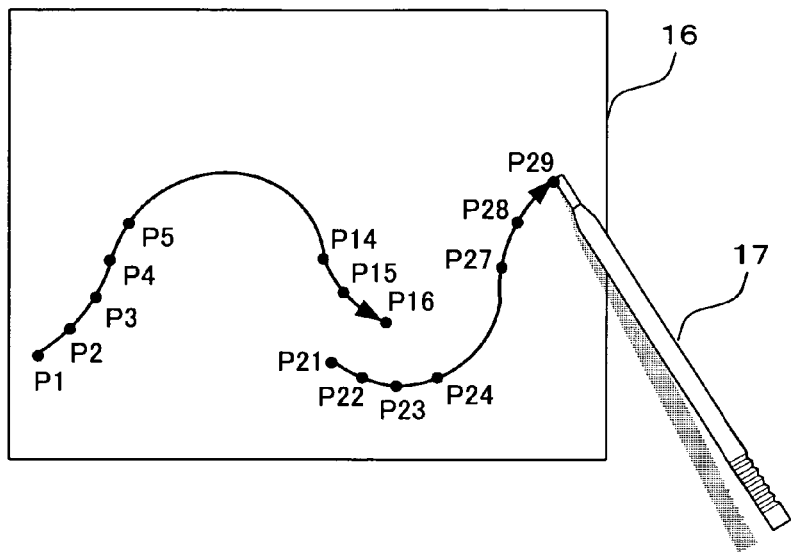
FIG. 14 shows examples of a series of input positions.
FIG. 15 shows an example of operation trace information.

A preferred example of the operation trace display process will now be described. In this example, the player slides the stylus 17 on the touch panel 16 from P1 to P16, lifts the stylus 17 off the touch panel 16, and again slides the stylus 17 on the touch panel 16 from P21 to P29, as indicated by arrows in FIG. 14. Then, operation trace information as shown in FIG. 15 is stored in the operation trace data storage area 372 of the W-RAM 37. Note that "P1", "P2", "P3", . . . , as used herein represent input positions that are detected periodically (e.g., for every frame) based on the output signal from the touch panel 16. In the operation trace information, an operation trace represents a line that is approximated by a plurality of straight segments, each of which is defined by an input position being the start point thereof and another input position being the end point thereof. For example, the operation trace P1-P16 of FIG. 14 is represented by 15 segments, and the operation trace P21-P29 of FIG. 14 is represented by eight segments. The operation trace information contains, for each segment, the trace number, the segment number, the start point position, the end point position, the tangent vector and the normal vector. The trace number is a number that identifies the operation trace to which the segment belongs. Therefore, segments of an operation trace that is drawn continuously (without lifting the stylus 17 off the touch panel 16) have the same trace number. Note that for a continuous operation trace with an acute-angle bend (specifically, an operation trace in which the angle between the tangent vectors (or the normal vectors) of two adjacent segments is greater than a threshold value), the first portion and the second portion of the operation trace with the acute-angle bend therebetween are assigned different trace numbers (i.e., the first portion and the second portion are treated as separate operation traces). The segment number is a number that identifies the segment among other segments of the same operation trace. The start point position of a segment is the position of one end of the segment that is inputted first. The end point position of a segment is the position of one end of the segment that is inputted later. The tangent vector of a segment is a unit vector indicating the direction in which the segment extends from the start point position to the end point position thereof. The normal vector of a segment is a unit vector obtained by rotating counterclockwise the tangent vector of the segment by 90 degrees. Note that the tangent vector and the normal vector can be calculated from the start point position and the end point position, and therefore do not need to be stored in the operation trace data storage area.

Information of segments successively added to the operation trace information (hereinafter referred to simply as "segment information") are successively erased in the order the segments are drawn. For example, the segment information can be erased according to the following methods.

In a first method, when a new operation trace is detected, the segment information of all the segments of an old operation trace are erased at once. According to the first method, referring to FIG. 15, the segment information of all the segments whose trace number is "1" are erased at once when a segment whose segment number is "1" and whose trace number is "2" is added.

In a second method, segment information of a segment may be erased from the operation trace information after elapse of a predetermined amount of time from when the segment information is registered in the operation trace information. According to the second method, referring to FIG. 15, segment information of different segments are successively erased in the order of segment number. For example, the elapse of a predetermined amount of time can be detected as follows. The time (or the frame number) at which segment information of a new segment is registered in the operation trace information can be stored associated with the segment information, whereby the time (or frame number) of registration of each segment can be compared with the current time (or current frame number).

Figure 16A:
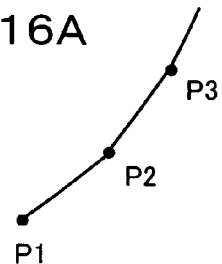
FIG. 16A to FIG. 16D show how an operation trace is gradually erased.
Figure 16B:
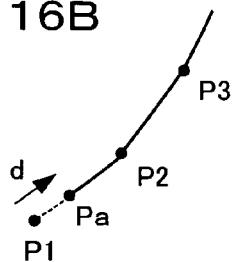
Figure 16C:
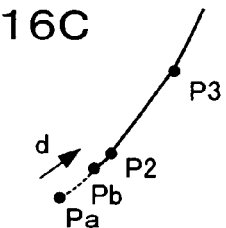
Figure 16D:
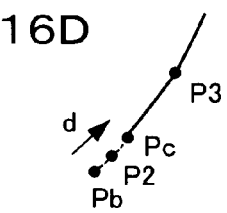

In a third example, segment information of segments of an operation trace are altered or erased successively so as to gradually shorten the operation trace by a predetermined length (by erasing a portion thereof from the start point side) at regular intervals after a predetermined wait period (e.g., two seconds) from when the player finishes drawing the operation trace (i.e., from when the player lifts the stylus 17 off the touch panel 16). Specifically, before two seconds elapse from when the player lifts the stylus 17 off the touch panel 16 at P16 (see FIG. 14), the segment information of the segment 1 is not altered or erased as shown in FIG. 16A. When one frame elapses, the start point position of the segment information of the segment 1 is altered from P1 to Pa as shown in FIG. 16B. As a result, the length of the operation trace is shortened by d. When another frame elapses, the start point position of the segment information of the segment 1 is altered from Pa to Pb as shown in FIG. 16C. As a result, the length of the operation trace is further shortened by d. When yet another frame elapses, the segment information of the segment 1 is erased while the start point position of the segment information of the segment 2 is altered from P2 to Pc as shown in FIG. 16D. As a result, the length of the operation trace is further shortened by d. With this method, d can be set to any value, whereby it is possible to arbitrarily determine the rate at which the operation trace is shortened.

Since any operation trace will be erased eventually, the player needs to draw an operation trace at an appropriate time in view of the current position of the player character PC, the moving velocity thereof, etc., thus increasing the playability of the game.

The end point of an operation trace is determined when the player lifts the stylus 17 off the touch panel 16 or when the "remaining amount of ink" parameter reaches zero (or when an operation trace being drawn is bent at an acute angle as described above). An example of how to control the "remaining amount of ink" parameter will now be described. At the start of the game, the remaining amount of ink is set to the maximum value. When the player slides the stylus 17 on the touch panel 16, the remaining amount of ink is reduced according to the amount of slide. The amount of slide can be obtained by calculating the sum of distances between pairs of the start point position and the end point position of the segment information as shown in FIG. 15 (or the remaining amount of ink may be decreased each time a new segment is produced by the length of the new segment). After the remaining amount of ink becomes zero while the player is sliding the stylus 17 on the touch panel 16, it is no longer possible to draw the operation trace. Then, even if the player keeps sliding the stylus 17 on the touch panel 16, no new segment information is added to the operation trace information.

Examples of how to recover the amount of ink, which has been decreased by drawing an operation trace will now be described.

In a first example, the remaining amount of ink is gradually recovered at a constant rate. For example, the remaining amount of ink can be recovered by 1/60 of the maximum value for every frame period. Alternatively, the rate at which the remaining amount of ink is recovered may be varied depending on whether or not the player character PC is in contact with the ground. Alternatively, the rate at which the remaining amount of ink is recovered may be varied depending on whether or not the stylus 17 is being off the touch panel 16. Alternatively, the remaining amount of ink may be recovered at a constant rate while the stylus 17 is being off the touch panel 16.

In a second example, the remaining amount of ink is recovered by a predetermined amount or to the maximum value when the player character PC collects a particular item (e.g., an ink bottle).

In a third example, the remaining amount of ink is recovered to the maximum value when the player lifts the stylus 17 off the touch panel 16.

By decreasing and recovering the remaining amount of ink as described above, the player needs to draw operation traces efficiently, thus increasing the playability of the game.

Figure 17:
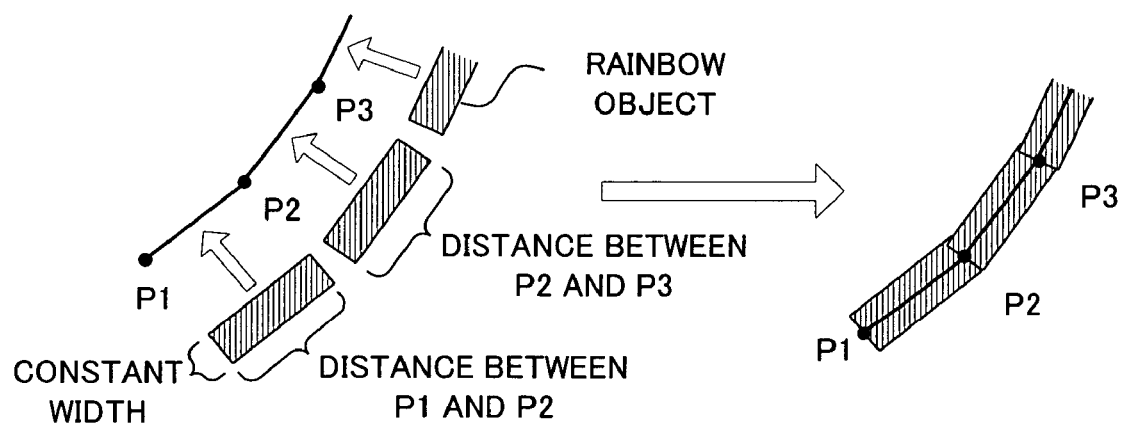
FIG. 17 shows an example of how an operation trace image is produced.

An image of an operation trace is produced and displayed on the LCD 12 based on the segment information of the operation trace information, which is added, altered and erased as described above. Specifically, a rainbow object having a generally rectangular shape is placed along each segment based on the segment information of the operation trace information for that segment as shown in FIG. 17, and a rainbow-colored texture is mapped onto each rainbow object, thereby producing an image of a rainbow-colored operation trace. The image of an operation trace is produced based on the segment information of the operation trace information as described above. Therefore, when the operation trace information is successively updated to gradually shorten the operation trace as shown in FIG. 16A to FIG. 16D, for example, the operation trace displayed on the LCD 12 will accordingly be shortened gradually. Alternatively, a flag may be used to indicate whether the segment information of a segment is valid, and flags for the segments may be reset successively, instead of successively erasing segment information from the operation trace information.

(Player Character Movement Process)

A preferred example of the process of moving the player character PC will now be described.

Figure 18:
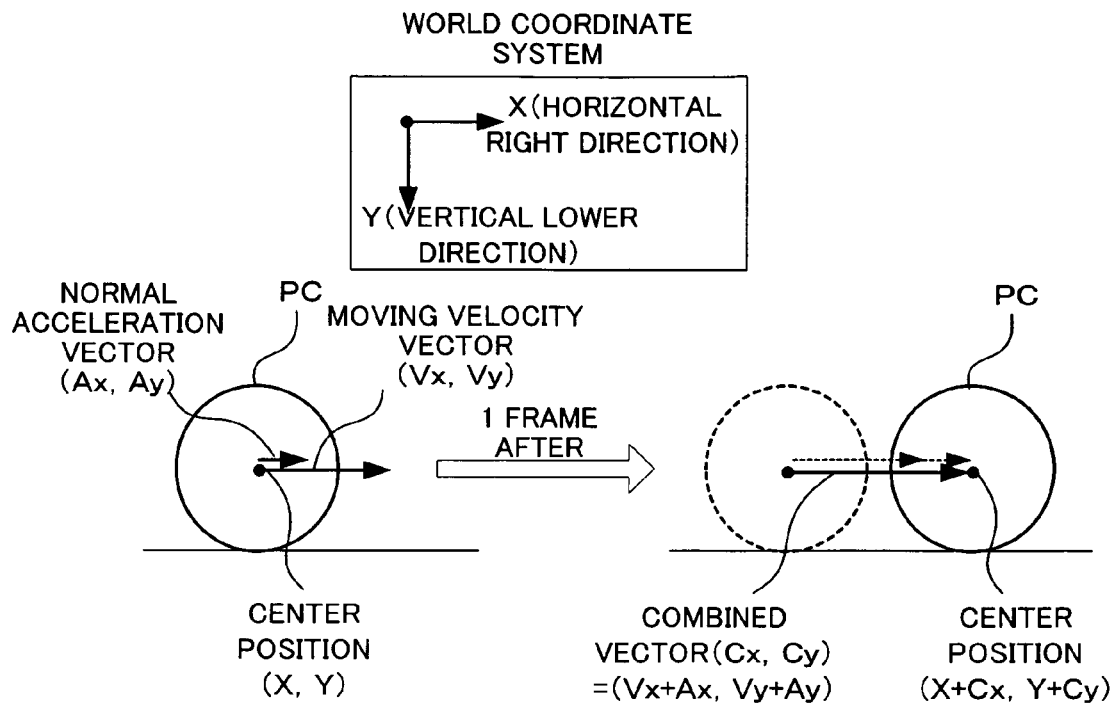
FIG. 18 shows an example of how the movement of a player character is controlled.
Figure 19:
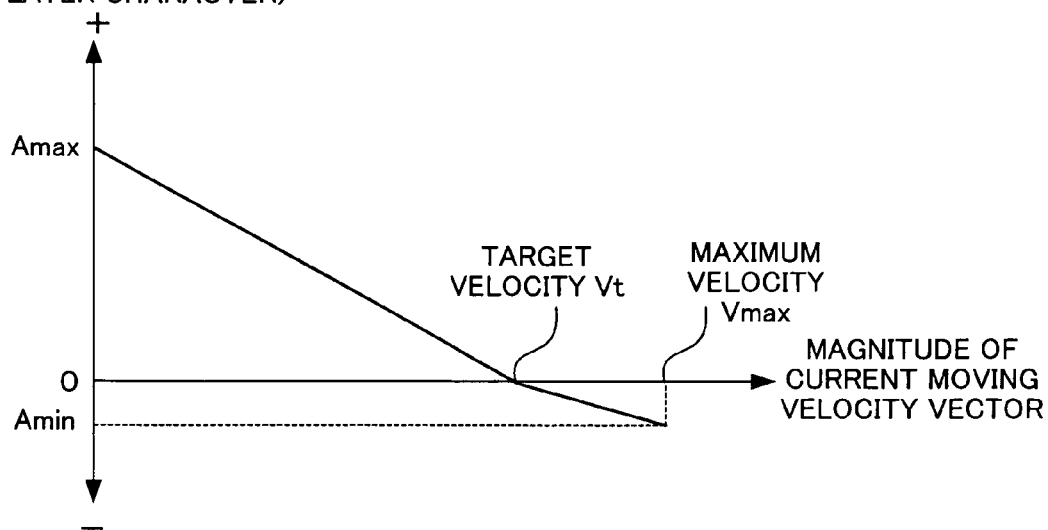
FIG. 19 shows how a normal acceleration vector is determined.

In an ordinary video game, the moving direction of a player character can easily be controlled by the player operating a direction switch such as the cross-shaped switch 15a. In contrast, the moving direction of the player character PC of the video game of the present embodiment cannot be controlled directly by the player with such an operation. In the video game of the present embodiment, the player character PC, being not in contact with an operation trace TR, is automatically controlled by a computer to move forward (i.e., to the right when the player character PC is facing right, and to the left when it is facing left) on the ground at a predetermined target velocity. Specifically, referring to FIG. 18, when the player character PC is on the ground, the center position (position data) of the player character PC is moved according to a combined vector obtained by adding a normal acceleration vector as shown in FIG. 19 to the moving velocity vector of the player character PC indicating the current moving direction and the current moving velocity (the combined vector will be used as the current moving velocity vector in the next frame). The player character PC has its "direction (right or left)". Referring to FIG. 19, if the normal acceleration vector is positive, the direction of the acceleration vector is the same as that of the player character PC, and if the normal acceleration vector is negative, the direction of the normal acceleration vector is opposite to that of the player character PC. Referring to FIG. 19, when the magnitude of the current moving velocity vector is less than the target velocity Vt, a normal acceleration vector is selected such that the player character PC is accelerated, and when the magnitude of the current moving velocity vector is greater than the target velocity Vt, a normal acceleration vector is selected such that the player character PC is decelerated. As a result, the moving velocity of the player character PC gradually approaches the target velocity Vt.

In the present embodiment, the player character PC is automatically controlled so as to move forward on the ground in a self-propelled manner only when the player character PC is on the ground. Alternatively, the player character PC may move in a self-propelled manner according to a predetermined algorithm also when the player character PC is in the air.

Figure 20:
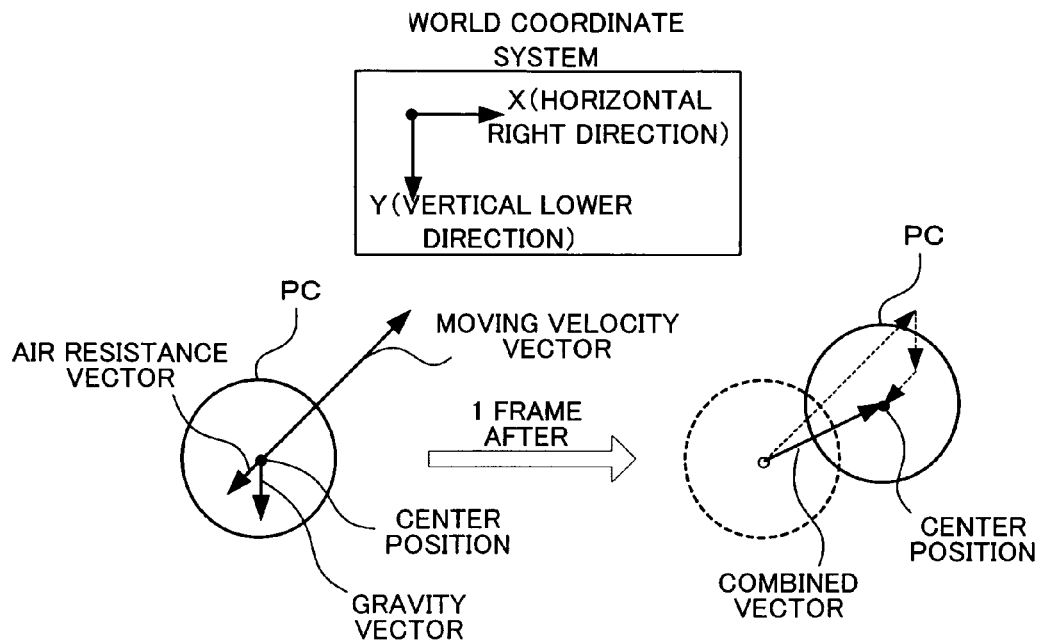
FIG. 20 shows an example of how the movement of a player character is controlled.

The player character PC basically behaves in the virtual space as if it were bound by physical laws of the real world except for the influence from the normal acceleration vector and the player's operation (instructing to accelerate or drawing an operation trace). Therefore, the moving direction and the moving velocity of the player character PC are determined, and the position thereof is controlled, while taking into account various factors such as the inertial force, the gravity, the centrifugal force, the air resistance, the buoyancy and the water resistance (it is of course not necessary to taken all of these factors into account). FIG. 20 shows an example of how the movement of the player character PC is controlled when the player character PC is moving in the air. Referring to FIG. 20, the moving direction and the moving velocity of the player character PC are influenced by the gravity and the air resistance. The influence of the gravity can be reflected by adding a vertically downward gravity vector to the moving velocity vector, and the influence of the air resistance can be reflected by adding an air resistance vector to the moving velocity vector. The air resistance vector has a magnitude in proportion to that of the moving velocity vector, and is oppositely oriented with respect to the moving velocity vector. Thus, the new center position of the player character PC is determined by adding a combined vector to the current center position, wherein the combined vector is obtained by combining together the current moving velocity vector, the gravity vector and the air resistance vector.

The method of controlling the movement of the player character PC as described above is used when the player character PC is not in contact with an operation trace (hereinafter referred to as the "normal movement control"). In the present embodiment, when the player character PC contacts an operation trace, the normal movement control operation is not performed, but a different movement control operation (hereinafter referred to as the "on-trace movement control operation") is performed as will be described later. Alternatively, when the player character PC contacts an operation trace, the normal movement control operation may be performed in addition to the on-trace movement control operation. Then, for example, when the player character PC is moving along an operation trace extending across the ground surface and is about to reach the ground surface, the player character PC can be urged to move forward on the ground in a self-propelled manner, whereby the player character PC will smoothly comes off the operation trace.

Referring to FIG. 13A, if the player does nothing, the player character PC will be moved forward by the inertial force to eventually fall down into the hole, despite a slight decrease in the velocity due to the air resistance. Therefore, the player needs to change the moving direction and the moving velocity of the player character PC to prevent the player character PC from falling down into the hole. There are basically only two methods by which the player can change the moving direction and the moving velocity of the player character PC. The first method is to touch on the player character PC with the stylus 17 to significantly accelerate the player character PC, and the second method is to draw an operation trace TR on the touch panel 16 to accelerate the player character PC along the operation trace TR. These methods will now be described in detail.

Figure 21:
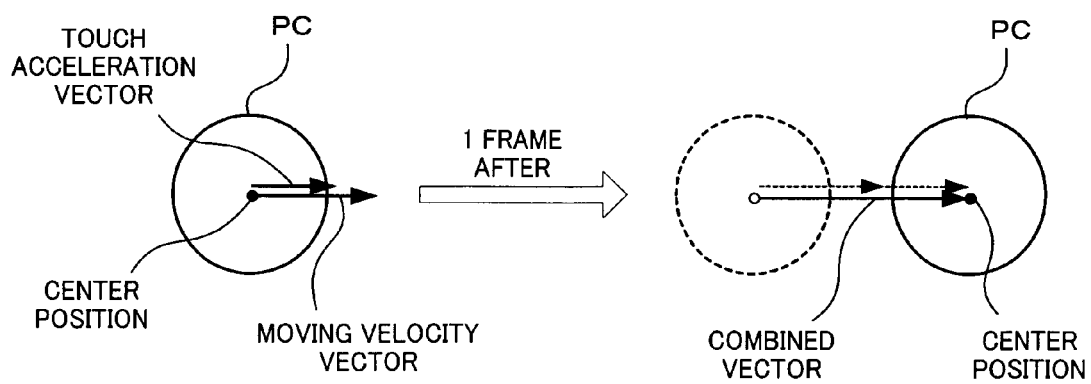
FIG. 21 shows an example of how the movement of a player character is controlled.

An example of the first method will first be described. When the player touches on the player character PC with the stylus 17, a touch acceleration vector as shown in FIG. 21 is added to the moving velocity vector of the player character PC to produce a combined vector, and the center position of the player character PC is moved based on the combined vector. The touch acceleration vector has the same direction as that of the moving velocity vector, and has a magnitude that is 0.8 time as great as the moving velocity vector, for example. The magnitude of the touch acceleration vector may be constant, instead of being dependent on the magnitude of the moving velocity vector. The touch acceleration vector may be added only in one frame immediately after the player touches on the player character PC with the stylus 17, or in each frame over a predetermined period of time starting from the frame immediately after the player touches on the player character PC with the stylus 17.

An example of the second method will now be described. Note that the player character PC does not always move along an operation trace TR drawn by the player. For example, an operation trace TR that the player character PC does not contact will have no influence on the movement of the player character PC. In other words, an operation trace TR can influence the moving direction and the moving velocity of the player character PC by being contacted by the player character PC (this may not be the case if the player character PC is controlled as if there were some gravity between the player character PC and an operation trace, as described above). When the player character PC hits an operation trace TR at a high speed from a direction perpendicular to the operation trace TR, the player character PC will be bounced back by the operation trace TR. When the player character PC moves along an operation trace TR with an excessive curvature, the player character PC will be subject to a significant centrifugal force and may thereby come off the operation trace TR before reaching the end point of the operation trace TR.

Figure 22:
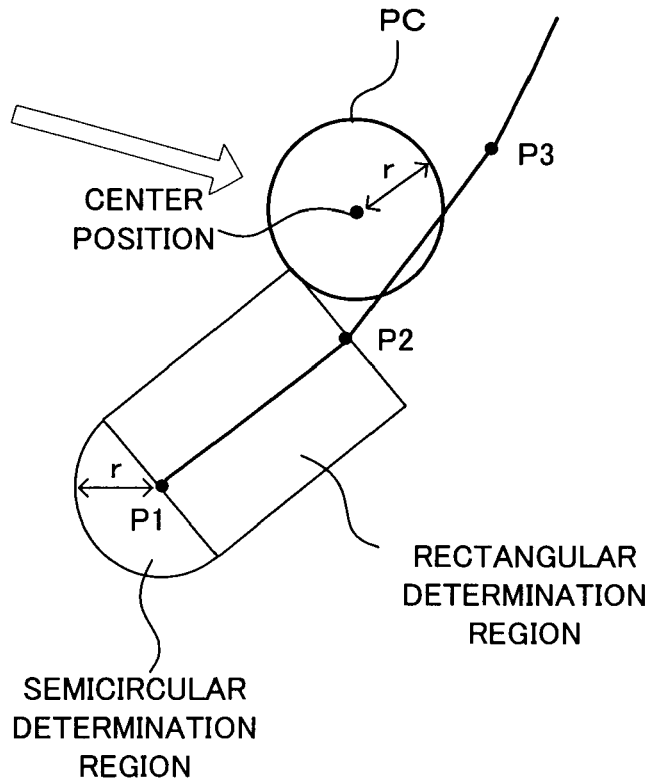
FIG. 22 shows an example of how a collision determination is made.

An example of a process to be performed when the player character PC contacts an operation trace TR will be described. The determination of whether the player character PC comes into contact with an operation trace TR is made by determining, for each segment of the operation trace TR, whether or not the player character PC is in contact with the segment. Specifically, starting from the segment closest to the start point of the operation trace TR, it is determined whether or not a segment and the player character PC are in contact with each other. An exemplary method for determining whether or not an operation trace shown in FIG. 14 and the player character PC are in contact with each other will be described. Referring to FIG. 22, it is determined whether or not the center of the player character PC is included within a semicircular determination region whose radius is r (equal to the radius of the player character PC and whose center is at the start point P1 of a segment extending between P1 and P2 (hereinafter referred to simply as the "segment P1-P2"), after which it is determined whether or not the center of the player character PC is included within a rectangular determination region extending symmetrically along the segment P1-P2 with a width of 2r. Then, referring to FIG. 23, it is determined whether or not the center of the player character PC is included within a semicircular determination region whose center is at the start point P2 of the segment P2-P3, after which it is determined whether or not the center of the player character PC is included within a rectangular determination region extending symmetrically along the segment P2-P3. These operations are performed similarly for the other segments. In the example shown in FIG. 22 and FIG. 23, the center of the player character PC is included within the rectangular determination region along the segment P2-P3, whereby it is determined that the player character PC is in contact with the segment P2-P3.

After it is determined that the player character PC is in contact with any segment, it is then determined whether the player character PC should be bounced back by the operation trace TR or be attracted thereto (i.e., start moving along the operation trace TR) (the determination will hereinafter be referred to as the "attraction determination").

Figure 23:
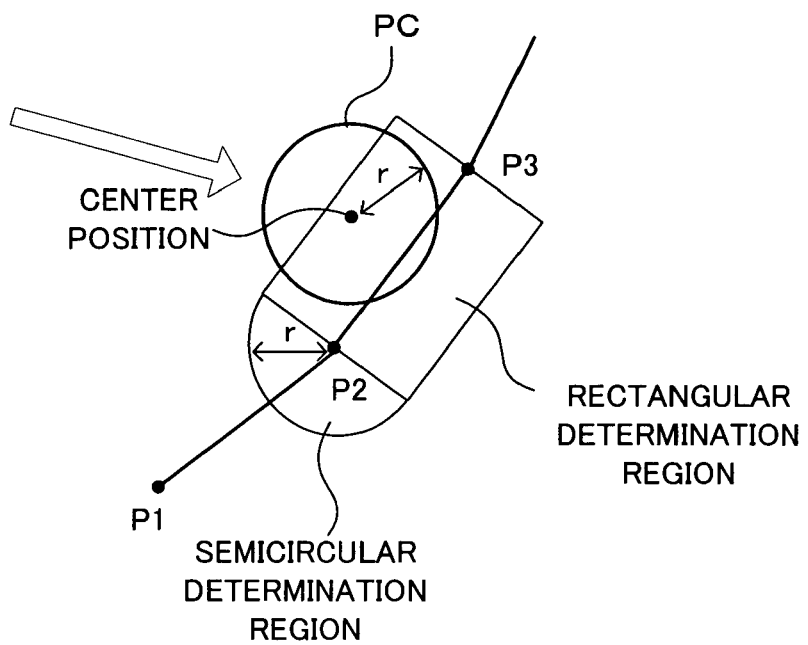
FIG. 23 shows an example of how a collision determination is made.
Figures 24, 25:
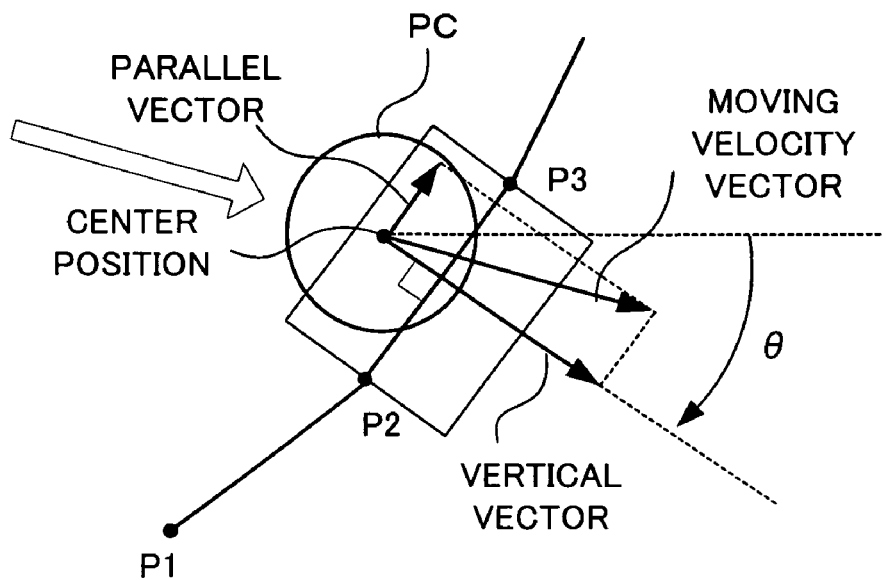
FIG. 24 shows an example of how an attraction determination is made.
FIG. 25 shows how a threshold value α used in the attraction determination is determined.

A method for the attraction determination will be described for a case where the center of the player character PC has entered the rectangular determination region as shown in FIG. 23. In the following description, the moving velocity vector is divided into a first component perpendicular to the segment with which the player character PC is in contact and a second component parallel to the segment (the values of these components can be calculated based on the normal vector and the tangent vector stored in the operation trace data storage area as shown in FIG. 15), as shown in FIG. 24, and the first and second components will be referred to as the perpendicular vector and the parallel vector, respectively, for the purpose of discussion.

The attraction determination is made by determining whether or not the magnitude of the perpendicular vector at the time of contact is greater than a threshold value $\alpha$. The player character PC is bounced back by the operation trace TR if the magnitude of the perpendicular vector is greater than the threshold value $\alpha$, and is attracted to the operation trace TR if the magnitude of the perpendicular vector is less than the threshold value $\alpha$. The threshold value $\alpha$ varies depending on the angle of the perpendicular vector (in other words, the "collision angle"). The relationship between the angle of the perpendicular vector and the threshold value $\alpha$ is as shown in FIG. 25. For angles other than those specified in FIG. 25, the threshold value $\alpha$ can be calculated by interpolation. For example, if the angle of the perpendicular vector is 45°, the threshold value $\alpha$ is $(\alpha 2+\alpha 1)/2$. With a larger threshold value $\alpha$, the player character PC is more likely to be attracted to the operation trace TR. Therefore, it is possible to adjust the attractive force to an intended magnitude by appropriately setting the values of $\alpha 1$, $\alpha 2$ and $\alpha 3$ of FIG. 25. As the threshold value is varied depending on the angle of the perpendicular vector, the condition for the player character PC to be attracted to or bounced back by the operation trace TR will not be fixed, thereby increasing the playability of the game and enabling the graphical representation of natural movements.

Figure 26:
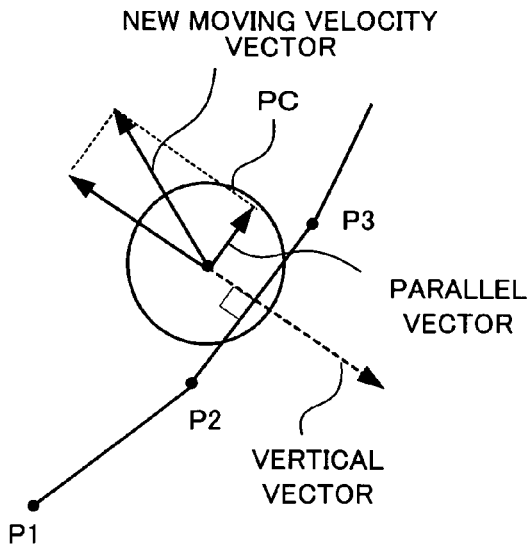
FIG. 26 shows an example of how the movement of a player character is controlled.

If it is determined by the attraction determination that the player character PC should be bounced back by the operation trace TR, a vector of the opposite direction to the perpendicular vector at the time of contact (with a magnitude 0.8 time as great as the magnitude of the perpendicular vector, for example) is combined with the parallel vector at the time of contact to obtain a combined vector, and the combined vector is used as the new moving velocity vector based on which the player character PC is moved thereafter, as shown in FIG. 26.

Figure 27:
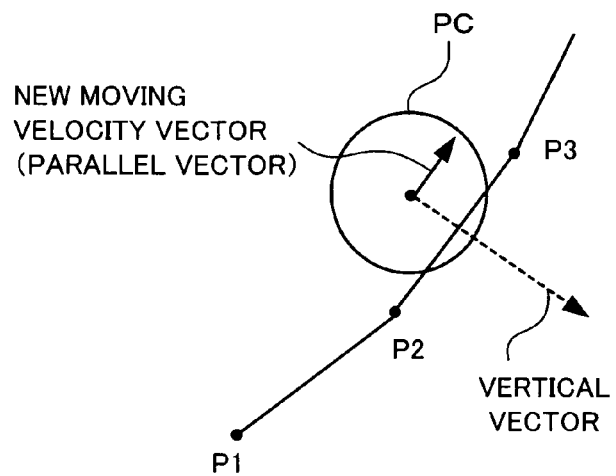
FIG. 27 shows an example of how the movement of a player character is controlled.
Figure 28:
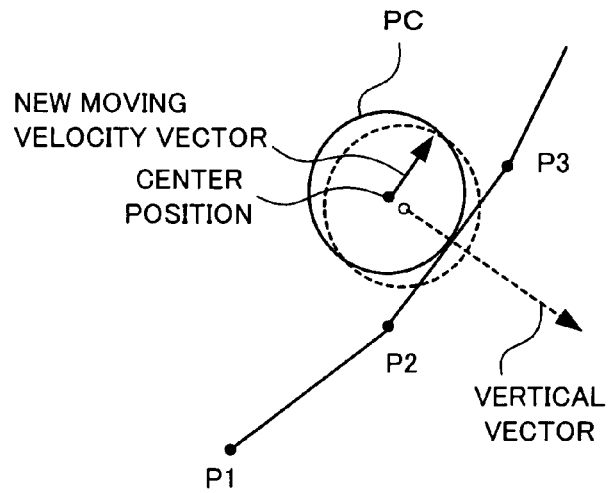
FIG. 28 shows an example of how the movement of a player character is controlled.

If it is determined by the attraction determination that the player character PC should be attracted to the operation trace TR (i.e., start moving along the operation trace TR), the parallel vector at the time of contact is used as the new moving velocity vector based on which the player character PC is moved thereafter, as shown in FIG. 27. In this case, it is determined whether or not the distance between the center position (the position indicated by the position data) of the player character PC and the segment (the segment P2-P3 in the illustrated example) is less than a predetermined distance determined depending on the size of the player character PC (the radius r of the player character PC in the illustrated example). If so, the center position of the player character PC may be moved away from the segment as shown in FIG. 28 so that the distance between the center position of the player character PC and the segment (the segment P2-P3 in the illustrated example) is equal to the radius r of the player character PC (i.e., so that the player character PC is no longer sinking partially into the segment). This movement can be achieved by moving the position data in the normal vector direction of the segment or the direction opposite thereto. Specifically, the position data is moved in the normal vector direction if the position indicated by the position data is on the front side of the segment with respect to the normal vector direction, and is moved in the opposite direction if the indicated position is on the other side of the segment (the rear side with respect to the normal vector direction). Thus, even if an operation trace TR is drawn to be passing through the inside of the player character PC, the position of the player character PC can be adjusted so that it is not sinking into the operation trace TR. If the player character PC has a high moving velocity in the collision determination described above with reference to FIG. 22 and FIG. 23, the player character PC may already be sinking into the operation trace TR at the time of the collision determination. Also in such a case, the position of the player character PC can be adjusted by an operation described above so that it is not sinking into the operation trace TR.

Alternatively, the player character PC can be moved away from the segment gradually, i.e., repeatedly by a small amount at a time (e.g., by a predetermined distance for each frame) until the distance between the center position of the player character PC and the segment is equal to the radius r of the player character PC. This can prevent the movement of the player character PC from being abrupt, thus realizing a natural movement. The process of moving the player character PC along an operation trace TR will later be described in detail.

While the player character PC is moved so that the distance between the center position of the player character PC and the segment is equal to the radius of the player character PC in the present embodiment, the player character PC may alternatively be moved so that the distance is zero (i.e., so that the center position of the player character PC is located on the segment). In such a case, the player character PC contacting an operation trace TR will be drawn onto the operation trace TR and will be moving on the operation trace TR.

Figure 29:
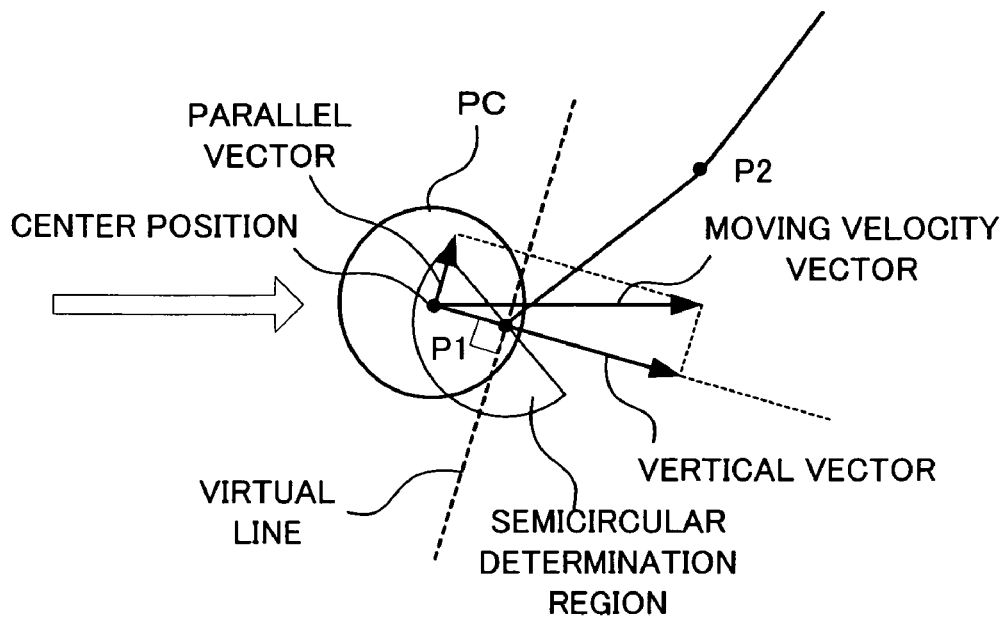
FIG. 29 shows an example of how the movement of a player character is controlled.

A method for the attraction determination when the center position of the player character PC enters the semicircular determination region as shown in FIG. 29, for example, will now be described. In such a case, the attraction determination can be made in a manner similar to that when the center position of the player character PC enters a rectangular determination region by using a virtual line that is perpendicular to the straight line between the center position of the player character PC and the start point P1 and is passing through the start point P1. Specifically, the moving velocity vector at the time of contact is divided into a perpendicular vector being perpendicular to the virtual line and a parallel vector being parallel to the virtual line, and it is determined whether the player character PC should be bounced back by or attracted to the operation trace TR by determining whether or not the magnitude of the perpendicular vector at the time of contact is greater than the threshold value $\alpha$, which is determined by the angle of the perpendicular vector. The attraction determination is made in a similar manner also when the center position of the player character PC enters a semicircular determination region corresponding to a start point that is between the opposite ends of the operation trace TR (e.g., the start point P2 or P3).

If it is determined that the player character PC should be bounced back by the operation trace TR in the attraction determination described above with reference to FIG. 29, a vector of the opposite direction to the perpendicular vector at the time of contact (with a magnitude 0.8 time as great as the magnitude of the perpendicular vector, for example) is combined with the parallel vector at the time of contact to obtain a combined vector, and the combined vector is used as the new moving velocity vector based on which the player character PC is moved thereafter, again as shown in FIG. 26. If it is determined by the attraction determination that the player character PC should be attracted to the operation trace TR (i.e., start moving along the operation trace TR), the parallel vector at the time of contact is used as the new moving velocity vector based on which the player character PC is moved thereafter, again as shown in FIG. 27.

Figure 30:
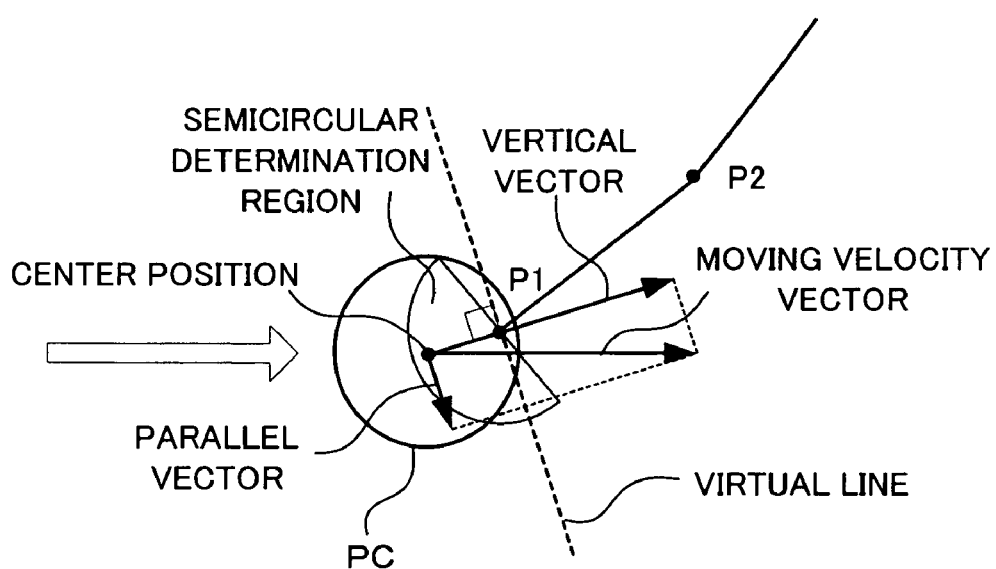
FIG. 30 shows an example of how the movement of a player character is controlled.

If it is determined that the player character PC should be attracted to the operation trace TR, the center position of the player character PC is moved along an arc about the start point P1 (e.g., by the absolute value of the parallel vector described above for every frame) until it is determined that the straight line between the center position of the player character PC and the start point P1 is perpendicular to the segment P1-P2 (if the center position of the player character PC enters a semicircular determination region of a start point that is between the opposite ends of the operation trace TR, e.g., the start point P2, the determination needs to be made for both of the segment P2-P3 and the segment P1-P2). The process of moving the player character PC along the operation trace TR after the straight line between the center position of the player character PC and the start point P1 becomes perpendicular to the segment P1-P2 will later be described in detail. In the example shown in FIG. 29, the direction of the parallel vector is clockwise about the start point P1. Depending on how the player character PC contacts the operation trace TR, the direction of the parallel vector may be counterclockwise about the start point P1, as shown in FIG. 30. Thus, the direction in which the player character PC is moved along the arc is determined based on the direction of the parallel vector. As a result, while the player character PC moves along the operation trace TR while being attracted onto the upper surface of the operation trace TR in the case of FIG. 29, the player character PC moves along the operation trace TR while being attracted onto the lower surface of the operation trace TR in the case of FIG. 30.

Figure 31:
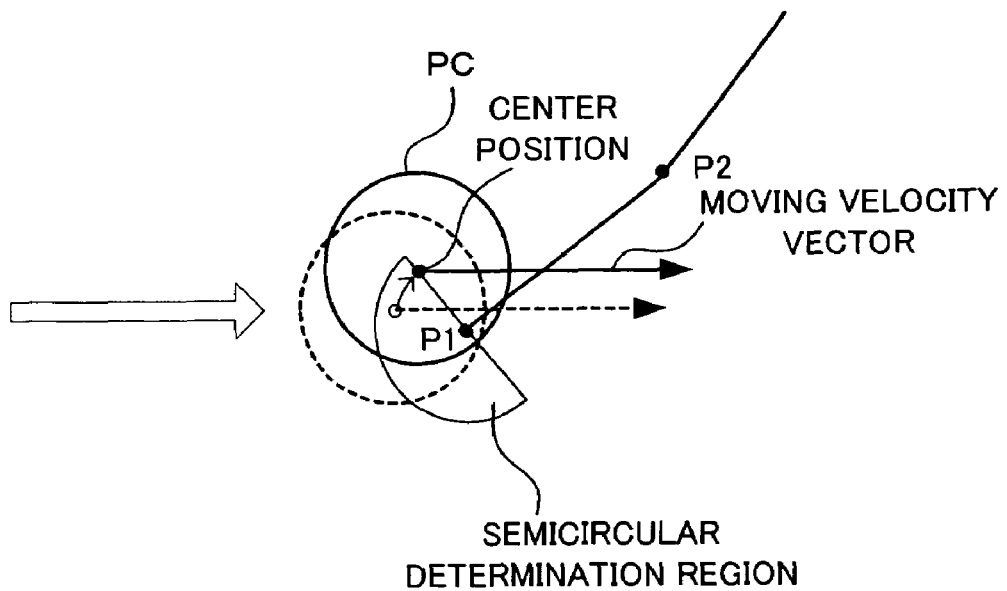
FIG. 31 shows an example of how the movement of a player character is controlled.
Figure 32:
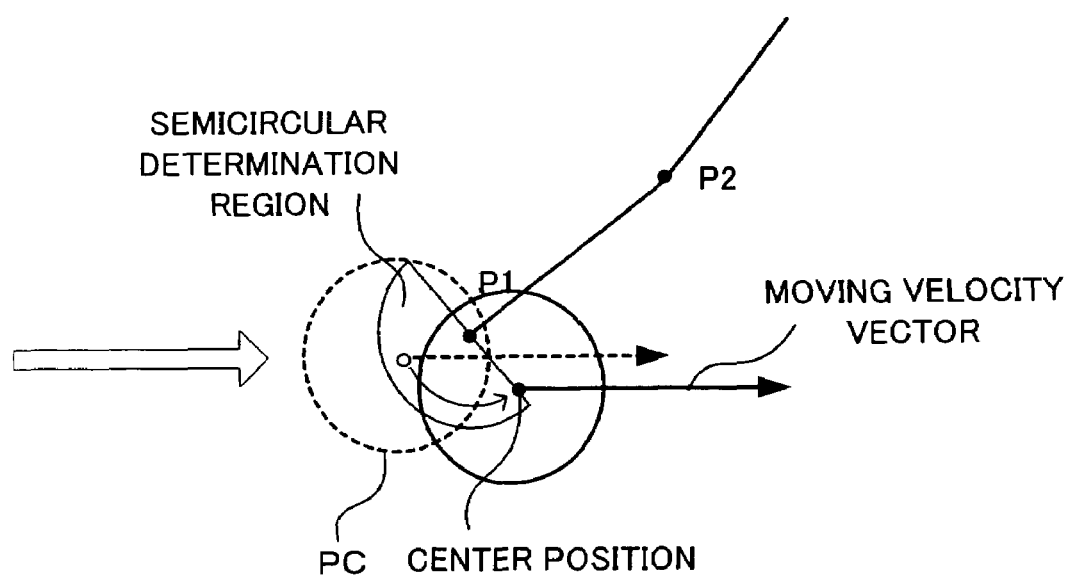
FIG. 32 shows an example of how the movement of a player character is controlled.

Instead of using a virtual line as shown in FIG. 29 and FIG. 30, the attraction determination can be made as follows. The moving velocity vector at the time of contact is divided into a perpendicular vector being perpendicular to the segment P1-P2 and a parallel vector being parallel to the segment P1-P2. Then, it is possible to determine whether or not the player character PC should be bounced back by the operation trace TR or attracted to the operation trace TR by determining whether or not the magnitude of the perpendicular vector is greater than the threshold value $\alpha$, which is determined by the angle of the perpendicular vector. While the determination can be made at the time of contact, it can alternatively be made as follows. As shown in FIG. 31 or FIG. 32, the center position of the player character PC is rotated about the start point P1 either clockwise or counterclockwise (which can be determined as described above) to move the center position of the player character PC from the position at the time of contact to the periphery of the semicircular determination region (until the straight line between the center position of the player character PC and the start point P1 is perpendicular to the segment P1-P2), after which the attraction determination can be made in a manner similar to that shown in FIG. 24. In such a case, the perpendicular vector at the time of contact may be stored in the memory, and then the center position of the player character PC may be rotated clockwise or counterclockwise to reach the periphery of the semicircular determination region, after which the attraction determination can be made in a manner similar to that shown in FIG. 24 by using the stored perpendicular vector. The stored perpendicular vector may be oriented away from the segment P1-P2. In such a case, the player character PC can be moved in the direction of the moving velocity vector (or the perpendicular vector) at the time of contact without being attracted to or bounced back by the operation trace TR. Even before the center position of the player character PC reaches the periphery of the semicircular determination region, the player character PC may be moved in the direction of the moving velocity vector (or the perpendicular vector) at the time of contact when it is determined that the stored perpendicular vector is oriented away from the segment P1-P2 as viewed from the current center position of the player character PC.

By determining whether or not the player character PC should be attracted to or bounced back by the operation trace TR (or neither attracted to nor bounced back by) the operation trace TR as described above, the player character PC will not be attracted to the operation trace TR in an unnatural manner. Moreover, a skilled player can selectively control the player character PC so that the player character PC is attracted to and moves along an operation trace TR or so that the player character PC is bounced back by the operation trace TR to reverse its direction, by appropriately drawing the operation trace TR. Furthermore, the player character PC may not move along an operation trace TR unless the operation trace TR is drawn appropriately, thereby increasing the playability of the game.

If it is determined by the attraction determination that the player character PC should be attracted to the operation trace TR, items of information as listed below are stored in the W-RAM 37 and updated as the player character PC moves. Note that the new moving velocity vector of the player character PC is a component of the moving velocity vector at the time of contact that is in the tangential direction of the segment with which the player character PC is in contact.

The trace number and the segment number with which the player character PC is in contact;

The contact direction parameter indicating the side of the segment (left or right) on which the player character PC is in contact with the segment as viewed in the direction from the start point to the end point of the segment; and The endurance parameter indicating the degree of attraction of the player character PC to the operation trace TR.

Figure 33A:
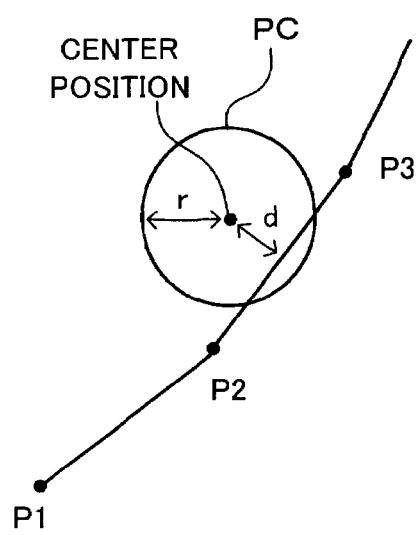
FIG. 33A and FIG. 33B show contact direction parameters.
Figure 33B:
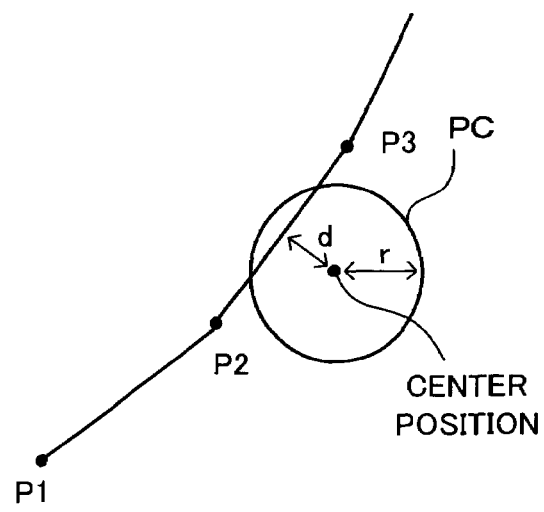

The contact direction parameter takes a positive value when the player character PC is on the left side of the segment as viewed in the direction from the start point (P2 in the illustrated example) to the end point (P3 in the illustrated example) as shown in FIG. 33A, and takes a negative value when the player character PC is on the right side of the segment as shown in FIG. 33B. The absolute value of the contact direction parameter is expressed as d/r, where d is the distance between the center position of the player character PC and the segment, and r is the radius of the player character PC. Whether the player character PC is on the left or right of the segment as viewed in the direction from the start point to the end point of the segment can be determined by, for example, calculating the inner product of a vector extending from the start point of the segment to the center position of the player character PC and the normal vector of the segment. The player character PC is on the left side of the segment if the inner product is a positive value, and on the right side of the segment if the inner product is a negative value. Note that the contact direction parameter can also be used for correcting the sinking of the player character PC into the operation trace TR as described above with reference to FIG. 28. For example, if the value of the contact direction parameter is 0.9, the center position of the player character PC can be moved in the direction of the normal vector of the segment. If the value of the contact direction parameter is −0.9, the center position of the player character PC can be moved in the direction opposite to the direction of the normal vector.

The endurance parameter is set to an initial value (e.g., 20) when the player character PC is attracted to an operation trace TR, and is increased/decreased by the influence of the centrifugal force and/or the gravity as the player character PC moves along the operation trace TR. There is an upper limit on the value of the endurance parameter (e.g., 25), and the endurance parameter cannot exceed the upper limit value. When the endurance parameter becomes zero or less, the player character PC comes off the operation trace TR. How the endurance parameter is increased/decreased will later be described in detail.

Figure 35:
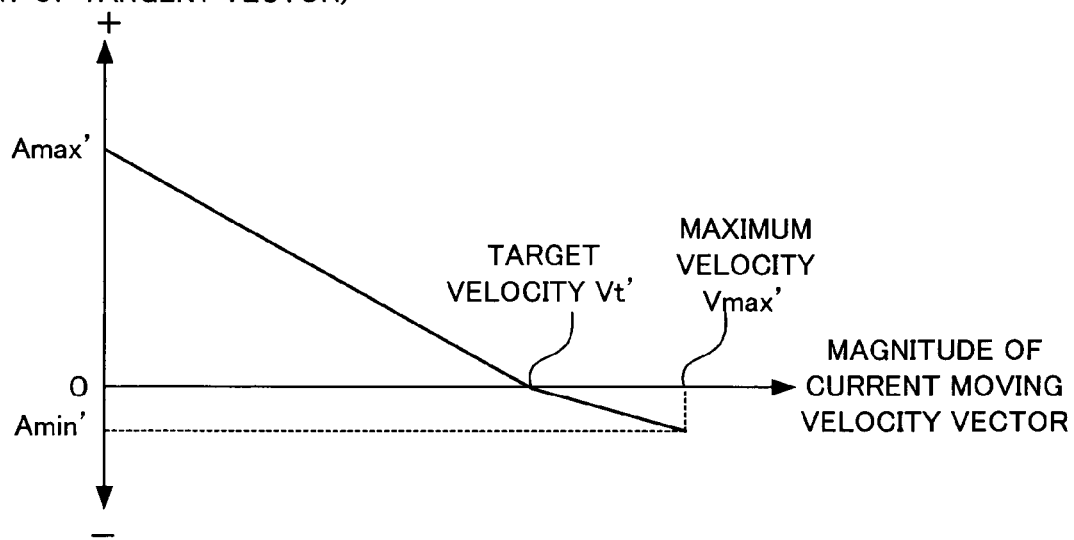
FIG. 35 shows how an on-trace acceleration vector is determined.

When the player character PC contacts and is attracted to an operation trace TR, the player character PC starts moving along the operation trace TR. While the player character PC is moving along the operation trace TR, the movement of the player character PC is controlled based on the moving velocity vector, the on-trace acceleration vector, the gravity vector and the air resistance vector, as shown in FIG. 33A. The moving velocity vector, the gravity vector and the air resistance vector are as described above with reference to FIG. 20, and will not be further described below. The on-trace acceleration vector is a vector of the same direction as that of the tangent vector of the segment with which the player character PC is in contact, and the magnitude thereof varies based on the magnitude of the moving velocity vector as shown in FIG. 35. Thus, as does the normal acceleration vector described above with reference to FIG. 18 and FIG. 19, the on-trace acceleration vector also functions to bring the moving velocity of the player character PC closer to the target velocity Vt'.

Figure 34A:
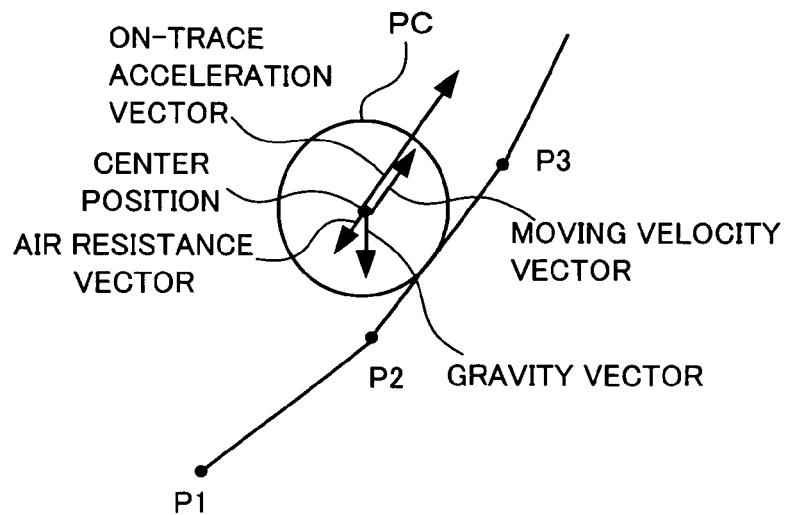
FIG. 34A to FIG. 34C each show an example of how the movement of a player character is controlled.
Figure 34B:
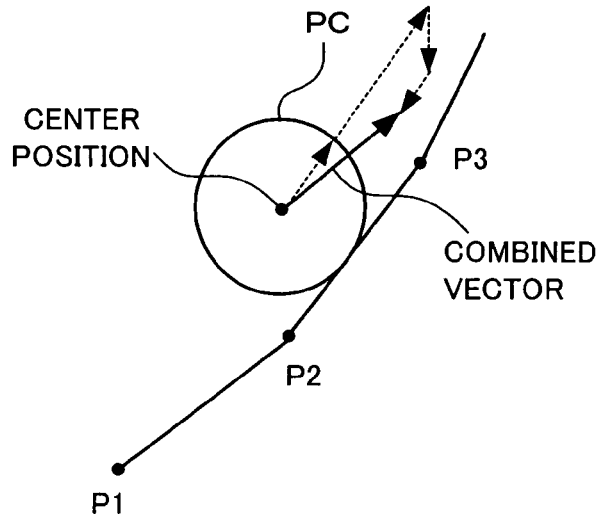
Figure 34C:
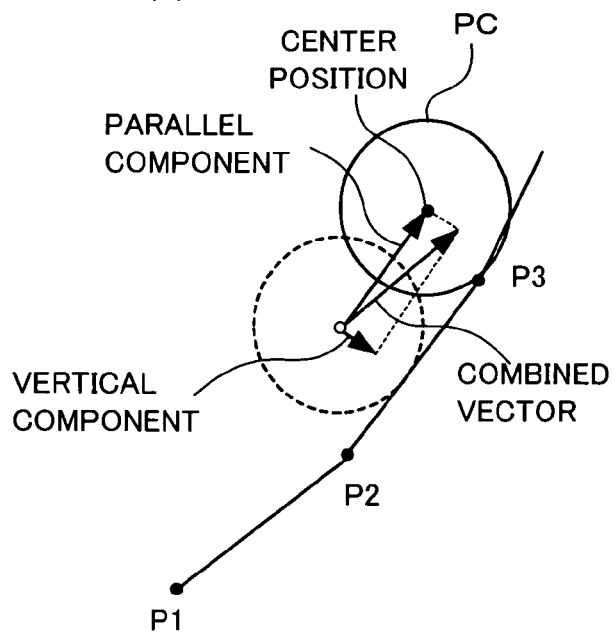

The player character PC is moved by obtaining a combined vector by combining together the moving velocity vector, the on-trace acceleration vector, the gravity vector and the air resistance vector (see FIG. 34B), dividing the combined vector into a parallel component being parallel to the segment and a perpendicular component being perpendicular to the segment, as shown in FIG. 34C, and moving the center position of the player character PC according to the parallel component (the parallel component will be used as the moving velocity vector in the next frame).

Referring to FIG. 34A to FIG. 34C, vectors other than the gravity vector are all parallel to the tangent vector of the segment. Therefore, if the magnitude of the component of the gravity vector that is parallel to the tangent vector is calculated in advance, it is possible to calculate the magnitude of the parallel component of the combined vector shown in FIG. 34C only by addition and subtraction of scalar quantities.

Figure 36A:
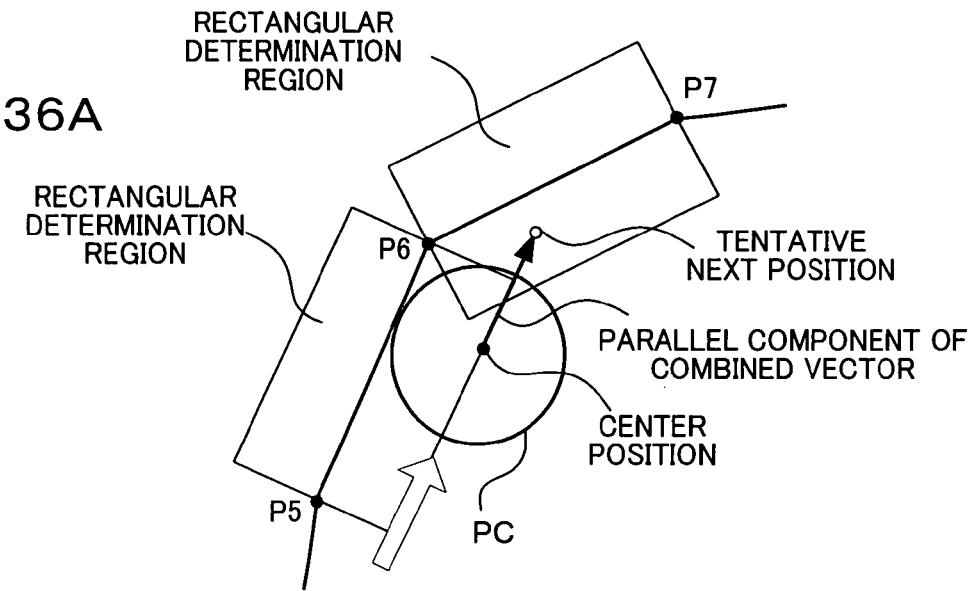
FIG. 36A and FIG. 36B show in detail how a player character is moved when moving along a corner.
Figure 36B:
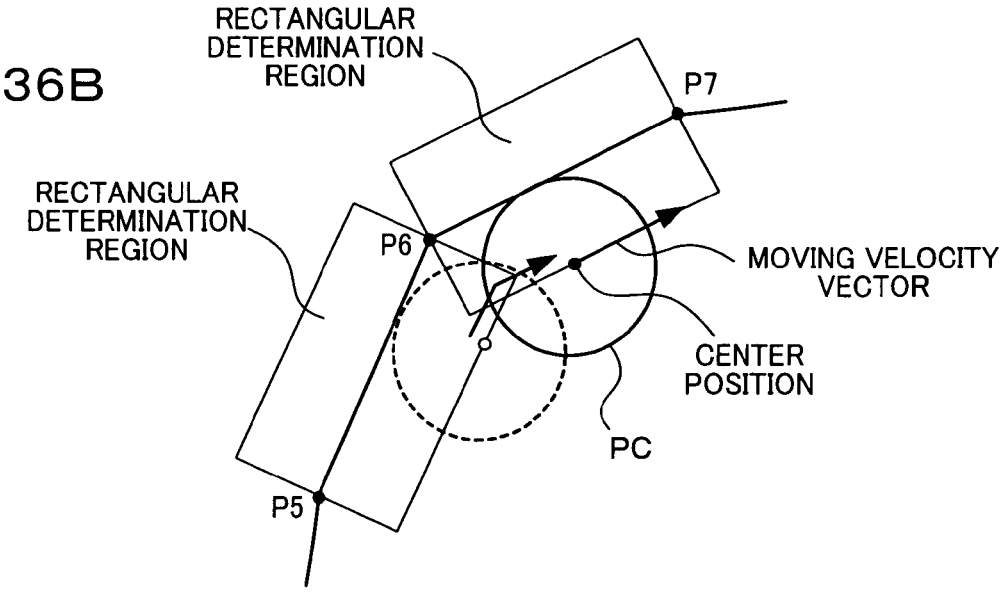
Figure 37A:
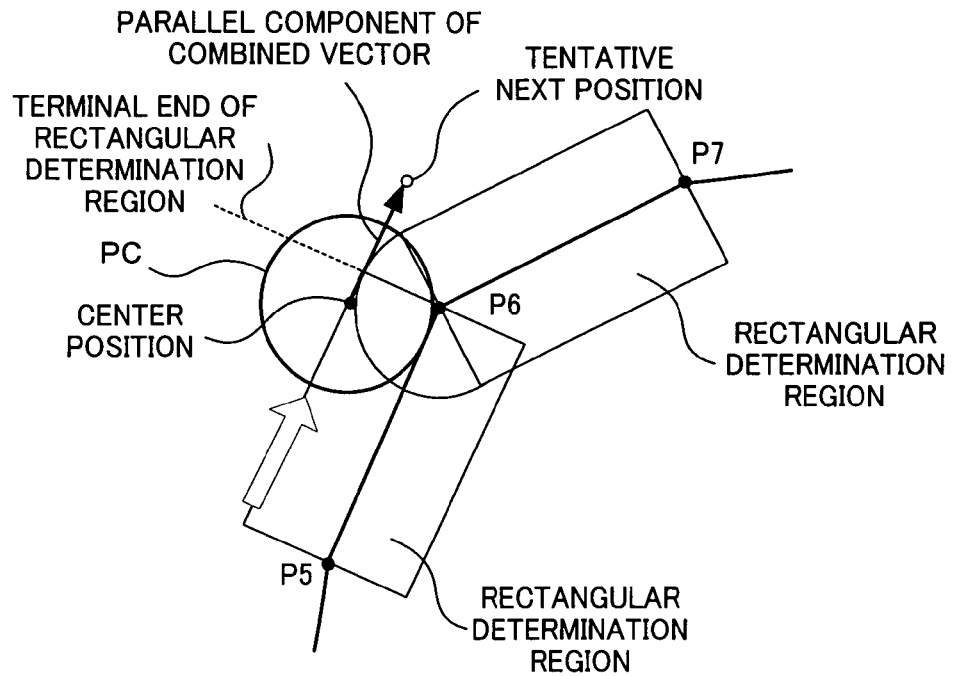
FIG. 37A and FIG. 37B show in detail how a player character is moved when moving along a corner.
Figure 37B:
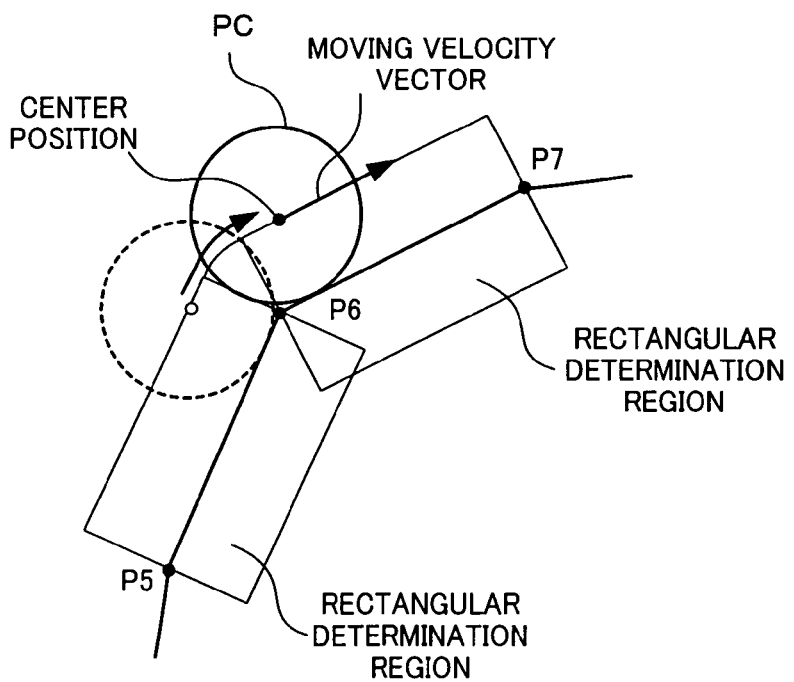

While the player character PC moves along an operation trace TR as described above, the player character PC shifts from one segment to another. For example, the shift between segments can be detected as follows. Each time the next position of the center of the player character PC is determined, it is determined whether or not the next position is within the rectangular determination region of the next segment or whether or not the next position is beyond the terminal end of the rectangular determination region of the current segment (the side of the rectangular determination region including the end point of the segment). In the example of FIG. 36A, it is determined that the next (tentative) position of the player character PC, which is determined according to the parallel component of the combined vector, is within the rectangular determination region of the next segment P6-P7. Therefore, the next position of the center of the player character PC is changed as shown in FIG. 36B. Preferably, the next position is determined so that the amount of movement is equal to the magnitude of the parallel component of the combined vector of FIG. 36A. In the example of FIG. 37A, it is determined that the next (tentative) position of the player character PC, which is determined according to the parallel component of the combined vector, is beyond the terminal end of the rectangular determination region of the segment P5-P6. Therefore, the next position of the center of the player character PC is changed such that the center position is moved along an arc about the point P6 with the radius r as shown in FIG. 37B. Preferably, the next position is determined so that the amount of movement is equal to the magnitude of the parallel component of the combined vector of FIG. 37A.

How the endurance parameter is increased/decreased will now be described in detail. The endurance parameter is increased/decreased by the influence from the gravity and the centrifugal force.

The endurance parameter is varied based on the gravity as follows. The endurance parameter is decreased by a predetermined amount (e.g., 1) per frame if the center position of the player character PC in the virtual space is below the contact point between the player character PC and the segment (the intersection between the segment and the straight line passing through the center position of the player character PC and being perpendicular to the segment), i.e., if the Y coordinate of the center position of the player character PC is greater than that of the contact point (assuming that the origin is at the upper left corner of the display screen while the Y axis is defined in the vertical direction so that the Y coordinate increases in the downward direction). If the center position of the player character PC is above the contact point, the endurance parameter is increased by a predetermined amount (e.g., 1) per frame.

In other embodiments, the endurance parameter may be increased/decreased by the magnitude (the absolute value) of the perpendicular component described above with reference to FIG. 34C. Alternatively, the value may be obtained as the magnitude of the component perpendicular to the tangent vector of the gravity vector.

The endurance parameter is varied based on the centrifugal force as follows. The centrifugal force can occur when the player character PC moves from a segment ("segment A") to the next segment ("segment B"). Whether the endurance parameter is increased or decreased by the occurring centrifugal force is dependent on whether the player character PC is turning along the inside of the corner (i.e., between the segments) as shown in FIG. 36A and FIG. 36B or along the outside of the corner as shown in FIG. 37A and FIG. 37B. Specifically, the endurance parameter is increased when the player character PC is turning along the inside of the corner and decreased when the player character PC is turning along the outside of the corner. For example, whether the player character PC is turning along the inside or the outside of the corner can be determined as shown in FIG. 38 based on the sign of the contact direction parameter and the sign of the inner product of the normal vector of the segment A and the tangent vector of the segment B.

The endurance parameter is varied by the centrifugal force by a greater amount as the corner has a greater angle or as the player character PC has a greater moving velocity. Specifically, the amount by which the endurance parameter is varied may be calculated by first multiplying the magnitude of the outer product of the tangent vector of the segment A and the tangent vector of the segment B with the magnitude of the moving velocity vector of the player character PC when turning around the corner, and then multiplying the obtained value with a predetermined coefficient.

Thus, the endurance parameter is decreased by a large amount when turning along the outside of a tight corner and is increased by a large amount (without exceeding the upper limit value) when turning along the inside of a tight corner, whereas the endurance parameter is decreased by a small amount when turning along the outside of a gentle corner and is increased by a small amount when turning along the inside of a gentle corner.

Figure 39:
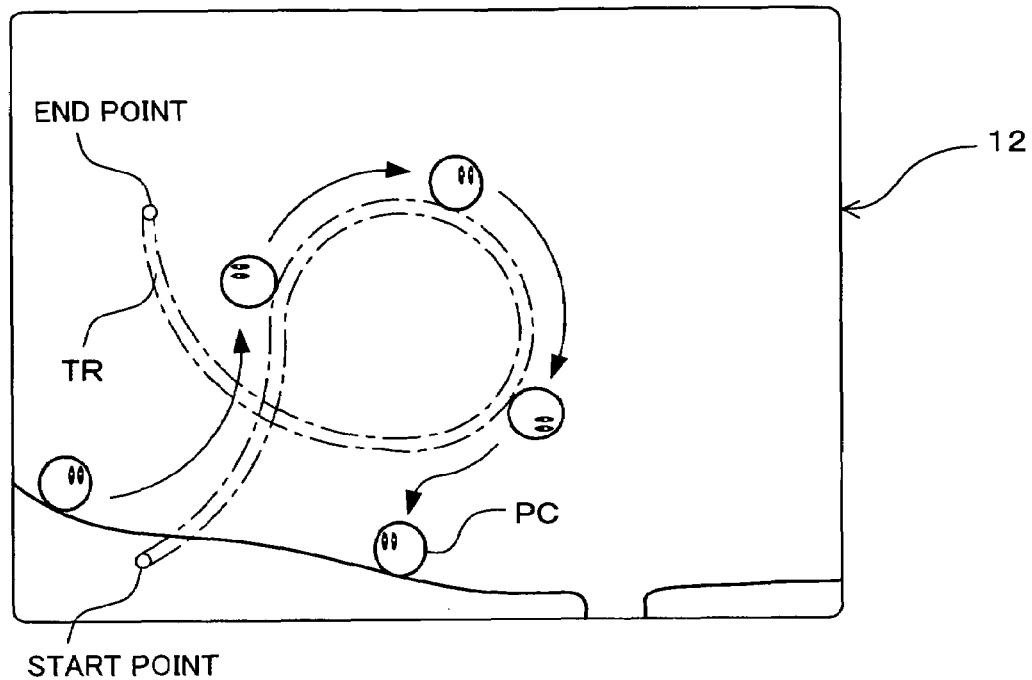
FIG. 39 shows an example of how a player character moves.

When the endurance parameter becomes zero, the player character PC is brought out of the attracted state, after which the movement of the player character PC is controlled as described above with reference to FIG. 18 and FIG. 20. FIG. 39 shows an example where the player character PC is brought out of the attracted state while moving along an operation trace TR.

Also when the player character PC reaches the end point of an operation trace TR (the end point of the last segment among a group of segments having the same trace number, e.g., P16 or P29 shown in FIG. 14), the player character PC is brought out of the attracted state, after which the movement of the player character PC is controlled as described above with reference to FIG. 18 and FIG. 20.

Figure 40:
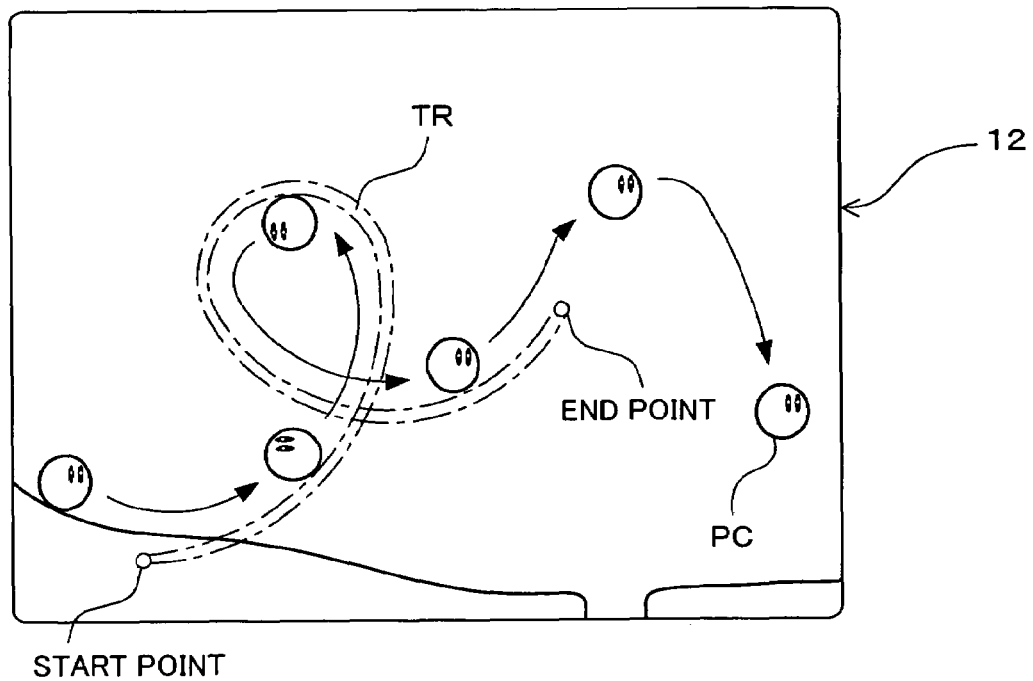
FIG. 40 shows another example of how a player character moves.

When it is determined that the player character PC should be brought out of the attracted state, the center position of the player character PC after it is brought out of the attracted state is determined by using the moving velocity vector at that point in time or the moving velocity vector immediately before. When the player character PC comes off the end point of an operation trace TR, the moving velocity vector of the player character PC at that point in time or the moving velocity vector immediately before can be multiplied with a predetermined coefficient (e.g., 1.5). Then, the player character PC will rather pop off the end point of the operation trace TR, giving more liveliness to the movement of the player character PC. FIG. 40 shows an example where the player character PC is brought out of the attracted state at the end point of an operation trace TR.

Where the player character PC moves in water in the virtual space, the movement of the player character PC is controlled by, for example, using a vertically upward buoyancy vector instead of the gravity vector shown in FIG. 20 and using a water resistance vector having the same direction as that of the air resistance vector but having a greater magnitude instead of the air resistance vector shown in FIG. 20, thus realizing a natural movement of the player character PC. Then, the endurance parameter is varied by the influence of the buoyancy. Specifically, the endurance parameter is decreased by a predetermined amount (e.g., 1) per frame if the center position of the player character PC is above the contact point between the player character PC and the segment (the intersection between the segment and the straight line passing through the center position of the player character PC and being perpendicular to the segment), i.e., if the Y coordinate of the center position of the player character PC is less than that of the contact point. If the center position of the player character PC is below the contact point, the endurance parameter is increased by a predetermined amount (e.g., 1) per frame.

In the present embodiment, when the player character PC contacts the operation trace TR, the player character PC moves along the operation trace TR while being attracted thereto, whereby the on-trace movement control (the movement control of the player character PC while the player character PC is moving along the operation trace TR) is performed continuously. Alternatively, the player character PC may not be attracted to the operation trace TR, and the on-trace movement control may be performed only when the player character PC comes into contact with the operation trace TR. For example, when it is determined that the player character PC comes into contact with the operation trace TR, a vector extending from the start point position to the end point position of the segment contacted by the player character PC is determined referring to the operation trace data storage area 372 of FIG. 15, and the vector is used as the acceleration vector. Then, the next position of the player character PC can be determined based on a combined vector obtained by combining together the acceleration vector, the moving velocity vector, the gravity vector and the air resistance vector.

In the embodiment described above, the operation trace TR1 is gradually erased over time from the start point toward the end point, as shown in FIG. 6D. By setting a lifetime for each segment of an operation trace (or for each point between segments) as described above, the player needs to draw an operation trace at an appropriate time, thus increasing the playability of the game. The provision of a lifetime of an operation trace is also applicable to, for example, a case where a particular process is performed only when the player quickly draws a circle (or any other shape or symbol) on the touch panel. Then, since portions of the operation trace, which have expired their lifetime periods, gradually disappear from the display screen, the player can visually perceive the lifetime of an operation trace and can easily know how fast the player should perform an input operation.

While the example embodiment presented herein has been described in detail, the foregoing description is in all aspects illustrative and not restrictive. It is understood that numerous other modifications and variations can be devised without departing from the scope of the example embodiment.

What is claimed is:

1. A video game device, comprising:
   a display section for displaying a game image;
   a position inputting unit for inputting a position on the game image;
   trace storage control programmed logic circuitry for storing, in storage locations, trace data representing a series of input positions inputted by the position inputting unit;
   movement control programmed logic circuitry for storing, in storage locations, position data of a moving character and updating the position data based on a predetermined rule;
   determination programmed logic circuitry for determining whether or not the moving character has contacted a trace based on the trace data and the position data, said trace having the shape of a line drawn displayed on the display section;
   on-trace movement control programmed logic circuitry for updating the position data so that the moving character moves according to the trace based on the trace data when it is determined by the determination programmed logic circuitry that the moving character has contacted the trace; and
   display control programmed logic circuitry for displaying the moving character on the display section based on the position data.

2. The video game device according to claim 1, wherein the display control programmed logic circuitry displays the trace on the display section based on the trace data.

3. The video game device according to claim 1, wherein the movement control programmed logic circuitry updates the position data based on the predetermined rule if it is not determined by the determination programmed logic circuitry that the moving character has contacted the trace.

4. The video game device according to claim 1, wherein the on-trace movement control programmed logic circuitry updates the position data based on the trace data so that the moving character moves along the trace.

5. The video game device according to claim 1, wherein the on-trace movement control programmed logic circuitry updates the position data based on the trace data so that the moving character moves while being attracted to the trace.

6. The video game device according to claim 1, wherein the on-trace movement control programmed logic circuitry updates the position data stored in storage locations based on the trace data so that the moving character moves in a tangential direction of the trace.

7. The video game device according to claim 1, wherein the on-trace movement control programmed logic circuitry updates the position data based on the trace data so that the moving character is moved or accelerated in a direction from an older input position to a newer input position on the trace.

8. The video game device according to claim 1, wherein the determination programmed logic circuitry determines, based on the trace data and the position data, whether or not the moving character has contacted a segment of the trace, for each segment between two input positions on the trace that are adjacent to each other in time.

9. The video game device according to claim 8, wherein the determination programmed logic circuitry makes a determination, for each segment starting from a segment one end of which is at an oldest input position, whether or not the moving character has contacted the segment, and stops the determination process when it is determined that the moving character has contacted any segment.

10. The video game device according to claim 8, wherein the on-trace movement control programmed logic circuitry updates the position data so that the moving character is moved or accelerated along a segment that is determined by the determination programmed logic circuitry to have been contacted by the moving character, in a direction from one end of the segment at an older input position toward the other end thereof at a newer input position.

11. The video game device according to claim 10, wherein when a position indicated by the position data satisfies a predetermined condition while continuously updating the position data so that the moving character is moved in a direction from one end of a segment at an older input position toward the other end thereof at a newer input position, the on-trace movement control programmed logic circuitry starts updating the position data so that the moving character is moved in a direction from the newer input position toward an even newer input position that is adjacent in time to the newer input position.

12. The video game device according to claim 11, wherein when it is determined that the moving character has contacted a new segment while continuously updating the position data so that the moving character is moved in a direction from one end of a previous segment at an older input position toward the other end thereof at a newer input position, the new segment being adjacent in time to the previous segment, the on-trace movement control programmed logic circuitry starts updating the position data so that the moving character is moved in a direction from one end of the new segment at an older input position toward the other end thereof at a newer input position.

13. The video game device according to claim 11, wherein when it is determined that the moving character is no longer in contact with a segment while continuously updating the position data so that the moving character is moved in a direction from one end of the segment at an older input position toward the other end thereof at a newer input position, the on-trace movement control programmed logic circuitry starts updating the position data so that the position indicated by the position data moves along an arc about one end of the segment at a newer input position until a straight line between the position indicated by the position data and the newer input position becomes perpendicular to a new segment that is adjacent in time with the segment, after which the on-trace movement control programmed logic circuitry starts updating the position data so that the moving character is moved in a direction from one end of the new segment at an older input position toward the other end thereof at a newer input position.

14. The video game device according to claim 10, wherein:
the video game device further comprises on-trace movement termination determining programmed logic circuitry, wherein when it is determined by the determination programmed logic circuitry that the moving character is no longer in contact with a segment while the on-trace movement control programmed logic circuitry is continuously updating the position data so that the moving character is moved in a direction from one end of the segment at an older input position toward the other end thereof at a newer input position, the on-trace movement termination determining programmed logic circuitry determines whether or not there is any segment newer than the segment; and
the on-trace movement control programmed logic circuitry updates the position data based on the trace data from when it is determined by the determination programmed logic circuitry that the moving character has contacted the trace until it is determined by the on-trace movement termination determining programmed logic circuitry that there is no newer segment.

15. The video game device according to claim 1, wherein:
the video game device further comprises moving velocity data storage control programmed logic circuitry for storing, in storage locations, moving velocity data of the moving character;
the on-trace movement control programmed logic circuitry updates the position data based on the moving velocity data;
the video game device further comprises on-trace movement termination determining programmed logic circuitry for determining whether or not the update of the position data based on the trace data should be terminated based on a shape of the trace and the moving velocity data; and
the on-trace movement control programmed logic circuitry updates the position data based on the trace data from when it is determined by the determination programmed logic circuitry that the moving character has contacted the trace until it is determined by the on-trace movement termination determining programmed logic circuitry that the update should be terminated.

16. The video game device according to claim 11, wherein:
the video game device further comprises moving velocity data storage control programmed logic circuitry for storing, in storage locations, moving velocity data of the moving character;
the on-trace movement control programmed logic circuitry updates the position data based on the moving velocity data;
the video game device further comprises on-trace movement termination determining programmed logic circuitry for determining whether or not the update of the position data based on the trace data should be terminated based on the moving velocity data, when it is determined that the predetermined condition is satisfied and if the position indicated by the position data and the even newer input position adjacent in time to the newer input position are on different sides of the segment; and the on-trace movement control programmed logic circuitry updates the position data based on the trace data from when it is determined by the determination programmed logic circuitry that the moving character has contacted the trace until it is determined by the on-trace movement termination determining programmed logic circuitry that the update should be terminated.

17. The video game device according to claim 11, further comprising:

first data storing programmed logic circuitry for storing first data;

first data updating programmed logic circuitry for updating the first data so as to bring the first data closer to a threshold value, when it is determined that the predetermined condition is satisfied and if the position indicated by the position data and the even newer input position adjacent in time to the newer input position are on different sides of the segment; and on-trace movement termination determining programmed logic circuitry for determining whether or not the first data has reached the threshold value, wherein the on-trace movement control programmed logic circuitry updates the position data based on the trace data from when it is determined by the determination programmed logic circuitry that the moving character has contacted the trace until it is determined by the on-trace movement termination determining programmed logic circuitry that the first data has reached the threshold value.

18. The video game device according to claim 17, wherein the first data updating programmed logic circuitry updates the first data so as to bring the first data away from the threshold value if the position indicated by the position data and the even newer input position adjacent in time to the newer input position are on the same side of the segment.

19. The video game device according to claim 17, further comprising moving velocity data storage control programmed logic circuitry for storing, in storage locations, moving velocity data of the moving character, wherein:

the on-trace movement control programmed logic circuitry updates the position data based on the moving velocity data; and the first data updating programmed logic circuitry determines an amount of update based on the moving velocity data.

20. The video game device according to claim 1, further comprising sinking control programmed logic circuitry for adjusting a distance between the position indicated by the position data and an intersection between the trace and a line being perpendicular to the trace and extending from the position to be a predetermined distance when it is determined by the determination programmed logic circuitry that the moving character has contacted the trace.

21. The video game device according to claim 20, wherein the sinking control programmed logic circuitry updates the position data so that the distance gradually approaches the predetermine distance.

22. The video game device according to claim 1, wherein the trace storage control programmed logic circuitry stores a group of trace data in storage unit based on a series of positions inputted from when the position inputting means first detects an input of a position until the position inputting unit no longer detects an input of a position.

23. The video game device according to claim 22, wherein if an angle between a first, older segment and a second, newer segment along a trace that are adjacent in time to each other is less than or equal to a threshold value, each segment extending between two input positions along the trace that are adjacent in time to each other, the trace storage control programmed logic circuitry stores the trace data of a first portion of the trace and the trace data of a second portion of the trace as different groups of trace data, wherein the first portion of the trace includes the first segment and any other preceding segments and the second portion of the trace includes the second segment and any other subsequent segments.

24. The video game device according to claim 1, wherein:

the trace storage control programmed logic circuitry stores a group of trace data in storage locations based on a series of positions inputted from when the position inputting unit first detects an input of a position until the position inputting means no longer detects an input of a position;

the determination programmed logic circuitry determines which group of trace data represents a trace that has been contacted by the moving character based on each group of trace data and the position data; and when it is determined by the determination programmed logic circuitry that the moving character has contacted a trace represented by a group of trace data, the position data stored in storage locations is updated so that the moving character is moved based on the group of trace data.

25. The video game device according to claim 1, further comprising trace data erasing programmed logic circuitry, wherein when the position inputting unit detects an input of a new series of positions while a group of trace data is already stored in storage locations, the trace data erasing programmed logic circuitry erases the existing group of trace data from the storage locations or invalidates the existing group of trace data.

26. The video game device according to claim 1, further comprising moving velocity data storage control programmed logic circuitry for storing, in storage locations, moving velocity data of the moving character, wherein:

the movement control programmed logic circuitry updates the position data based on the moving velocity data; and the on-trace movement control programmed logic circuitry updates the position data so that the moving character moves according to the trace based on the trace data when it is determined by the determination programmed logic circuitry that the moving character has contacted the trace and only if the moving velocity data at the time of the contact represents a value smaller than a threshold value.

27. The video game device according to claim 1, further comprising moving velocity data storage control programmed logic circuitry for storing, in storage locations, moving velocity data of the moving character, wherein:

the movement control programmed logic circuitry updates the position data based on the moving velocity data; and the on-trace movement control programmed logic circuitry updates the position data so that the moving character moves according to the trace based on the trace data when it is determined by the determination programmed logic circuitry that the moving character has contacted the trace and only if a magnitude of a component of the moving velocity data at the time of the contact that is perpendicular to the trace is smaller than a threshold value.

28. The video game device according to claim 26, wherein the threshold value is determined according to an angle of the trace.

29. The video game device according to claim 26, further comprising moving velocity data storage control programmed logic circuitry for storing, in storage locations, moving velocity data of the moving character, wherein:
the movement control programmed logic circuitry updates the position data based on the moving velocity data; and
the on-trace movement control programmed logic circuitry updates the moving velocity data so that a moving direction of the moving character is reversed by the trace when it is determined by the determination programmed logic circuitry that the moving character has contacted the trace and if the moving velocity data represents a value greater than or equal to a threshold value.

30. The video game device according to claim 10, wherein:
the determination programmed logic circuitry determines, based on the trace data and the position data, whether or not the moving character has contacted the input position and whether or not, with respect to a straight line extending from the input position and being perpendicular to the segment one end of which is at the input position, the position indicated by the position data and the other end of the segment are on different sides of the straight line; and
when it is determined that the position indicated by the position data and the other end of the segment are on different sides of the straight line, the position data is updated so that the position indicated by the position data moves along an arc about the input position until a straight line extending between the position indicated by the position data and the input position becomes perpendicular to the segment, after which the position data is updated so that the moving character is moved in a direction from one end of the segment at an older input position toward the other end thereof at a newer input position.

31. The video game device according to claim 30, further comprising moving velocity data storage control programmed logic circuitry for storing, in storage locations, moving velocity data of the moving character, wherein:
the movement control programmed logic circuitry updates the position data based on the moving velocity data; and
when the determination programmed logic circuitry determines, based on the trace data and the position data, that the moving character has contacted the input position and determines that, with respect to a straight line extending from the input position and being perpendicular to the segment one end of which is at the input position, the position indicated by the position data and the other end of the segment are on different sides of the straight line, the position data is updated so that the moving character is moved in a direction from one end of the segment at an older input position toward the other end thereof at a newer input position only if a magnitude of a component of a moving velocity represented by the moving velocity data at the time of the determination that is perpendicular to the segment is smaller than a threshold value.

32. The video game device according to claim 31, further comprising moving velocity data storage control programmed logic circuitry for storing, in storage locations, moving velocity data of the moving character, wherein:
the movement control programmed logic circuitry updates the position data based on the moving velocity data; and
even when the determination programmed logic circuitry determines, based on the trace data and the position data, that the moving character has contacted the input position and determines that, with respect to a straight line extending from the input position and being perpendicular to the segment one end of which is at the input position, the position indicated by the position data and the other end of the segment are on different sides of the straight line, the moving velocity data is updated so that a moving direction of the moving character is reversed by the input position if a magnitude of a component of a moving velocity represented by the moving velocity data at the time of the determination that is perpendicular to the segment is greater than or equal to a threshold value.

33. The video game device according to claim 30, further comprising moving velocity data storage control programmed logic circuitry for storing, in storage locations, moving velocity data of the moving character, wherein:
the movement control programmed logic circuitry updates the position data based on the moving velocity data; and
when the determination programmed logic circuitry determines, based on the trace data and the position data, that the moving character has contacted the input position and determines that, with respect to a straight line extending from the input position and being perpendicular to the segment one end of which is at the input position, the position indicated by the position data and the other end of the segment are on different sides of the straight line, the position data is updated so that the moving character is moved in a direction from one end of the segment at an older input position toward the other end thereof at a newer input position only if a magnitude of a component of a moving velocity represented by the moving velocity data at the time of the determination that is in a direction extending between the position indicated by the position data and the input position is smaller than a threshold value.

34. The video game device according to claim 33, further comprising moving velocity data storage control programmed logic circuitry for storing, in storage locations, moving velocity data of the moving character, wherein:
the movement control programmed logic circuitry updates the position data based on the moving velocity data; and
even when the determination programmed logic circuitry determines, based on the trace data and the position data, that the moving character has contacted the input position and determines that, with respect to a straight line extending from the input position and being perpendicular to the segment one end of which is at the input position, the position indicated by the position data and the other end of the segment are on different sides of the straight line, the moving velocity data is updated so that a moving direction of the moving character is reversed by the input position if a magnitude of a component of a moving velocity represented by the moving velocity data at the time of the determination that is in a direction extending between the position indicated by the position data and the input position is greater than or equal to a threshold value.

35. The video game device according to claim 1, further comprising trace data erasing programmed logic circuitry for automatically erasing or invalidating the input positions of the trace data stored in the storage locations successively starting from an oldest input position.

36. The video game device according to claim 1, further comprising time determination programmed logic circuitry for determining whether or not a predetermined amount of time has elapsed from a start or an end of a detection of position inputs by the position inputting unit,
    wherein the trace data erasing programmed logic circuitry erases or invalidates the trace data stored in the trace data storing locations when it is determined by the time determination programmed logic circuitry that the predetermined amount of time has elapsed.

37. The video game device according to claim 1, further comprising second data updating programmed logic circuitry for storing second data in storage locations and for updating the second data so as to bring the second data closer to a threshold value when the trace data is stored in storage locations by the trace storage control programmed logic circuitry,
    wherein if the second data has reached the threshold value, the trace storage control programmed logic circuitry no longer stores the trace data in storage locations even if a new position is inputted by the position inputting unit.

38. The video game device according to claim 37, wherein the trace amount data updating programmed logic circuitry automatically updates the second data so as to bring the second data away from the threshold value while there is no input from the position inputting unit.

39. The video game device according to claim 37, further comprising trace length detection programmed logic circuitry for detecting a length of a trace based on the trace data stored in storage locations by the trace storage control programmed logic circuitry,
    wherein the trace amount data updating programmed logic circuitry updates the second data by an amount according to the length of the trace detected by the trace length detection programmed logic circuitry.

40. The video game device according to claim 37, wherein the display control programmed logic circuitry displays information representing a value of the second data.

41. The video game device according to claim 1, further comprising character detection programmed logic circuitry for determining whether or not the moving character is present at a first position inputted by the position inputting unit,
    wherein the trace storage control programmed logic circuitry stores the trace data in storage locations based on the input position only if it is determined by the character detection programmed logic circuitry that no moving character is present at the input position.

42. The video game device according to claim 41, wherein a predetermined action is executed by the moving character when it is determined by the character detection programmed logic circuitry that the moving character is present at the input position.

43. The video game device according to claim 1, wherein:
    the video game device further comprises moving velocity data storage control programmed logic circuitry for storing, in storage locations, moving velocity data of the moving character:
    the movement control programmed logic circuitry updates the position data based on the moving velocity data; and
    the video game device further comprises moving velocity determination programmed logic circuitry, wherein when it is determined by the determination programmed logic circuitry that the moving character has contacted the trace, the moving velocity determination programmed logic circuitry determines a new moving velocity of the moving character to be a magnitude of a component of a velocity represented by the moving velocity data immediately before the contact that is parallel to a tangential direction of the trace.

44. The video game device according to claim 36, further comprising moving velocity data storage control programmed logic circuitry for storing, in storage locations, moving velocity data of the moving character, wherein:
    the on-trace movement control programmed logic circuitry updates the position data based on the moving velocity data;
    the on-trace movement control programmed logic circuitry includes acceleration determination programmed logic circuitry for determining a magnitude of acceleration used for updating the moving velocity data based on a magnitude of a moving velocity represented by the current moving velocity data;
    the acceleration determination programmed logic circuitry includes target velocity setting programmed logic circuitry for setting a target velocity value, maximum velocity setting programmed logic circuitry for setting a maximum velocity value, and setting programmed logic circuitry for setting a positive first value and a negative second value;
    the acceleration determination programmed logic circuitry determines the magnitude of acceleration to be zero when the magnitude of the moving velocity represented by the current moving velocity data is equal to the target velocity value, determines the magnitude of acceleration to be the first value when the magnitude of the moving velocity represented by the current moving velocity data is equal to zero, determines the magnitude of acceleration to be the second value when the magnitude of the moving velocity represented by the current moving velocity data is equal to the maximum velocity value, determines the magnitude of acceleration by interpolation with the first value and zero when the magnitude of the moving velocity represented by the current moving velocity data is in a range from zero to the target velocity value, and determines the magnitude of acceleration by interpolation with zero and the second value when the magnitude of the moving velocity represented by the current moving velocity data is in a range between the target velocity value and the maximum velocity value; and
    the on-trace movement control programmed logic circuitry determines an acceleration vector based on the magnitude of acceleration determined by the acceleration determination programmed logic circuitry and a tangential direction of the trace.

45. The video game device according to claim 1, wherein the position inputting unit is a touch panel provided on a screen of the display section.

46. A storage medium storing a video game program for instructing a computer, which is connected to a display section for displaying a game image and position inputting unit for inputting a position on the game image and storage locations, to function as:
    trace storage control programmed logic circuitry for storing, in storage locations, trace data representing a series of input positions inputted by the position inputting unit;
    movement control programmed logic circuitry for storing, in storage locations, position data of a moving character and updating the position data based on a predetermined rule;
    determination programmed logic circuitry for determining whether or not the moving character has contacted a trace based on the trace data and the position data, said trace having the shape of a line drawn displayed on the display section;

on-trace movement control programmed logic circuitry for updating the position data so that the moving character moves according to the trace based on the trace data when it is determined by the determination programmed logic circuitry that the moving character has contacted the trace; and display control programmed logic circuitry for displaying the moving character on the display section based on the position data.

47. A video game device, comprising:

a display section for displaying a game image;

image data storing locations for storing at least moving character image data for displaying a moving character of the game and background image data for displaying a background image;

program storing programmed logic circuitry for storing a video game program for controlling how the moving character image and the background image are displayed;

a position inputting unit which is operated to input a position;

operation status detection programmed logic circuitry for detecting an operation trace at least during a period from when a first position is specified through the position inputting unit until a last position is specified therethrough;

temporary storage locations for temporarily storing data necessary for a game process;

writing programmed logic circuitry for writing data of the operation trace detected by the operation status detection programmed logic circuitry in the temporary storage locations;

operation trace image data producing programmed logic circuitry for producing, based on the data of the operation trace stored in the temporary storage locations, operation trace image data for displaying an operation trace image on the display section that is for guiding a movement of the moving character, said operation trace image having the shape of a line drawn displayed on the display section; and display control programmed logic circuitry for, based on the video game program, reading the moving character image data and the background image data stored in the image data storing locations to display the moving character and the background image on the display section while displaying the operation trace image on the display section by using the operation trace image data, and for controlling the display so that the moving character moves along the operation trace image.

48. A video game device, comprising:

a display section for displaying a game image;

a touch panel attached to an upper surface of the display section so that a screen of the display section can be directly touched to input a position thereon being touched;

image data storing locations for storing at least moving character image data for displaying a moving character of the game and background image data for displaying a background image;

program storing programmed logic circuitry for storing a video game program for controlling how the moving character image and the background image are displayed;

operation status detection programmed logic circuitry for detecting an operation trace at least during a period from when a first position is specified by touching the touch panel until a last position is specified;

temporary storage locations for temporarily storing data necessary for a game process;

writing programmed logic circuitry for writing data of the operation trace detected by the operation status detection programmed logic circuitry in the temporary storage locations;

operation trace image data producing programmed logic circuitry for producing, based on the data of the operation trace stored in the temporary storage locations, operation trace image data for displaying an operation trace image on the display section that is for guiding a movement of the moving character, said operation trace image having the shape of a line drawn displayed on the display section; and display control programmed logic circuitry for, based on the video game program, reading the moving character image data and the background image data stored in the image data storing locations to display the moving character and the background image on the display section while displaying the operation trace image on the display section by using the operation trace image data, and for controlling the display so that the moving character moves along the operation trace image.

49. A storage medium storing a video game program for use in an image processing device, wherein the image processing device includes a display section associated therewith for displaying a game image, a position inputting unit, image data storing locations for storing moving character image data for displaying a moving character of the video game and background image data for displaying a background image, program storing programmed logic circuitry for storing the video game program for controlling how the moving character image and the background image are displayed, a computer, and temporary storage locations for temporarily storing data for a game process to be performed by the computer, the video game program instructing the computer to perform:

operation status detection for detecting an operation trace during a period from when a first position is specified through the position inputting unit and a last position is specified therethrough;

writing data of the operation trace detected in the operation status detection in the temporary storage locations;

operation trace image data producing for producing, based on the data of the operation trace stored in the temporary storage locations, operation trace image data for displaying an operation trace image on the display section that is for guiding a movement of the moving character, said operation trace image having the shape of a line drawn displayed on the display section;

first display control for, based on the video game program, reading the moving character image data and the background image data stored in the image data storing locations to display the moving character and the background image on the display section;

second display control for displaying the operation trace image on the display section based on the video game program and the operation trace image data stored in the temporary storage locations; and third display control for moving the moving character displayed on the display section along the operation trace image based on the video game program.

50. A storage medium storing a video game program for use in an image processing device,
wherein the image processing device includes a display section associated therewith for displaying a game image, a touch panel provided on a display screen of the display section, image data storing locations for storing moving character image data for displaying a moving character of the video game and background image data for displaying a background image, program storing programmed logic circuitry for storing the video game program for displaying the moving character image and the background image, a computer, and temporary storage locations for temporarily storing data for a game process to be performed by the computer, the video game program instructing the computer to perform:
operation status detection for detecting an operation trace during a period from when a first position is specified through the touch panel and a last position is specified therethrough;
writing data of the operation trace detected in the operation status detection in the temporary storage locations;
operation trace image data producing for producing, based on the data of the operation trace stored in the temporary storage locations, operation trace image data for displaying an operation trace image on the display section that is for guiding a movement of the moving character, said operation trace image having the shape of a line drawn displayed on the display section;
first display control for, based on the video game program, reading the moving character image data and the background image data stored in the image data storing locations to display the moving character and the background image on the display section;
second display control for displaying the operation trace image on the display section based on the video game program and the operation trace image data stored in the temporary storage locations; and
third display control for moving the moving character displayed on the display section along the operation trace image based on the video game program.

* * * * *